US012776884B2

(12) United States Patent
Hu et al.

(10) Patent No.: US 12,776,884 B2
(45) Date of Patent: Oct. 27, 2026

(54) METHOD AND DEVICE FOR TRANSMITTING HARQ-ACK FEEDBACK

(71) Applicant: Apogee 5G Global, LLC, Plano, TX (US)

(72) Inventors: Yang Hu, Shanghai (CN); Xiaobo Zhang, Shanghai (CN)

(73) Assignee: Apogee 5G Global, LLC, Plano, TX (US)

(*) Notice: Subject to any disclaimer, the term of this patent is extended or adjusted under 35 U.S.C. 154(b) by 208 days.

(21) Appl. No.: 18/589,441

(22) Filed: Feb. 28, 2024

(65) Prior Publication Data

US 2024/0204967 A1 Jun. 20, 2024

Related U.S. Application Data

(63) Continuation of application No. PCT/CN2022/116415, filed on Sep. 1, 2022.

(30) Foreign Application Priority Data

Sep. 4, 2021 (CN) ......................... 202111034782.7

(51) Int. Cl.

*H04L 5/00* (2006.01)
*H04L 1/1812* (2023.01)
*H04W 72/04* (2023.01)

(52) U.S. Cl.

CPC .......... *H04L 5/0055* (2013.01); *H04L 1/1812* (2013.01); *H04W 72/04* (2013.01)

(58) Field of Classification Search

CPC ... H04L 5/0055; H04L 1/1812; H04L 1/1822; H04L 1/1607; H04L 1/1614;

(Continued)

(56) References Cited

U.S. PATENT DOCUMENTS

| | | | |
|---|---|---|---|
| 10,568,123 | B2 | 2/2020 | Guan et al. |
| 11,330,564 | B2 | 5/2022 | Zhang et al. |

(Continued)

FOREIGN PATENT DOCUMENTS

| | | | |
|---|---|---|---|
| CN | 106211086 | A | 12/2016 |
| CN | 107547183 | A | 1/2018 |

(Continued)

OTHER PUBLICATIONS

ISR received in application No. PCT/CN2022/116415 dated Oct. 31, 2022.

(Continued)

*Primary Examiner* — Rushil P. Sampat
(74) *Attorney, Agent, or Firm* — Volpe Koenig

(57) ABSTRACT

A first receiver receives a first information group and a target bit block set, the first information group used to determine X1 control resources; a first transmitter transmits a first PUSCH in a first resource pool; the X1 control resources are respectively reserved for X1 PUCCHs, at least one of the X1 PUCCHs being a PUCCH for NACK-only feedback; when there exists one control resource among the X1 control resources overlapping with the first resource pool in time domain, the first PUSCH is used to transmit ACK/NACK feedback for bit block(s) in the target bit block set; when each of the X1 control resources is orthogonal to the first resource pool in time domain, at most X2 PUCCH(s) among the X1 PUCCHs is(are) used to transmit HARQ-ACK feedback for the bit block(s) in the target bit block set, X2 being a positive integer less than X1.

20 Claims, 7 Drawing Sheets

(58) Field of Classification Search
CPC .. H04L 1/1864; H04W 72/04; H04W 72/042; H04W 72/23
See application file for complete search history.

(56) References Cited

U.S. PATENT DOCUMENTS

| | | | |
|---|---|---|---|
| 11,758,540 B2 | 9/2023 | Lee et al. | |
| 2019/0394673 A1 | 12/2019 | Hwang et al. | |
| 2021/0111839 A1* | 4/2021 | Bhamri | H04L 1/08 |
| 2022/0021486 A1* | 1/2022 | Yang | H04L 1/1812 |
| 2022/0086811 A1* | 3/2022 | Han | H04L 5/0055 |
| 2022/0104231 A1* | 3/2022 | Gou | H04W 72/1273 |
| 2022/0191882 A1 | 6/2022 | Lee et al. | |
| 2022/0201680 A1* | 6/2022 | Ling | H04W 72/1268 |
| 2022/0209923 A1* | 6/2022 | Gao | H04L 1/1812 |
| 2023/0336285 A1* | 10/2023 | Papasakellariou | H04L 1/1854 |

FOREIGN PATENT DOCUMENTS

| | | | |
|---|---|---|---|
| CN | 110798892 | A | 2/2020 |
| CN | 112187424 | A | 1/2021 |
| CN | 113285784 | A | 8/2021 |

OTHER PUBLICATIONS

MediaTek Inc. "Evaluation and enhancements of NR PUCCH" 3GPP TSG RAN WG1 Meeting #95 R1-1812375 Nov. 3, 2018.
Third Generation Partnership Project, "Technical Specification Group Radio Access Network; NR; Multiplexing and channel coding (Release 16)," 3GPP TS 38.212 V16.6.0 (Jun. 2021).
Third Generation Partnership Project, "Technical Specification Group Radio Access Network; NR; Physical layer procedures for control (Release 16)," 3GPP TS 38.213 V16.6.0 (Jun. 2021).
Third Generation Partnership Project, "Technical Specification Group Radio Access Network; NR; Physical layer procedures for data (Release 17)," 3GPP TS 38.214 V16.6.0 (Jun. 2021).

* cited by examiner

METHOD AND DEVICE FOR TRANSMITTING HARQ-ACK FEEDBACK

CROSS REFERENCE TO RELATED APPLICATIONS

This application is the continuation of the international patent application No. PCT/CN2022/116415, filed on Sep. 1, 2022, and claims the priority benefit of Chinese Patent Application No. 202111034782.7, filed on Sep. 4, 2021, the full disclosure of which is incorporated herein by reference.

BACKGROUND

Technical Field

The present disclosure relates to transmission methods and devices in wireless communication systems, and in particular to a method and device for radio signal transmission in a wireless communication system supporting cellular networks.

Related Art

The 3rd Generation Partner Project (3GPP) has agreed in the discussions about NR Release 17 to support a NACK-only Hybrid Automatic Repeat reQuest ACKnowledgement (HARQ-ACK) feedback mode for Multicast and Broadcast Services (MBS). How to handle multiple NACK-only based HARQ-ACK feedbacks in the same Physical Uplink Control CHannel (PUCCH) slot is a key issue to be addressed.

SUMMARY

For multiple NACK-only based HARQ-ACK feedbacks in the same Physical Uplink Control CHannel (PUCCH) slot, a candidate approach is to configure multiple different PUCCHs for multiple different decoding results; how to handle the time-domain overlap of the multiple different PUCCHs used for the multiple different decoding results and PUSCHs is an important issue that must be taken into consideration.

To address the above problem, the present disclosure provides a solution. It should be noted that although only the HARQ-ACK feedback in uplink (UL) is taken as an example in the description above, the present disclosure is equally applicable to other scenarios such as Downlink (DL) and Sidelink (SL), where similar technical effects can be achieved. Additionally, the adoption of a unified solution for various scenarios, including but not limited to UL, DL and SL, contributes to the reduction of hardcore complexity and costs, or the enhancement of performance. It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

receiving a first information group and a target bit block set, the first information group used to determine X1 control resources, X1 being a positive integer greater than 1, the target bit block set comprising at least one bit block; and transmitting a first PUSCH in a first resource pool;

herein, the X1 control resources are respectively reserved for X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the first PUSCH is used to transmit ACK/NACK feedback for bit block(s) in the target bit block set; when each of the X1 control resources is orthogonal to the first resource pool in time domain, at most X2 PUCCH(s) among the X1 PUCCHs is(are) used to transmit HARQ-ACK feedback for the bit block(s) in the target bit block set, X2 being a positive integer less than X1.

In one embodiment, a problem to be solved by the present application includes: how to handle the multiplexing of HARQ-ACKs when the X1 PUCCHs overlap in time domain with PUSCHs.

In one embodiment, a problem to be solved in the present disclosure includes: how to handle time-domain overlapping between PUCCHs for NACK only and Physical Uplink Shared CHannels (PUSCHs).

In one embodiment, characteristics of the above method include: when any of the X1 control resources is overlapping with the first resource pool in time domain: the first PUSCH is always used to transmit ACK/NACK feedback for the bit block(s) in the target bit block set.

In one embodiment, characteristics of the above method include: when there exists one resource among the X1 control resources that overlaps with the first resource pool in time domain: whether or not a PUCCH corresponding to the control resource among the X1 control resources that overlaps with the first resource pool in time domain would be transmitted, the first PUSCH is always used to transmit ACK/NACK feedback for the bit block(s) in the target bit block set.

In one embodiment, characteristics of the above method include: in terms of time domain, whenever the first resource pool overlaps with any time-domain resource occupied by any of the X1 control resources, the first PUSCH is used to transmit ACK/NACK feedback for the bit block(s) in the target bit block set.

In one embodiment, an advantage of the above method includes: facilitating the consistency of the understanding between the communicating parties of the physical channel of the uplink being used for HARQ-ACK message transmission.

In one embodiment, an advantage of the above method includes: improving uplink transmission efficiency.

In one embodiment, an advantage of the above method includes: helping increase the flexibility in scheduling of the base station.

In one embodiment, an advantage of the above method includes: requiring less standardization effort for newly introduced NACK-only feedbacks.

According to one aspect of the present disclosure, the above method is characterized in that, when each of the X1 control resources is orthogonal to the first resource pool in time domain: when at least one bit block in the target bit block set is not correctly decoded: only one PUCCH of the X1 PUCCHs is used to transmit a NACK, and a decoding result of the bit block(s) in the target bit block set is used to determine which one of the X1 PUCCHs is used to transmit the NACK.

In one embodiment, characteristics of the above method include: using multiple PUCCHs for NACK-only feedback to achieve reports of multiple HARQ-ACK bits.

In one embodiment, characteristics of the above method include: using multiple PUCCHs for NACK-only feedback to achieve reports of decoding results of multiple TBs.

According to one aspect of the present disclosure, the above method is characterized in that, when each of the X1 control resources is orthogonal to the first resource pool in time domain: when each of the bit block(s) in the target bit block set is correctly decoded: dropping transmitting HARQ-ACK feedback for the target bit block set in the X1 PUCCHs.

According to one aspect of the present disclosure, the above method is characterized in that, at least one bit block in the target bit block set is not correctly decoded, and the decoding result of the bit block(s) in the target bit block set is one of X1 different decoding results, the X1 different decoding results respectively corresponding to the X1 PUCCHs; when each of the X1 control resources is orthogonal to the first resource pool in time domain: a PUCCH corresponding to the decoding result of the bit block(s) in the target bit block set among the X1 PUCCHs is used to transmit a NACK.

According to one aspect of the present disclosure, the above method is characterized in that, at least one bit block in the target bit block set is not correctly decoded, the decoding result of the bit block(s) in the target bit block set is one of X3 different decoding results, each of the X3 different decoding results corresponding to one of the X1 PUCCHs, X3 being no less than X1; when each of the X1 control resources is orthogonal to the first resource pool in time domain: a PUCCH corresponding to the decoding result of the bit block(s) in the target bit block set among the X1 PUCCHs is used to transmit HARQ-ACK feedback for the bit block(s) in the target bit block set.

According to one aspect of the present disclosure, the above method is characterized in that, when each of the X1 control resources is orthogonal to the first resource pool in time domain: when the decoding result of the bits block(s) in the target bit block set is one of X4 different decoding results, a PUCCH corresponding to the decoding result of the bits block(s) in the target bit block set among the X1 PUCCHs is used to transmit a NACK; when the decoding result of the bits block(s) in the target bit block set is not one of the X4 different decoding results, a PUCCH corresponding to the decoding result of the bits block(s) in the target bit block set among the X1 PUCCHs is used to transmit ACK/NACK feedback for the bit block(s) in the target bit block set; the X3 different decoding results include the X4 different decoding results, X4 being less than X3.

According to one aspect of the present disclosure, the above method is characterized in that, a number of bit block(s) in the target bit block set is used to determine X1.

The present disclosure provides a method in a second node for wireless communications, comprising:

transmitting a first information group and a target bit block set, the first information group used to determine X1 control resources, X1 being a positive integer greater than 1, the target bit block set comprising at least one bit block; and receiving a first PUSCH in a first resource pool;

herein, the X1 control resources are respectively reserved for X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, receiving ACK/NACK feedback for bit block(s) in the target bit block set in the first PUSCH; when each of the X1 control resources is orthogonal to the first resource pool in time domain, performing signal detection in at least one PUCCH among the X1 PUCCHs.

According to one aspect of the present disclosure, the above method is characterized in that, when any of the X1 control resources is overlapping with the first resource pool in time domain: dropping performance of signal detection in all of the X1 PUCCHs.

According to one aspect of the present disclosure, the above method is characterized in that, when each of the X1 control resources is orthogonal to the first resource pool in time domain: performance of signal detection in all of the X1 PUCCHs.

The present disclosure provides a first node for wireless communications, comprising:

a first receiver, receiving a first information group and a target bit block set, the first information group used to determine X1 control resources, X1 being a positive integer greater than 1, the target bit block set comprising at least one bit block; and a first transmitter, transmitting a first PUSCH in a first resource pool;

herein, the X1 control resources are respectively reserved for X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the first PUSCH is used to transmit ACK/NACK feedback for bit block(s) in the target bit block set; when each of the X1 control resources is orthogonal to the first resource pool in time domain, at most X2 PUCCH(s) among the X1 PUCCHs is(are) used to transmit HARQ-ACK feedback for the bit block(s) in the target bit block set, X2 being a positive integer less than X1.

The present disclosure provides a second node for wireless communications, comprising:

a second transmitter, transmitting a first information group and a target bit block set, the first information group used to determine X1 control resources, X1 being a positive integer greater than 1, the target bit block set comprising at least one bit block; and a second receiver, receiving a first PUSCH in a first resource pool;

herein, the X1 control resources are respectively reserved for X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the second receiver receives ACK/NACK feedback for bit block(s) in the target bit block set in the first PUSCH; when each of the X1 control resources is orthogonal to the first resource pool in time domain, the second receiver performs signal detection in at least one PUCCH among the X1 PUCCHs.

In one embodiment, the method in the present disclosure has the following advantages:

helping to guarantee the consistency of the understanding between the communicating parties of the physical channel of the uplink being used for HARQ-ACK message transmission;

helping to improve the uplink transmission efficiency;

helping to guarantee the flexibility of scheduling of the base station;

helping to enhance the system performance;

requiring less standardization effort for newly introduced NACK-only feedbacks.

The present disclosure provides a method in a first node for wireless communications, comprising:

receiving a first information group and a target bit block set, the first information group used to determine X1 control resources, X1 being a positive integer greater than 1, the target bit block set comprising at least one bit block; and transmitting HARQ-ACK feedback for bit block(s) in the target bit block set in at most X2 PUCCH(s) among X1 PUCCHs, X2 being a positive integer less than X1; and transmitting a first PUSCH in a first resource pool, or, dropping transmitting the first PUSCH in the first resource pool;

herein, the X1 control resources are respectively reserved for the X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, dropping transmitting the first PUSCH in the first resource pool; when each of the X1 control resources is orthogonal to the first resource pool in time domain, transmitting the first PUSCH in the first resource pool.

In one embodiment, a problem to be solved by the present application includes: how to deal with the time-domain overlap between the X1 PUCCHs and PUSCHs.

In one embodiment, a problem to be solved by the present application includes: how to deal with the time-domain overlap between a PUCCH for NACK only and a PUSCH.

In one embodiment, an advantage of the above method includes: facilitating the consistency of the understanding between the communicating parties of the physical channel of the uplink being used for HARQ-ACK message transmission.

In one embodiment, an advantage of the above method includes: helping improve uplink transmission efficiency.

In one embodiment, an advantage of the above method includes: ensuring the flexibility in scheduling of the base station.

In one embodiment, an advantage of the above method includes: requiring less standardization effort for newly introduced NACK-only feedbacks.

According to one aspect of the present disclosure, the above method is characterized in that, when there exists one resource among the X1 control resources that overlaps with the first resource pool in time domain: whether or not the control resource among the X1 control resources that overlaps with the first resource pool in time domain is used to transmit a PUCCH, transmitting the first PUSCH is dropped in the first resource pool.

According to one aspect of the present disclosure, the above method is characterized in that, at least one bit block in the target bit block set is not correctly decoded, transmitting the HARQ-ACK feedback for the bit block(s) in the target bit block set in only a first PUCCH among the X1 PUCCHs; when there exists one resource among the X1 control resources that overlaps with the first resource pool in time domain: whether or not a control resource corresponding to the first PUCCH overlaps with the first resource pool in time domain, transmitting the first PUSCH is dropped in the first resource pool.

According to one aspect of the present disclosure, the above method is characterized in that, when each of the bit block(s) in the target bit block set is correctly decoded: dropping transmitting HARQ-ACK feedback for the target bit block set in the X1 PUCCHs.

According to one aspect of the present disclosure, the above method is characterized in that, when at least one bit block in the target bit block set is not correctly decoded: only one PUCCH of the X1 PUCCHs is used to transmit a NACK, and a decoding result of the bit block(s) in the target bit block set is used to determine which one of the X1 PUCCHs is used to transmit the NACK.

According to one aspect of the present disclosure, the above method is characterized in that, when at least one bit block in the target bit block set is not correctly decoded, the decoding result of the bit block(s) in the target bit block set is one of X1 different decoding results, the X1 different decoding results respectively corresponding to the X1 PUCCHs; a PUCCH corresponding to the decoding result of the bit block(s) in the target bit block set among the X1 PUCCHs is used to transmit a NACK.

According to one aspect of the present disclosure, the above method is characterized in that, when at least one bit block in the target bit block set is not correctly decoded, the decoding result of the bit block(s) in the target bit block set is one of X3 different decoding results, each of the X3 different decoding results corresponding to one of the X1 PUCCHs, X3 being no less than X1; a PUCCH corresponding to the decoding result of the bit block(s) in the target bit block set among the X1 PUCCHs is used to transmit HARQ-ACK feedback for the bit block(s) in the target bit block set.

According to one aspect of the present disclosure, the above method is characterized in that, when at least one bit block in the target bit block set is not correctly decoded: when the decoding result of the bits block(s) in the target bit block set is one of X4 different decoding results, a PUCCH corresponding to the decoding result of the bits block(s) in the target bit block set among the X1 PUCCHs is used to transmit a NACK; when the decoding result of the bits block(s) in the target bit block set is not one of the X4 different decoding results, a PUCCH corresponding to the decoding result of the bits block(s) in the target bit block set among the X1 PUCCHs is used to transmit ACK/NACK feedback for the bit block(s) in the target bit block set; the X3 different decoding results include the X4 different decoding results, X4 being less than X3.

According to one aspect of the present disclosure, the above method is characterized in that, a number of bit block(s) in the target bit block set is used to determine X1.

The present disclosure provides a method in a second node for wireless communications, comprising:

transmitting a first information group and a target bit block set, the first information group used to determine X1 control resources, X1 being a positive integer greater than 1, the target bit block set comprising at least one bit block; and performing signal detection in at least one PUCCH of X1 PUCCHs; and receiving a first PUSCH in a first resource pool, or, dropping receiving the first PUSCH in the first resource pool;

herein, the X1 control resources are respectively reserved for the X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, dropping receiving the first PUSCH in the first resource pool; when each of the X1 control resources is orthogonal to the first resource pool in time domain, receiving the first PUSCH in the first resource pool.

According to one aspect of the present disclosure, the above method is characterized in that, when any of the X1 control resources is overlapping with the first resource pool in time domain: dropping receiving the first PUSCH in the first resource pool.

The present disclosure provides a first node for wireless communications, comprising:

a first receiver, receiving a first information group and a target bit block set, the first information group used to determine X1 control resources, X1 being a positive integer greater than 1, the target bit block set comprising at least one bit block; and a first transmitter, transmitting HARQ-ACK feedback for bit block(s) in the target bit block set in at most X2 PUCCH(s) among X1 PUCCHs, X2 being a positive integer less than X1;

the first transmitter, transmitting a first PUSCH in a first resource pool, or, dropping transmitting the first PUSCH in the first resource pool;

herein, the X1 control resources are respectively reserved for the X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the first node does not transmit the first PUSCH in the first resource pool; when each of the X1 control resources is orthogonal to the first resource pool in time domain, the first node transmits the first PUSCH in the first resource pool.

According to one aspect of the present disclosure, the above node is characterized in that, when there exists one resource among the X1 control resources that overlaps with the first resource pool in time domain: whether or not the control resource among the X1 control resources that overlaps with the first resource pool in time domain is used to transmit a PUCCH, the first node does not transmit the first PUSCH in the first resource pool.

According to one aspect of the present disclosure, the above node is characterized in that, at least one bit block in the target bit block set is not correctly decoded, the first node transmitting the HARQ-ACK feedback for the bit block(s) in the target bit block set in only a first PUCCH among the X1 PUCCHs; when there exists one resource among the X1 control resources that overlaps with the first resource pool in time domain: whether or not a control resource corresponding to the first PUCCH overlaps with the first resource pool in time domain, the first node does not transmit the first PUSCH in the first resource pool.

According to one aspect of the present disclosure, the above node is characterized in that, when each of the bit block(s) in the target bit block set is correctly decoded: the first node does not transmit HARQ-ACK feedback for the target bit block set in the X1 PUCCHs.

According to one aspect of the present disclosure, the above node is characterized in that, when at least one bit block in the target bit block set is not correctly decoded: only one PUCCH of the X1 PUCCHs is used to transmit a NACK, and a decoding result of the bit block(s) in the target bit block set is used to determine which one of the X1 PUCCHs is used to transmit the NACK.

According to one aspect of the present disclosure, the above node is characterized in that, when at least one bit block in the target bit block set is not correctly decoded, the decoding result of the bit block(s) in the target bit block set is one of X1 different decoding results, the X1 different decoding results respectively corresponding to the X1 PUCCHs; a PUCCH corresponding to the decoding result of the bit block(s) in the target bit block set among the X1 PUCCHs is used to transmit a NACK.

According to one aspect of the present disclosure, the above node is characterized in that, when at least one bit block in the target bit block set is not correctly decoded, the decoding result of the bit block(s) in the target bit block set is one of X3 different decoding results, each of the X3 different decoding results corresponding to one of the X1 PUCCHs, X3 being no less than X1; a PUCCH corresponding to the decoding result of the bit block(s) in the target bit block set among the X1 PUCCHs is used to transmit HARQ-ACK feedback for the bit block(s) in the target bit block set.

According to one aspect of the present disclosure, the above node is characterized in that, when at least one bit block in the target bit block set is not correctly decoded: when the decoding result of the bits block(s) in the target bit block set is one of X4 different decoding results, a PUCCH corresponding to the decoding result of the bits block(s) in the target bit block set among the X1 PUCCHs is used to transmit a NACK; when the decoding result of the bits block(s) in the target bit block set is not one of the X4 different decoding results, a PUCCH corresponding to the decoding result of the bits block(s) in the target bit block set among the X1 PUCCHs is used to transmit ACK/NACK feedback for the bit block(s) in the target bit block set; the X3 different decoding results include the X4 different decoding results, X4 being less than X3.

According to one aspect of the present disclosure, the above node is characterized in that, a number of bit block(s) in the target bit block set is used to determine X1.

The present disclosure provides a second node for wireless communications, comprising:

a second transmitter, transmitting a first information group and a target bit block set, the first information group used to determine X1 control resources, X1 being a positive integer greater than 1, the target bit block set comprising at least one bit block; and a second receiver, performing signal detection in at least one PUCCH of X1 PUCCHs;

the second receiver, receiving a first PUSCH in a first resource pool, or, dropping receiving the first PUSCH in the first resource pool;

herein, the X1 control resources are respectively reserved for the X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the second node drops receiving the first PUSCH in the first resource pool; when each of the X1 control resources is orthogonal to the first resource pool in time domain, the second node receives the first PUSCH in the first resource pool.

Considering that NACK-only HARQ-ACK feedback has already been agreed to be supported, the likelihood of ACK-only HARQ-ACK feedback being supported in future 3GPP standards is also high. For multiple ACK-only based HARQ-ACK feedbacks in the same PUCCH slot, a candidate way to handle them is to configure multiple different PUCCHs separately for multiple different decoding results; how to handle the time-domain overlap of the multiple different PUCCHs used for the multiple different decoding results and PUSCHs is an important issue that must be considered.

To address the above problem, the present disclosure provides a solution. It should be noted that although only the HARQ-ACK feedback in uplink (UL) is taken as an example in the description above, the present disclosure is equally applicable to other scenarios such as Downlink (DL) and Sidelink (SL), where similar technical effects can be achieved. Additionally, the adoption of a unified solution for various scenarios, including but not limited to UL, DL and SL, contributes to the reduction of hardcore complexity and costs, or the enhancement of performance. It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

receiving a first information group and a target bit block set, the first information group used to determine X1 control resources, X1 being a positive integer greater than 1, the target bit block set comprising at least one bit block; and transmitting a first PUSCH in a first resource pool;

herein, the X1 control resources are respectively reserved for X1 PUCCHs, at least one of the X1 PUCCHs being a PUCCH for ACK-only feedback, and any bit block in the target bit block set comprises at least one bit; when there exists one control resource among the X1 control resources that is overlapping with the first resource pool in time domain, the first PUSCH is used to transmit ACK/NACK feedback for bit block(s) in the target bit block set; when each of the X1 control resources is orthogonal to the first resource pool in time domain, at most X2 PUCCH(s) among the X1 PUCCHs is(are) used to transmit HARQ-ACK feedback for the bit block(s) in the target bit block set, X2 being a positive integer less than X1.

The present disclosure provides a first node for wireless communications, comprising:

a first receiver, receiving a first information group and a target bit block set, the first information group used to determine X1 control resources, X1 being a positive integer greater than 1, the target bit block set comprising at least one bit block; and a first transmitter, transmitting a first PUSCH in a first resource pool;

herein, the X1 control resources are respectively reserved for X1 PUCCHs, at least one of the X1 PUCCHs being a PUCCH for ACK-only feedback, and any bit block in the target bit block set comprises at least one bit; when there exists one control resource among the X1 control resources that is overlapping with the first resource pool in time domain, the first PUSCH is used to transmit ACK/NACK feedback for bit block(s) in the target bit block set; when each of the X1 control resources is orthogonal to the first resource pool in time domain, at most X2 PUCCH(s) among the X1 PUCCHs is(are) used to transmit HARQ-ACK feedback for the bit block(s) in the target bit block set, X2 being a positive integer less than X1.

The present disclosure provides a method in a first node for wireless communications, comprising:

receiving a first information group and a target bit block set, the first information group used to determine X1 control resources, X1 being a positive integer greater than 1, the target bit block set comprising at least one bit block; and transmitting HARQ-ACK feedback for bit block(s) in the target bit block set in at most one PUCCH of X1 PUCCHs; and transmitting a first PUSCH in a first resource pool, or, dropping transmitting the first PUSCH in the first resource pool;

herein, the X1 control resources are respectively reserved for the X1 PUCCHs, at least one of the X1 PUCCHs being a PUCCH for ACK-only feedback, and any bit block in the target bit block set comprises at least one bit; when there exists one control resource among the X1 control resources that is overlapping with the first resource pool in time domain, dropping transmitting the first PUSCH in the first resource pool; when each of the X1 control resources is orthogonal to the first resource pool in time domain, transmitting the first PUSCH in the first resource pool.

The present disclosure provides a first node for wireless communications, comprising:

a first receiver, receiving a first information group and a target bit block set, the first information group used to determine X1 control resources, X1 being a positive integer greater than 1, the target bit block set comprising at least one bit block; and a first transmitter, transmitting HARQ-ACK feedback for bit block(s) in the target bit block set in at most one PUCCH of X1 PUCCHs;

the first transmitter, transmitting a first PUSCH in a first resource pool, or, dropping transmitting the first PUSCH in the first resource pool;

herein, the X1 control resources are respectively reserved for the X1 PUCCHs, at least one of the X1 PUCCHs being a PUCCH for ACK-only feedback, and any bit block in the target bit block set comprises at least one bit; when there exists one control resource among the X1 control resources that is overlapping with the first resource pool in time domain, the first node does not transmit the first PUSCH in the first resource pool; when each of the X1 control resources is orthogonal to the first resource pool in time domain, the first node transmits the first PUSCH in the first resource pool.

In one embodiment, a problem to be solved by the present application includes: how to deal with the time-domain overlap between the X1 PUCCHs and PUSCHs.

In one embodiment, a problem to be solved by the present application includes: how to deal with the time-domain overlap between a PUCCH for ACK only and a PUSCH.

In one embodiment, an advantage of the above method includes: facilitating the consistency of the understanding between the communicating parties of the physical channel of the uplink being used for HARQ-ACK message transmission.

In one embodiment, an advantage of the above method includes: helping improve uplink transmission efficiency.

In one embodiment, an advantage of the above method includes: ensuring the flexibility in scheduling of the base station.

In one embodiment, an advantage of the above method includes: requiring less standardization effort for introducing ACK-only feedbacks.

In one embodiment, when there exists one resource among the X1 control resources that overlaps with the first resource pool in time domain, whether or not the control resource among the X1 control resources that overlaps with the first resource pool in time domain is used to transmit a PUCCH, the first node does not transmit the first PUSCH in the first resource pool.

In one embodiment, when at least one bit block in the target bit block set is correctly decoded: only one PUCCH of the X1 PUCCHs is used to transmit an ACK, and a decoding result of the bit block(s) in the target bit block set is used to determine which one of the X1 PUCCHs is used to transmit the ACK.

In one embodiment, when each of the bit block(s) in the target bit block set is not correctly decoded: the first node does not transmit HARQ-ACK feedback for the target bit block set in the X1 PUCCHs.

In one embodiment, when at least one bit block in the target bit block set is correctly decoded, the decoding result of the bit block(s) in the target bit block set is one of X1 different decoding results, the X1 different decoding results respectively corresponding to the X1 PUCCHs; a PUCCH corresponding to the decoding result of the bit block(s) in the target bit block set among the X1 PUCCHs is used to transmit an ACK.

In one embodiment, when at least one bit block in the target bit block set is correctly decoded: the decoding result of the bit block(s) in the target bit block set is one of X3 different decoding results, each of the X3 different decoding results corresponding to one of the X1 PUCCHs, X3 being no less than X1; a PUCCH corresponding to the decoding result of the bit block(s) in the target bit block set among the X1 PUCCHs is used to transmit HARQ-ACK feedback for the bit block(s) in the target bit block set.

In one subembodiment, when the decoding result of the bits block(s) in the target bit block set is one of X4 different decoding results, a PUCCH corresponding to the decoding result of the bits block(s) in the target bit block set among the X1 PUCCHs is used to transmit an ACK; when the decoding result of the bits block(s) in the target bit block set is not one of the X4 different decoding results, a PUCCH corresponding to the decoding result of the bits block(s) in the target bit block set among the X1 PUCCHs is used to transmit ACK/NACK feedback for the bit block(s) in the target bit block set; the X3 different decoding results include the X4 different decoding results, X4 being less than X3.

In one embodiment, a number of bit block(s) in the target bit block set is used to determine X1.

In one embodiment, both the ACK-only feedback and the ACK/NACK feedback in this application are the HARQ-ACK feedback.

In one embodiment, the ACK-only feedback, the NACK-only feedback and the ACK/NACK feedback in this application are the HARQ-ACK feedback.

In one embodiment, the ACK-only feedback is: ACK-only-including HARQ-ACK information.

In one embodiment, the ACK-only feedback is an ACK represented by a single HARQ-ACK bit.

In one embodiment, each of the X1 different decoding results is a possible decoding result jointly represented by K states, the K states in each of the X1 different decoding results denoting K bit blocks being correctly decoded or not correctly decoded, respectively; K being equal to the number of bit block(s) in the target bit block set.

In one subembodiment, at least one of the K states in each of the X1 different decoding results indicates that a corresponding bit block is correctly decoded.

In one embodiment, each of the X1 different decoding results is a possible decoding result jointly represented by K states, the K states in each of the X1 different decoding results denoting being correctly decoded or not being correctly decoded, respectively; K being equal to the number of bit block(s) in the target bit block set.

In one subembodiment, at least one of the K states in each of the X1 different decoding results indicates being correctly decoded.

In one embodiment, each of the X3 different decoding results is a possible decoding result jointly represented by K states, the K states in each of the X3 different decoding results denoting K bit blocks being correctly decoded or not correctly decoded, respectively; K being equal to the number of bit block(s) in the target bit block set.

In one subembodiment, at least one of the K states in each of the X3 different decoding results indicates that a corresponding bit block is correctly decoded.

In one embodiment, each of the X3 different decoding results is a possible decoding result jointly represented by K states, the K states in each of the X3 different decoding results denoting being correctly decoded or not being correctly decoded, respectively; K being equal to the number of bit block(s) in the target bit block set.

In one subembodiment, at least one of the K states in each of the X3 different decoding results indicates being correctly decoded.

In one embodiment, each of the X4 different decoding results is a possible decoding result jointly represented by K states, only one of the K states in each of the X4 different decoding results denoting a corresponding bit block being correctly decoded; K being equal to the number of bit block(s) in the target bit block set.

In one subembodiment, any state other than the only one state of the K states in each of the X4 different decoding results indicates that a corresponding bit block is not correctly decoded.

In one embodiment, each of the X4 different decoding results is a possible decoding result jointly represented by K states, only one of the K states in each of the X4 different decoding results denoting being correctly decoded; K being equal to the number of bit block(s) in the target bit block set.

In one subembodiment, any state other than the only one state of the K states in each of the X4 different decoding results indicates being not correctly decoded.

In one embodiment, the HARQ-ACK feedback for the bit block(s) in the target bit block set comprises: an ACK used to indicate that at least one bit block in the target bit block set is correctly received.

In one embodiment, the HARQ-ACK feedback for the bit block(s) in the target bit block set comprises: an ACK used to indicate that at least one bit block in the target bit block set is correctly received, or, alternatively, multiple ACKs/NACKs used to indicate whether or not the bit block(s) in the target bit block set is(are) correctly received.

For multiple NACK-only based HARQ-ACK feedbacks in a same PUCCH slot, a candidate way to handle them is to convert the multiple NACK-only based HARQ-ACK feedbacks into ACK/NACK HARQ-ACK feedbacks and multiplex them into a same PUCCH; how to determine the same PUCCH resources that are utilized for multiplexing is a key issue that has to be resolved, considering that the PUCCH for the NACK-only feedbacks may support transmitting only one HARQ-ACK bit.

To address the above problem, the present disclosure provides a solution. It should be noted that although only the HARQ-ACK feedback in uplink (UL) is taken as an example in the description above, the present disclosure is equally applicable to other scenarios such as Downlink (DL) and Sidelink (SL), where similar technical effects can be achieved. Additionally, the adoption of a unified solution for various scenarios, including but not limited to UL, DL and SL, contributes to the reduction of hardcore complexity and costs, or the enhancement of performance. It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

receiving a first signaling group; and transmitting a first bit block in a target PUCCH, the first bit block comprising at least one bit;

herein, resources occupied by the target PUCCH belong to a target resource pool; the first signaling group is used to determine a first resource pool and a reference mode, the reference mode being either of a first mode and a second mode, the first mode and the second mode being different HARQ-ACK feedback modes, respectively; when the reference mode is the first mode, which one of multiple resource pools is the target resource pool is related to a number of bit(s) in the first bit block, one of the multiple resource pools being default or configurable, the first resource pool being one of the multiple resource pools; when the reference mode is the second mode, the target resource pool is the first resource pool.

In one embodiment, a problem to be solved in the present disclosure includes: how the target resource pool is determined in different modes.

In one embodiment, a problem to be solved in the present disclosure includes: how to determine PUCCH resources based on different HARQ-ACK feedback modes.

In one embodiment, a problem to be solved in the present disclosure includes: how to determine PUCCH resource sets based on different HARQ-ACK feedback modes.

In one embodiment, characteristics of the above method include: when the reference mode is the first mode: determining which PUCCH resource to use to transmit the first bit block based on the number of bit(s) in the first bit block (e.g., 1 bit or 2 bits).

In one embodiment, characteristics of the above method include: when the reference mode is the first mode: determining in which PUCCH resource set a PUCCH resource is to be used to transmit the first bit block based on the number of bit(s) in the first bit block (e.g., 1 bit or 2 bits).

In one embodiment, characteristics of the above method include: when the reference mode is the first mode: a different PUCCH resource (or, a different PUCCH resource set) is selected for a different number of HARQ-ACK bits; and when the reference mode is the second mode, the same PUCCH resource (or, the same PUCCH resource set) is always used.

In one embodiment, characteristics of the above method include: when the reference mode is the first mode: a different PUCCH resource (or, a different PUCCH resource set) is selected for a different number (e.g., 1 or 2) of HARQ-ACK bits; and when the reference mode is the second mode, the same PUCCH resource (or, the same PUCCH resource set) is always used, regardless of the number of HARQ-ACK bits (1 or 2).

In one embodiment, characteristics of the above method include: the reference mode and the number of bit(s) in the first bit block are used together to determine the target resource pool.

In one embodiment, characteristics of the above method include: rationally selecting a PUCCH resource (or, a PUCCH resource set) based on the reference mode and the number of bit(s) in the first bit block.

In one embodiment, an advantage of the above method includes: ensuring that the erroneous scenario where a PUCCH resource (or, a PUCCH resource set) for NACK-only is selected for transmitting 2 HARQ-ACK bits does not occur.

In one embodiment, an advantage of the above method includes: being helpful in ensuring the correct selection of PUCCH resources (or, PUCCH resource sets).

In one embodiment, an advantage of the above method includes: ensuring the flexibility in scheduling of the base station.

In one embodiment, an advantage of the above method includes: helping improve uplink transmission efficiency.

In one embodiment, an advantage of the above method includes: requiring less standardization effort for newly introduced NACK-only feedbacks.

According to one aspect of the present disclosure, the above method is characterized in that, the first bit block comprises at least one HARQ-ACK bit denoting NACK.

According to one aspect of the present disclosure, the above method is characterized in that, the first bit block comprises at most 2 HARQ-ACK bits; when the reference mode is the first mode: when the first bit block comprises only 1 HARQ-ACK bit, the target resource pool is the first resource pool; when the first bit block comprises 2 HARQ-ACK bits, the target resource pool is one of the multiple resource pools other than the first resource pool.

According to one aspect of the present disclosure, the above method is characterized in that, the first bit block comprises at most 2 HARQ-ACK bits; when the reference mode is the first mode: when the first bit block comprises 2 HARQ-ACK bits, the target resource pool is the first resource pool; when the first bit block comprises only 1 HARQ-ACK bit, the target resource pool is one of the multiple resource pools other than the first resource pool.

According to one aspect of the present disclosure, the above method is characterized in that, the first mode is NACK-only feedback, while the second mode is ACK/NACK feedback.

According to one aspect of the present disclosure, the above method is characterized in comprising:

receiving first DCI;

herein, the first DCI comprises a first field, a value of the first field in the first DCI being equal to a third value, and an index of the target resource pool in a resource pool set to which the target resource pool belongs is related to the third value.

According to one aspect of the present disclosure, the above method is characterized in comprising:

receiving first DCI;

herein, the first DCI is used to determine PUCCH resources to which resources occupied by the target PUCCH belong from the target resource pool.

The present disclosure provides a method in a second node for wireless communications, comprising:

transmitting a first signaling group; and receiving a first bit block in a target PUCCH, the first bit block comprising at least one bit;

herein, resources occupied by the target PUCCH belong to a target resource pool; the first signaling group is used to determine a first resource pool and a reference mode, the reference mode being either of a first mode and a second mode, the first mode and the second mode being different HARQ-ACK feedback modes, respectively; when the reference mode is the first mode, which one of multiple resource pools is the target resource pool is related to a number of bit(s) in the first bit block, one of the multiple resource pools being default or configurable, the first resource pool being one of the multiple resource pools; when the reference mode is the second mode, the target resource pool is the first resource pool.

According to one aspect of the present disclosure, the above method is characterized in that, the first bit block comprises at least one HARQ-ACK bit denoting NACK.

According to one aspect of the present disclosure, the above method is characterized in that, the first bit block comprises at most 2 HARQ-ACK bits; when the reference mode is the first mode: when the first bit block comprises only 1 HARQ-ACK bit, the target resource pool is the first resource pool; when the first bit block comprises 2 HARQ-ACK bits, the target resource pool is one of the multiple resource pools other than the first resource pool.

According to one aspect of the present disclosure, the above method is characterized in that, the first bit block comprises at most 2 HARQ-ACK bits; when the reference mode is the first mode: when the first bit block comprises 2 HARQ-ACK bits, the target resource pool is the first resource pool; when the first bit block comprises only 1 HARQ-ACK bit, the target resource pool is one of the multiple resource pools other than the first resource pool.

According to one aspect of the present disclosure, the above method is characterized in that, the first mode is NACK-only feedback, while the second mode is ACK/NACK feedback.

According to one aspect of the present disclosure, the above method is characterized in comprising:

transmitting first DCI;

herein, the first DCI comprises a first field, a value of the first field in the first DCI being equal to a third value, and an index of the target resource pool in a resource pool set to which the target resource pool belongs is related to the third value.

According to one aspect of the present disclosure, the above method is characterized in comprising:

transmitting first DCI;

herein, the first DCI is used to determine PUCCH resources to which resources occupied by the target PUCCH belong from the target resource pool.

The present disclosure provides a first node for wireless communications, comprising:

a first receiver, receiving a first signaling group; and a first transmitter, transmitting a first bit block in a target PUCCH, the first bit block comprising at least one bit;

herein, resources occupied by the target PUCCH belong to a target resource pool; the first signaling group is used to determine a first resource pool and a reference mode, the reference mode being either of a first mode and a second mode, the first mode and the second mode being different HARQ-ACK feedback modes, respectively; when the reference mode is the first mode, which one of multiple resource pools is the target resource pool is related to a number of bit(s) in the first bit block, one of the multiple resource pools being default or configurable, the first resource pool being one of the multiple resource pools; when the reference mode is the second mode, the target resource pool is the first resource pool.

According to one aspect of the present disclosure, the above node is characterized in that, the first bit block comprises at least one HARQ-ACK bit denoting NACK.

According to one aspect of the present disclosure, the above node is characterized in that, the first bit block comprises at most 2 HARQ-ACK bits; when the reference mode is the first mode: when the first bit block comprises only 1 HARQ-ACK bit, the target resource pool is the first resource pool; when the first bit block comprises 2 HARQ-ACK bits, the target resource pool is one of the multiple resource pools other than the first resource pool.

According to one aspect of the present disclosure, the above node is characterized in that, the first bit block comprises at most 2 HARQ-ACK bits; when the reference mode is the first mode: when the first bit block comprises 2 HARQ-ACK bits, the target resource pool is the first resource pool; when the first bit block comprises only 1 HARQ-ACK bit, the target resource pool is one of the multiple resource pools other than the first resource pool.

According to one aspect of the present disclosure, the above node is characterized in that, the first mode is NACK-only feedback, while the second mode is ACK/NACK feedback.

According to one aspect of the present disclosure, the above node is characterized in comprising:

the first receiver, receiving first DCI;

herein, the first DCI comprises a first field, a value of the first field in the first DCI being equal to a third value, and an index of the target resource pool in a resource pool set to which the target resource pool belongs is related to the third value.

According to one aspect of the present disclosure, the above node is characterized in comprising:

the first receiver, receiving first DCI;

herein, the first DCI is used to determine PUCCH resources to which resources occupied by the target PUCCH belong from the target resource pool.

The present disclosure provides a second node for wireless communications, comprising:

a second transmitter, transmitting a first signaling group; and a second receiver, receiving a first bit block in a target PUCCH, the first bit block comprising at least one bit;

herein, resources occupied by the target PUCCH belong to a target resource pool; the first signaling group is used to determine a first resource pool and a reference mode, the reference mode being either of a first mode and a second mode, the first mode and the second mode being different HARQ-ACK feedback modes, respectively; when the reference mode is the first mode, which one of multiple resource pools is the target resource pool is related to a number of bit(s) in the first bit block, one of the multiple resource pools being default or configurable, the first resource pool being one of the multiple resource pools; when the reference mode is the second mode, the target resource pool is the first resource pool.

In one embodiment, the method in the present disclosure has the following advantages:

ensuring that the erroneous scenario where a NACK-only PUCCH resource (or, a PUCCH resource set) is selected for transmitting 2 HARQ-ACK bits does not occur;

being helpful in ensuring the correct selection of PUCCH resources (or, PUCCH resource sets);

helping to improve the uplink transmission efficiency;

helping to guarantee the flexibility of scheduling of the base station;

helping to enhance the system performance;

requiring less standardization effort for newly introduced NACK-only feedbacks.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
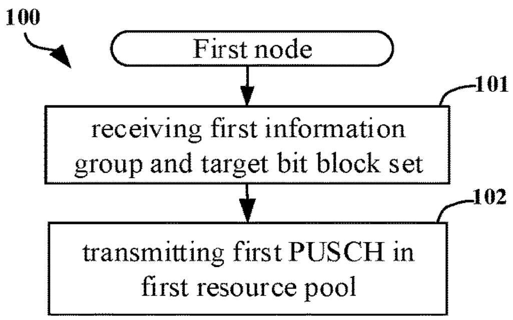
FIG. 1 illustrates a flowchart of processing of a first node according to one embodiment of the present disclosure.

Embodiment 1 illustrates a flowchart of processing of a first node according to one embodiment of the present disclosure, as shown in FIG. 1.

In Embodiment 1, the first node in the present disclosure receives a first information group and a target bit block set in step 101; and transmits a first PUSCH in a first resource pool in step 102.

In Embodiment 1, the first information group is used to determine X1 control resources, X1 being a positive integer greater than 1, the target bit block set comprising at least one bit block; the X1 control resources are respectively reserved for X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the first PUSCH is used to transmit ACK/NACK feedback for bit block(s) in the target bit block set; when each of the X1 control resources is orthogonal to the first resource pool in time domain, at most X2 PUCCH(s) among the X1 PUCCHs is(are) used to transmit HARQ-ACK feedback for the bit block(s) in the target bit block set, X2 being a positive integer less than X1.

In one embodiment, the first information group comprises at least one RRC signaling.

In one embodiment, each signaling in the first information group is an RRC signaling.

In one embodiment, the first information group comprises only one IE.

In one embodiment, the first information group comprises multiple IEs.

In one embodiment, the first information group comprises multiple PUCCH-Configs.

In one embodiment, the first information group comprises at least one RRC signaling and a DCI.

In one embodiment, a name of a piece of information in the first information group includes PUCCH-Config.

In one embodiment, a piece of information in the first information group includes PUCCH-Config.

In one embodiment, a name of a piece of information in the first information group includes SPS-PUCCH-AN.

In one embodiment, a piece of information in the first information group includes SPS-PUCCH-AN-List.

In one embodiment, a piece of information in the first information group is a physical layer signaling.

In one embodiment, a piece of information in the first information group is Downlink control information (DCI).

In one embodiment, a piece of information in the first information group is a DCI format.

In one embodiment, a piece of information in the first information group comprises one or more fields in a DCI.

In one embodiment, a piece of information in the first information group is a higher layer signaling.

In one embodiment, a piece of information in the first information group is an RRC signaling.

In one embodiment, a piece of information in the first information group comprises one or more fields in an RRC signaling.

In one embodiment, a piece of information in the first information group comprises one Information Element (IE).

In one embodiment, a piece of information in the first information group is an IE.

In one embodiment, a piece of information in the first information group comprises one or more fields in an IE.

In one embodiment, a piece of information in the first information group is a MAC CE signaling.

In one embodiment, a piece of information in the first information group comprises one or more fields in a MAC CE signaling.

In one embodiment, a piece of information in the first information group is a DownLink Grant Signaling.

In one embodiment, a piece of information in the first information group is an UpLink Grant Signaling.

In one embodiment, the target bit block set comprises multiple bit blocks.

In one embodiment, a bit block in the target bit block set comprises one Transport Block (TB).

In one embodiment, a bit block in the target bit block set is a Transport Block (TB).

In one embodiment, a bit block in the target bit block set consists of two Transport Blocks (TBs).

In one embodiment, a bit block in the target bit block set comprises one Code Block (CB).

In one embodiment, a bit block in the target bit block set comprises one Code Block Group (CBG).

In one embodiment, a bit block in the target bit block set is received in a Physical Downlink Shared Channel (PDSCH).

In one embodiment, a bit block in the target bit block set comprises one DCI.

In one embodiment, a bit block in the target bit block set is a DCI.

In one embodiment, a bit block in the target bit block set is received in a Physical downlink control channel (PDCCH).

In one embodiment, a piece of information in the first information group is used to indicate at least one of the X1 control resources.

In one embodiment, a piece of information in the first information group is used to explicitly indicate at least one of the X1 control resources.

In one embodiment, a piece of information in the first information group is used to implicitly indicate at least one of the X1 control resources.

In one embodiment, a piece of information in the first information group is used to configure at least one of the X1 control resources.

In one embodiment, a piece of information in the first information group is used to configure frequency-domain resources occupied by at least one of the X1 control resources.

In one embodiment, a piece of information in the first information group is used to configure time-domain resources occupied by at least one of the X1 control resources.

In one embodiment, the X1 control resources are configured in a same IE.

In one embodiment, the X1 control resources belong to a same PUCCH resource set.

In one embodiment, the X1 control resources belong to a same PUCCH resource set with pucch-ResourceSetId equal to 0.

In one embodiment, the X1 control resources respectively belong to X1 different PUCCH resource sets.

In one embodiment, two of the X1 control resources are configured respectively in different IEs.

In one embodiment, the X1 control resources are configured in a same PUCCH-Config.

In one embodiment, two of the X1 control resources are configured respectively in different PUCCH-Configs.

In one embodiment, the X1 control resources are configured for MBS.

In one embodiment, at least one of the X1 control resources is configured for MBS.

In one embodiment, at least one of the X1 control resources is configured for NACK-only feedback.

In one embodiment, at least one of the X1 PUCCHs is a PUCCH that is indicated to be for NACK-only feedback.

In one embodiment, at least one of the X1 PUCCHs is a PUCCH that is indicated by DCI to be for NACK-only feedback.

In one embodiment, at least one of the X1 PUCCHs is a PUCCH that is indicated by a Medium Access Control layer Control Element (MAC CE) signaling to be for NACK-only feedback.

In one embodiment, at least one of the X1 PUCCHs is a PUCCH that is configured to be for NACK-only feedback.

In one embodiment, at least one of the X1 PUCCHs is a PUCCH that is configured by an RRC signaling to be for NACK-only feedback.

In one embodiment, a control resource comprises a PUCCH resource.

In one embodiment, a control resource is a PUCCH resource.

In one embodiment, the control resources are resources reserved for physical control channels.

In one embodiment, a control resource comprises at least one Resource Element (RE) in time-frequency domain.

In one embodiment, X1 is no greater than 8.

In one embodiment, X1 is no greater than 32.

In one embodiment, X1 is no greater than 128.

In one embodiment, X1 is no greater than 1024.

In one embodiment, the first resource pool is reserved for transmission of the first PUSCH.

In one embodiment, the first resource pool is resources occupied by the first PUSCH.

In one embodiment, in terms of time-frequency domain, the first resource pool is time-frequency resources occupied by the first PUSCH.

In one embodiment, the first resource pool comprises multiple REs in time-frequency domain.

In one embodiment, an RE occupies a multicarrier symbol in time domain, and a subcarrier in frequency domain.

In one embodiment, the multicarrier symbol in the present disclosure is an Orthogonal Frequency Division Multiplexing (OFDM) Symbol.

In one embodiment, the multicarrier symbol in the present disclosure is a Single Carrier-Frequency Division Multiple Access (SC-FDMA) symbol.

In one embodiment, the multicarrier symbol in the present disclosure is a Discrete Fourier Transform Spread OFDM (DFT-S-OFDM) symbol.

In one embodiment, the multicarrier symbol in the present disclosure is a Filter Bank Multi Carrier (FBMC) symbol.

In one embodiment, the multicarrier symbol in the present disclosure comprises a Cyclic Prefix (CP).

In one embodiment, the first resource pool is indicated by a DCI received by the first node.

In one embodiment, the meaning of the statement transmitting a first PUSCH in a first resource pool in the present disclosure includes: performing signal transmission in a first PUSCH, a first resource pool comprising resources occupied by the first PUSCH.

In one embodiment, the meaning of the statement transmitting a first PUSCH in a first resource pool in the present disclosure includes: transmitting at least one bit block on a first PUSCH in a first resource pool.

In one embodiment, the meaning of the statement transmitting a first PUSCH in a first resource pool in the present disclosure includes: transmitting a first bit block in a first PUSCH, a first resource pool comprising resources occupied by the first PUSCH.

In one subembodiment, the first bit block comprises one TB.

In one subembodiment, the first bit block comprises a UL-SCH.

In one subembodiment, the first bit block comprises Channel State Information (CSI).

In one embodiment, the first bit block has been through at least Cyclic Redundancy Check (CRC) attachment, Code Block Segmentation, Code Block CRC attachment, Channel Coding, Rate Matching and Code Block Concatenation, Scrambling, and Modulation and Resource Block Mapping before being transmitted.

In one embodiment, the first bit block has been through at least CRC attachment, Channel Coding and Rate Matching, Scrambling, and Modulation and Resource Block Mapping before being transmitted.

In one embodiment, the first bit block has been through at least CRC attachment, Code Block Segmentation, Code Block CRC attachment, Channel Coding, Rate Matching and Code Block Concatenation, Scrambling, Modulation, Layer Mapping, Antenna Port Mapping and Resource Block Mapping before being transmitted.

In one embodiment, the first bit block has been through at least CRC attachment, Channel Coding and Rate Matching, Scrambling, Modulation, Layer Mapping, Antenna Port Mapping and Resource Block Mapping before being transmitted.

In one embodiment, the first bit block has been through at least Channel Coding, Scrambling, Modulation, Layer Mapping and Resource Block Mapping before being transmitted.

In one embodiment, all or partial output by the first bit block after being through at least part of CRC attachment, Code Block Segmentation, Code Block CRC attachment, Channel Coding, Rate Matching, Code Block Concatenation, Scrambling, Modulation, Spreading, Layer Mapping, Precoding, Mapping to Physical Resources, Multicarrier Symbol Generation, and Modulation and Upconversion is transmitted in the first PUSCH.

In one embodiment, when each of the X1 control resources is orthogonal to the first resource pool in time domain: the first PUSCH is used to transmit the first bit block.

In one embodiment, when each of the X1 control resources is orthogonal to the first resource pool in time domain: the first PUSCH is used to transmit only the latter of ACK/NACK feedback for the bit block(s) in the target bit block set and the first bit block.

In one embodiment, when there exists one control resource among the X1 control resources that is overlapping with the first resource pool in time domain: the first PUSCH is used to transmit ACK/NACK feedback for the bit block(s) in the target bit block set and the first bit block.

In one embodiment, when there exists one control resource among the X1 control resources that is overlapping with the first resource pool in time domain: the ACK/NACK feedback for the bit block(s) in the target bit block set has been through at least Cyclic Redundancy Check (CRC) attachment, Code Block Segmentation, Code Block CRC attachment, Channel Coding, Rate Matching and Code Block Concatenation, Scrambling, and Modulation and Resource Block Mapping before being transmitted.

In one embodiment, when there exists one control resource among the X1 control resources that is overlapping with the first resource pool in time domain: the ACK/NACK feedback for the bit block(s) in the target bit block set has been through at least Channel Coding, Rate Matching and Code Block Concatenation, Scrambling, and Modulation and Resource Block Mapping before being transmitted.

In one embodiment, when there exists one control resource among the X1 control resources that is overlapping with the first resource pool in time domain: the ACK/NACK feedback for the bit block(s) in the target bit block set has been through at least Channel Coding, Scrambling, and Modulation, Layer Mapping and Resource Block Mapping before being transmitted.

In one embodiment, when there exists one control resource among the X1 control resources that is overlapping with the first resource pool in time domain: all or partial output by the ACK/NACK feedback for the bit block(s) in the target bit block set after being through at least part of CRC attachment, Code Block Segmentation, Code Block CRC attachment, Channel Coding, Rate Matching, Code Block Concatenation, Scrambling, Modulation, Spreading, Layer Mapping, Precoding, Mapping to Physical Resources, Multicarrier Symbol Generation, and Modulation and Upconversion is transmitted in the first PUSCH.

In one embodiment, the ACK/NACK feedback is: HARQ-ACK information including an ACK or a NACK.

In one embodiment, the target bit block set comprises K bit blocks, the ACK/NACK feedback for the bit block(s) in the target bit block set is represented by K HARQ-ACK bits, the K HARQ-ACK bits being used to indicate whether or not the K bit blocks are correctly decoded, respectively; K being a positive integer.

In one embodiment, the NACK-only feedback is: NACK-only-including HARQ-ACK information.

In one embodiment, the NACK-only feedback is a NACK represented by a single HARQ-ACK bit.

In one embodiment, the HARQ-ACK bit is a HARQ-ACK information bit.

In one embodiment, the HARQ-ACK bit is a bit used to indicate HARQ-ACK information.

In one embodiment, the X1 control resources are respectively PUCCH resources reserved for the X1 PUCCHs.

In one embodiment, the HARQ-ACK feedback includes: HARQ-ACK information.

In one embodiment, both the NACK-only feedback and the ACK/NACK feedback in this application are the HARQ-ACK feedback.

In one embodiment, a PUCCH for NACK-only feedback cannot be used for ACK/NACK feedback.

In one embodiment, a PUCCH for NACK-only feedback can only be used to transmit NACKs.

In one embodiment, a PUCCH for NACK-only feedback can only be used to transmit HARQ-ACK bit(s) that indicates/indicate a NACK.

In one embodiment, a PUCCH for NACK-only feedback can only be used to transmit only one HARQ-ACK bit that indicates a NACK.

In one embodiment, the meaning of the statement being overlapping in time domain includes: occupying at least one same multicarrier symbol.

In one embodiment, the meaning of the statement being orthogonal in time domain includes: being non-overlapped in time domain.

In one embodiment, the meaning of the statement being orthogonal in time domain includes: occupying completely different time-domain resources.

In one embodiment, X2 is equal to 1.

In one embodiment, X1 is greater than 2, and X2 is equal to 2.

In one embodiment, X2 is equal to X1 minus 1.

In one embodiment, X1 is greater than 2; when each of the X1 control resources is orthogonal to the first resource pool in time domain: when at least one bit block in the target bit block set is not correctly decoded: only 2 PUCCHs of the X1 PUCCHs are used to transmit a NACK.

In one embodiment, X1 is greater than 2; when each of the X1 control resources is orthogonal to the first resource pool in time domain: when at least one bit block in the target bit block set is not correctly decoded: only X1-1 PUCCH(s) of the X1 PUCCHs is/are used to transmit a NACK.

In one embodiment, the X1 control resources are orthogonal in time domain to any PUSCH or PUCCH or PRACH or SRS other than the first PUSCH.

In one embodiment, the first resource pool is orthogonal in time domain to PUCCHs, PUSCHs, PRACHs, and SRSs other than the X1 PUCCHs.

In one embodiment, the HARQ-ACK feedback for the bit block(s) in the target bit block set comprises: a NACK used to indicate that at least one bit block in the target bit block set is not correctly received.

In one embodiment, the HARQ-ACK feedback for the bit block(s) in the target bit block set comprises: NACK(s) used to indicate that at least one bit block in the target bit block set is not correctly received, or, alternatively, ACKs/NACKs used to indicate whether or not the bit block(s) in the target bit block set is(are) correctly received.

In one embodiment, the HARQ-ACK feedback for the bit block(s) in the target bit block set comprises: a NACK used to indicate that at least one bit block in the target bit block set is not correctly received, or, alternatively, multiple ACKs/NACKs used to indicate whether or not the bit block(s) in the target bit block set is(are) correctly received.

In one embodiment, the HARQ-ACK feedback for the bit block(s) in the target bit block set comprises: at least one HARQ-ACK bit generated for at least one bit block in the target bit block set.

In one embodiment, when each of the X1 control resources is orthogonal to the first resource pool in time domain: when at least one bit block in the target bit block set is not correctly decoded: only one PUCCH of the X1 PUCCHs is used to transmit NACK-only feedback, and a decoding result of the bit block(s) in the target bit block set is used to determine which one of the X1 PUCCHs is used to transmit the NACK-only feedback.

In one embodiment, at least one bit block in the target bit block set is not correctly decoded, and the decoding result of the bit block(s) in the target bit block set is one of X1 different decoding results, the X1 different decoding results respectively corresponding to the X1 PUCCHs; when each of the X1 control resources is orthogonal to the first resource pool in time domain: a PUCCH corresponding to the decoding result of the bit block(s) in the target bit block set among the X1 PUCCHs is used to transmit NACK-only feedback.

In one embodiment, there are two of the X1 control resources being overlapping in time domain.

In one embodiment, any two of the X1 control resources are orthogonal in time domain.

In one embodiment, there are two of the X1 control resources being orthogonal in time domain.

In one embodiment, there are two of the X1 control resources respectively occupying different time-domain resources.

In one embodiment, only one bit block in the target bit block set is not correctly decoded.

In one embodiment, the scheme in this application is applicable to scenarios in which the timeline conditions that need to be met for the HARQ-ACK bits to be multiplexed are met.

In one embodiment, the first PUSCH and the X1 PUCCHs correspond to a same priority index.

In one embodiment, when each of the X1 control resources is orthogonal to the first resource pool in time domain and at least one bit block in the target bit block set is not correctly decoded, only one PUCCH of the X1 PUCCHs is used to transmit the HARQ-ACK feedback for the bit block(s) in the target bit block set, and a decoding result of the bit block(s) in the target bit block set is used to determine which one of the X1 PUCCHs is used to transmit the HARQ-ACK feedback for the bit block(s) in the target bit block set.

In one embodiment, when each of the X1 control resources is orthogonal to the first resource pool in time domain: in terms of time domain, a PUCCH of the X1 PUCCHs that is used to transmit the HARQ-ACK feedback for the bit block(s) in the target bit block set is after the first PUSCH.

In one embodiment, when each of the X1 control resources is orthogonal to the first resource pool in time domain: in terms of time domain, a PUCCH of the X1 PUCCHs that is used to transmit the HARQ-ACK feedback for the bit block(s) in the target bit block set is before the first PUSCH.

In one embodiment, when each of the X1 control resources is orthogonal to the first resource pool in time domain: in terms of time domain, at least one of the X1 PUCCHs that is(are) used to transmit the HARQ-ACK feedback for the bit block(s) in the target bit block set is(are) after the first PUSCH.

In one embodiment, when each of the X1 control resources is orthogonal to the first resource pool in time domain: in terms of time domain, at least one of the X1 PUCCHs that is(are) used to transmit the HARQ-ACK feedback for the bit block(s) in the target bit block set is(are) before the first PUSCH.

Embodiment 2

Figure 2:
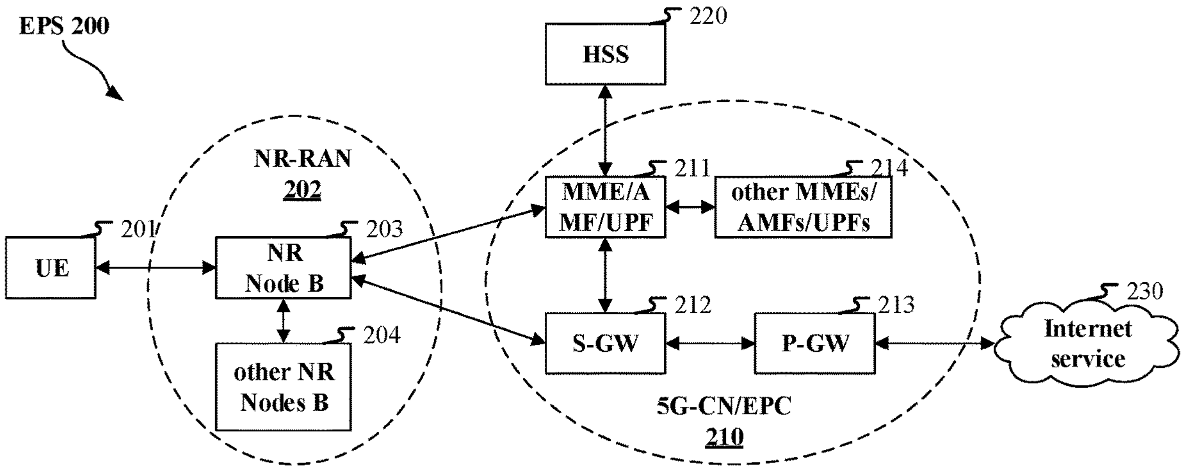
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other suitable terminology. The EPS 200 may comprise one or more UEs 201, an NG-RAN 202, a Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 corresponds to the second node in the present disclosure.

In one embodiment, the gNB 203 corresponds to the first node in the present disclosure.

In one embodiment, the gNB 203 corresponds to the second node in the present disclosure.

In one embodiment, the UE 201 corresponds to the first node in the present disclosure, and the gNB 203 corresponds to the second node in the present disclosure.

In one embodiment, the gNB 203 is a MacroCellular base station.

In one embodiment, the gNB 203 is a Micro Cell base station.

In one embodiment, the gNB 203 is a PicoCell base station.

In one embodiment, the gNB 203 is a Femtocell.

In one embodiment, the gNB 203 is a base station supporting large time-delay difference.

In one embodiment, the gNB 203 is a flight platform.

In one embodiment, the gNB 203 is satellite equipment.

In one embodiment, the first node and the second node in the present disclosure both correspond to the UE 201, for instance, V2X communications is performed between the first node and the second node.

Embodiment 3

Figure 3:
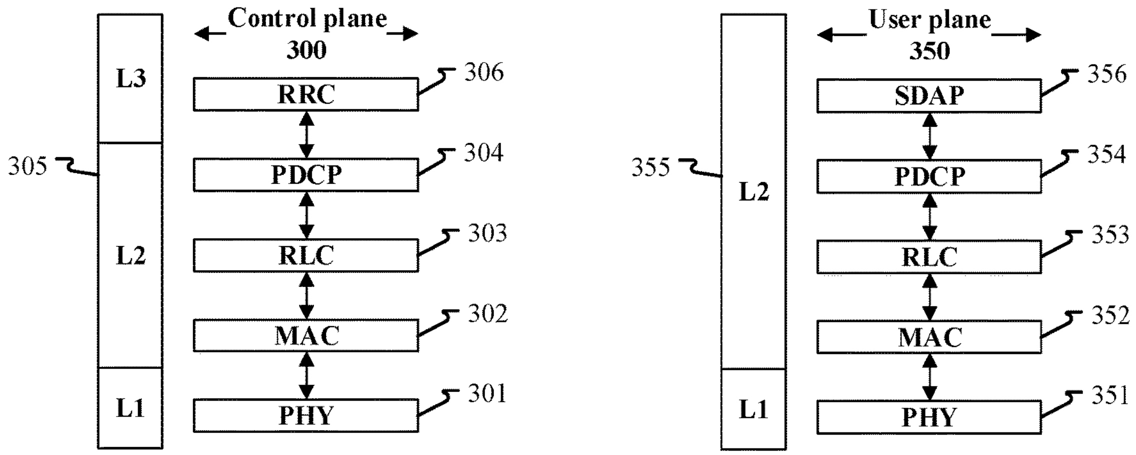
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are L1, L2 and L3. The layer 1 (L1) is the lowest layer which performs signal processing functions of various PHY layers. The L1 is called PHY 301 in the present disclosure. The layer 2 (L2) 305 is above the PHY 301, and is in charge of the link between a first communication node and a second communication node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service DataAdaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, a piece of information in the first information group in the present disclosure is generated by the RRC sublayer 306.

In one embodiment, a piece of information in the first information group in the present disclosure is generated by the MAC sublayer 302.

In one embodiment, a piece of information in the first information group in the present disclosure is generated by the MAC sublayer 352.

In one embodiment, a piece of information in the first information group in the present disclosure is generated by the PHY 301.

In one embodiment, a piece of information in the first information group in the present disclosure is generated by the PHY 351.

In one embodiment, a bit block in the target bit block set in the present disclosure is generated by the SDAP sublayer 356.

In one embodiment, a bit block in the target bit block set in the present disclosure is generated by the RRC sublayer 306.

In one embodiment, a bit block in the target bit block set in the present disclosure is generated by the MAC sublayer 302.

In one embodiment, a bit block in the target bit block set in the present disclosure is generated by the MAC sublayer 352.

In one embodiment, a bit block in the target bit block set in the present disclosure is generated by the PHY 301.

In one embodiment, a bit block in the target bit block set in the present disclosure is generated by the PHY 351.

In one embodiment, the first bit block in the present disclosure is generated by the SDAP sublayer 356.

In one embodiment, the first bit block in the present disclosure is generated by the RRC sublayer 306.

In one embodiment, the first bit block in the present disclosure is generated by the MAC sublayer 302.

In one embodiment, the first bit block in the present disclosure is generated by the MAC sublayer 352.

In one embodiment, the first bit block in the present disclosure is generated by the PHY 301.

In one embodiment, the first bit block in the present disclosure is generated by the PHY 351.

In one embodiment, a signaling in the first signaling group in the present disclosure is generated by the RRC sublayer 306.

In one embodiment, a signaling in the first signaling group in the present disclosure is generated by the MAC sublayer 302.

In one embodiment, a signaling in the first signaling group in the present disclosure is generated by the MAC sublayer 352.

In one embodiment, a signaling in the first signaling group in the present disclosure is generated by the PHY 301.

In one embodiment, a signaling in the first signaling group in the present disclosure is generated by the PHY 351.

In one embodiment, the first DCI in the present disclosure is generated by the PHY 301.

In one embodiment, the first DCI in the present disclosure is generated by the PHY 351.

Embodiment 4

Figure 4:
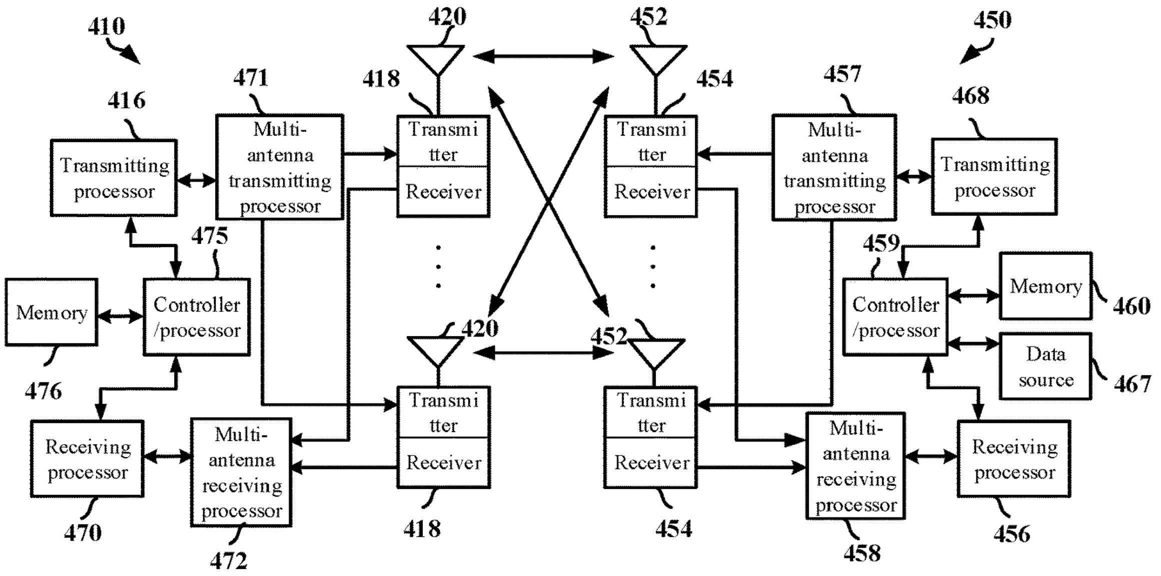
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In the transmission from the first communication device 410 to the second communication device 450, the controller/processor 475 provides header compression, encryption, packet segmentation and reordering, and multiplexing between a logical channel and a transport channel, and radio resource allocation of the second communication device 450 based on various priorities. The controller/processor 475 is also responsible for a retransmission of a lost packet, and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multi-carrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication node 410 to the second communication node 450, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also in charge of a retransmission of a lost packet and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 firstly converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment, the first node is a UE, and the second node is a UE.

In one subembodiment, the first node is a UE, and the second node is a relay node.

In one subembodiment, the first node is a relay node, and the second node is a UE.

In one subembodiment, the first node is a UE, and the second node is a base station.

In one subembodiment, the first node is a relay node, and the second node is a base station.

In one subembodiment, the second node is a UE, and the first node is a base station.

In one subembodiment, the second node is a relay node, and the first node is a base station.

In one subembodiment, the second communication device 450 comprises: at least one controller/processor; the at least one controller/processor is in charge of HARQ operation.

In one subembodiment, the first communication device 410 comprises: at least one controller/processor; the at least one controller/processor is in charge of HARQ operation.

In one subembodiment, the first communication device 410 comprises: at least one controller/processor; the at least one controller/processor is in charge of error detections using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first information group and a target bit block set, the first information group used to determine X1 control resources, X1 being a positive integer greater than 1, the target bit block set comprising at least one bit block; and transmits a first PUSCH in a first resource pool; herein, the X1 control resources are respectively reserved for X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the first PUSCH is used to transmit ACK/NACK feedback for bit block(s) in the target bit block set; when each of the X1 control resources is orthogonal to the first resource pool in time domain, at most X2 PUCCH(s) among the X1 PUCCHs is(are) used to transmit HARQ-ACK feedback for the bit block(s) in the target bit block set, X2 being a positive integer less than X1.

In one subembodiment, the second communication device 450 corresponds to the first node in the present disclosure.

In one embodiment, the second communication device 450 comprises a memory that stores computer readable instruction program, the computer readable instruction program generates actions when executed by at least one processor, which include: receiving a first information group and a target bit block set, the first information group used to determine X1 control resources, X1 being a positive integer greater than 1, the target bit block set comprising at least one bit block; and transmitting a first PUSCH in a first resource pool; herein, the X1 control resources are respectively reserved for X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the first PUSCH is used to transmit ACK/NACK feedback for bit block(s) in the target bit block set; when each of the X1 control resources is orthogonal to the first resource pool in time domain, at most X2 PUCCH(s) among the X1 PUCCHs is(are) used to transmit HARQ-ACK feedback for the bit block(s) in the target bit block set, X2 being a positive integer less than X1.

In one subembodiment, the second communication device 450 corresponds to the first node in the present disclosure.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first signaling; and transmits a first information group and a target bit block set, the first information group used to determine X1 control resources, X1 being a positive integer greater than 1, the target bit block set comprising at least one bit block; and receives a first PUSCH in a first resource pool; herein, the X1 control resources are respectively reserved for X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, receiving ACK/NACK feedback for bit block(s) in the target bit block set in the first PUSCH; when each of the X1 control resources is orthogonal to the first resource pool in time domain, performing signal detection in at least one PUCCH among the X1 PUCCHs.

In one subembodiment, the first communication device 410 corresponds to the second node in the present disclosure.

In one embodiment, the first communication device 410 comprises a memory that stores computer readable instruction program, the computer readable instruction program generates actions when executed by at least one processor, which include: transmitting a first signaling; and transmitting a first information group and a target bit block set, the first information group used to determine X1 control resources, X1 being a positive integer greater than 1, the target bit block set comprising at least one bit block; and receiving a first PUSCH in a first resource pool; herein, the X1 control resources are respectively reserved for X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, receiving ACK/NACK feedback for bit block(s) in the target bit block set in the first PUSCH; when each of the X1 control resources is orthogonal to the first resource pool in time domain, performing signal detection in at least one PUCCH among the X1 PUCCHs.

In one subembodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used for receiving the first information group in the present disclosure.

In one embodiment, at least one of the antenna 420, the transmitter 418, the multi-antenna transmitting processor 471, the transmitting processor 416, the controller/processor 475 or the memory 476 is used for transmitting the first information group in the present disclosure.

In one embodiment, at least one of the antenna 452, the receiver 454, the multi-antenna receiving processor 458, the receiving processor 456, the controller/processor 459, the memory 460, or the data source 467 is used for receiving the target bit block set in the present disclosure.

In one embodiment, at least one of the antenna 420, the transmitter 418, the multi-antenna transmitting processor 471, the transmitting processor 416, the controller/processor 475 or the memory 476 is used for transmitting the target bit block set in the present disclosure.

In one embodiment, at least one of the antenna 452, the transmitter 454, the multi-antenna transmitting processor 458, the transmitting processor 468, the controller/processor 459, the memory 460, or the data source 467 is used for transmitting the first PUSCH in the present disclosure in the first resource pool in the present disclosure.

In one embodiment, at least one of the antenna 420, the receiver 418, the multi-antenna receiving processor 472, the receiving processor 470, the controller/processor 475 or the memory 476 is used for receiving the first PUSCH in the present disclosure in the first resource pool in the present disclosure.

In one embodiment, at least one of the antenna 452, the transmitter 454, the multi-antenna transmitting processor 458, the transmitting processor 468, the controller/processor 459, the memory 460 or the data source 467 is used for transmitting the HARQ-ACK feedback for the bit block(s) in the target bit block set in the present disclosure.

In one embodiment, at least one of the antenna 420, the receiver 418, the multi-antenna receiving processor 472, the receiving processor 470, the controller/processor 475, or the memory 476 is used for performing signal detection in at least one PUCCH among the X1 PUCCHs in the present disclosure.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first information group and a target bit block set, the first information group used to determine X1 control resources, X1 being a positive integer greater than 1, the target bit block set comprising at least one bit block; transmits HARQ-ACK feedback for bit block(s) in the target bit block set in at most X2 PUCCH(s) among X1 PUCCHs, X2 being a positive integer less than X1; and transmits a first PUSCH in a first resource pool, or, does not transmit the first PUSCH in the first resource pool; herein, the X1 control resources are respectively reserved for the X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, dropping transmitting the first PUSCH in the first resource pool; when each of the X1 control resources is orthogonal to the first resource pool in time domain, transmitting the first PUSCH in the first resource pool.

In one subembodiment, the second communication device 450 corresponds to the first node in the present disclosure.

In one embodiment, the second communication device 450 comprises a memory that stores computer readable instruction program, the computer readable instruction program generates actions when executed by at least one processor, which include: receiving a first information group and a target bit block set, the first information group used to determine X1 control resources, X1 being a positive integer greater than 1, the target bit block set comprising at least one bit block; transmitting HARQ-ACK feedback for bit block(s) in the target bit block set in at most X2 PUCCH(s) among X1 PUCCHs, X2 being a positive integer less than X1; and transmitting a first PUSCH in a first resource pool, or, dropping transmitting the first PUSCH in the first resource pool; herein, the X1 control resources are respectively reserved for the X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, dropping transmitting the first PUSCH in the first resource pool; when each of the X1 control resources is orthogonal to the first resource pool in time domain, transmitting the first PUSCH in the first resource pool.

In one subembodiment, the second communication device 450 corresponds to the first node in the present disclosure.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first information group and a target bit block set, the first information group used to determine X1 control resources, X1 being a positive integer greater than 1, the target bit block set comprising at least one bit block; performs signal detection in at least one PUCCH of X1 PUCCHs; and receives a first PUSCH in a first resource pool, or, drops receiving the first PUSCH in the first resource pool; herein, the X1 control resources are respectively reserved for the X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, dropping receiving the first PUSCH in the first resource pool; when each of the X1 control resources is orthogonal to the first resource pool in time domain, receiving the first PUSCH in the first resource pool.

In one subembodiment, the first communication device 410 corresponds to the second node in the present disclosure.

In one embodiment, the first communication device 410 comprises a memory that stores computer readable instruction program, the computer readable instruction program generates actions when executed by at least one processor, which include: transmitting a first information group and a target bit block set, the first information group used to determine X1 control resources, X1 being a positive integer greater than 1, the target bit block set comprising at least one bit block; performing signal detection in at least one PUCCH of X1 PUCCHs; and receiving a first PUSCH in a first resource pool, or, dropping receiving the first PUSCH in the first resource pool; herein, the X1 control resources are respectively reserved for the X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, dropping receiving the first PUSCH in the first resource pool; when each of the X1 control resources is orthogonal to the first resource pool in time domain, receiving the first PUSCH in the first resource pool.

In one subembodiment, the first communication device 410 corresponds to the second node in the present disclosure.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first information group and a target bit block set, the first information group used to determine X1 control resources, X1 being a positive integer greater than 1, the target bit block set comprising at least one bit block; and transmits a first PUSCH in a first resource pool; herein, the X1 control resources are respectively reserved for X1 PUCCHs, at least one of the X1 PUCCHs being a PUCCH for ACK-only feedback, and any bit block in the target bit block set comprises at least one bit; when there exists one control resource among the X1 control resources that is overlapping with the first resource pool in time domain, the first PUSCH is used to transmit ACK/NACK feedback for bit block(s) in the target bit block set; when each of the X1 control resources is orthogonal to the first resource pool in time domain, at most X2 PUCCH(s) among the X1 PUCCHs is(are) used to transmit HARQ-ACK feedback for the bit block(s) in the target bit block set, X2 being a positive integer less than X1.

In one subembodiment, the second communication device 450 corresponds to the first node in the present disclosure.

In one embodiment, the second communication device 450 comprises a memory that stores computer readable instruction program, the computer readable instruction program generates actions when executed by at least one processor, which include: receiving a first information group and a target bit block set, the first information group used to determine X1 control resources, X1 being a positive integer greater than 1, the target bit block set comprising at least one bit block; and transmitting a first PUSCH in a first resource pool; herein, the X1 control resources are respectively reserved for X1 PUCCHs, at least one of the X1 PUCCHs being a PUCCH for ACK-only feedback, and any bit block in the target bit block set comprises at least one bit; when there exists one control resource among the X1 control resources that is overlapping with the first resource pool in time domain, the first PUSCH is used to transmit ACK/NACK feedback for bit block(s) in the target bit block set; when each of the X1 control resources is orthogonal to the first resource pool in time domain, at most X2 PUCCH(s) among the X1 PUCCHs is(are) used to transmit HARQ-ACK feedback for the bit block(s) in the target bit block set, X2 being a positive integer less than X1.

In one subembodiment, the second communication device 450 corresponds to the first node in the present disclosure.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first information group and a target bit block set, the first information group used to determine X1 control resources, X1 being a positive integer greater than 1, the target bit block set comprising at least one bit block; transmits HARQ-ACK feedback for bit block(s) in the target bit block set in at most one PUCCH of X1 PUCCHs; and transmits a first PUSCH in a first resource pool, or, does not transmit the first PUSCH in the first resource pool; herein, the X1 control resources are respectively reserved for the X1 PUCCHs, at least one of the X1 PUCCHs being a PUCCH for ACK-only feedback, and any bit block in the target bit block set comprises at least one bit; when there exists one control resource among the X1 control resources that is overlapping with the first resource pool in time domain, dropping transmitting the first PUSCH in the first resource pool; when each of the X1 control resources is orthogonal to the first resource pool in time domain, transmitting the first PUSCH in the first resource pool.

In one subembodiment, the second communication device 450 corresponds to the first node in the present disclosure.

In one embodiment, the second communication device 450 comprises a memory that stores computer readable instruction program, the computer readable instruction program generates actions when executed by at least one processor, which include: receiving a first information group and a target bit block set, the first information group used to determine X1 control resources, X1 being a positive integer greater than 1, the target bit block set comprising at least one bit block; transmitting HARQ-ACK feedback for bit block(s) in the target bit block set in at most one PUCCH of X1 PUCCHs; and transmitting a first PUSCH in a first resource pool, or, dropping transmitting the first PUSCH in the first resource pool; herein, the X1 control resources are respectively reserved for the X1 PUCCHs, at least one of the X1 PUCCHs being a PUCCH for ACK-only feedback, and any bit block in the target bit block set comprises at least one bit; when there exists one control resource among the X1 control resources that is overlapping with the first resource pool in time domain, dropping transmitting the first PUSCH in the first resource pool; when each of the X1 control resources is orthogonal to the first resource pool in time domain, transmitting the first PUSCH in the first resource pool.

In one subembodiment, the second communication device 450 corresponds to the first node in the present disclosure.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first signaling group; and transmits a first bit block in a target PUCCH, the first bit block comprising at least one bit; herein, resources occupied by the target PUCCH belong to a target resource pool; the first signaling group is used to determine a first resource pool and a reference mode, the reference mode being either of a first mode and a second mode, the first mode and the second mode being different HARQ-ACK feedback modes, respectively; when the reference mode is the first mode, which one of multiple resource pools is the target resource pool is related to a number of bit(s) in the first bit block, one of the multiple resource pools being default or configurable, the first resource pool being one of the multiple resource pools; when the reference mode is the second mode, the target resource pool is the first resource pool.

In one subembodiment, the second communication device 450 corresponds to the first node in the present disclosure.

In one embodiment, the second communication device 450 comprises a memory that stores computer readable instruction program, the computer readable instruction program generates actions when executed by at least one processor, which include: receiving a first signaling group; and transmitting a first bit block in a target PUCCH, the first bit block comprising at least one bit; herein, resources occupied by the target PUCCH belong to a target resource pool; the first signaling group is used to determine a first resource pool and a reference mode, the reference mode being either of a first mode and a second mode, the first mode and the second mode being different HARQ-ACK feedback modes, respectively; when the reference mode is the first mode, which one of multiple resource pools is the target resource pool is related to a number of bit(s) in the first bit block, one of the multiple resource pools being default or configurable, the first resource pool being one of the multiple resource pools; when the reference mode is the second mode, the target resource pool is the first resource pool.

In one subembodiment, the second communication device 450 corresponds to the first node in the present disclosure.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first signaling group; and receives a first bit block in a target PUCCH, the first bit block comprising at least one bit; herein, resources occupied by the target PUCCH belong to a target resource pool; the first signaling group is used to determine a first resource pool and a reference mode, the reference mode being either of a first mode and a second mode, the first mode and the second mode being different HARQ-ACK feedback modes, respectively; when the reference mode is the first mode, which one of multiple resource pools is the target resource pool is related to a number of bit(s) in the first bit block, one of the multiple resource pools being default or configurable, the first resource pool being one of the multiple resource pools; when the reference mode is the second mode, the target resource pool is the first resource pool.

In one subembodiment, the first communication device 410 corresponds to the second node in the present disclosure.

In one embodiment, the first communication device 410 comprises a memory that stores computer readable instruction program, the computer readable instruction program generates actions when executed by at least one processor, which include: transmitting a first signaling group; and receiving a first bit block in a target PUCCH, the first bit block comprising at least one bit; herein, resources occupied by the target PUCCH belong to a target resource pool; the first signaling group is used to determine a first resource pool and a reference mode, the reference mode being either of a first mode and a second mode, the first mode and the second mode being different HARQ-ACK feedback modes, respectively; when the reference mode is the first mode, which one of multiple resource pools is the target resource pool is related to a number of bit(s) in the first bit block, one of the multiple resource pools being default or configurable, the first resource pool being one of the multiple resource pools; when the reference mode is the second mode, the target resource pool is the first resource pool.

In one subembodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used for receiving the first signaling group in the present disclosure.

In one embodiment, at least one of the antenna 420, the transmitter 418, the multi-antenna transmitting processor 471, the transmitting processor 416, the controller/processor 475 or the memory 476 is used for transmitting the first signaling group in the present disclosure.

In one embodiment, at least one of the antenna 452, the receiver 454, the multi-antenna receiving processor 458, the receiving processor 456, the controller/processor 459, the memory 460, or the data source 467 is used for receiving the first DCI in the present disclosure.

In one embodiment, at least one of the antenna 420, the transmitter 418, the multi-antenna transmitting processor 471, the transmitting processor 416, the controller/processor 475 or the memory 476 is used for transmitting the first DCI in the present disclosure.

In one embodiment, at least one of the antenna 452, the transmitter 454, the multi-antenna transmitting processor 458, the transmitting processor 468, the controller/processor 459, the memory 460, or the data source 467 is used for transmitting the first bit block in the present disclosure in the target PUCCH in the present disclosure.

In one embodiment, at least one of the antenna 420, the receiver 418, the multi-antenna receiving processor 472, the receiving processor 470, the controller/processor 475 or the memory 476 is used for receiving the first bit block in the present disclosure in the target PUCCH in the present disclosure.

Embodiment 5

Figure 5:
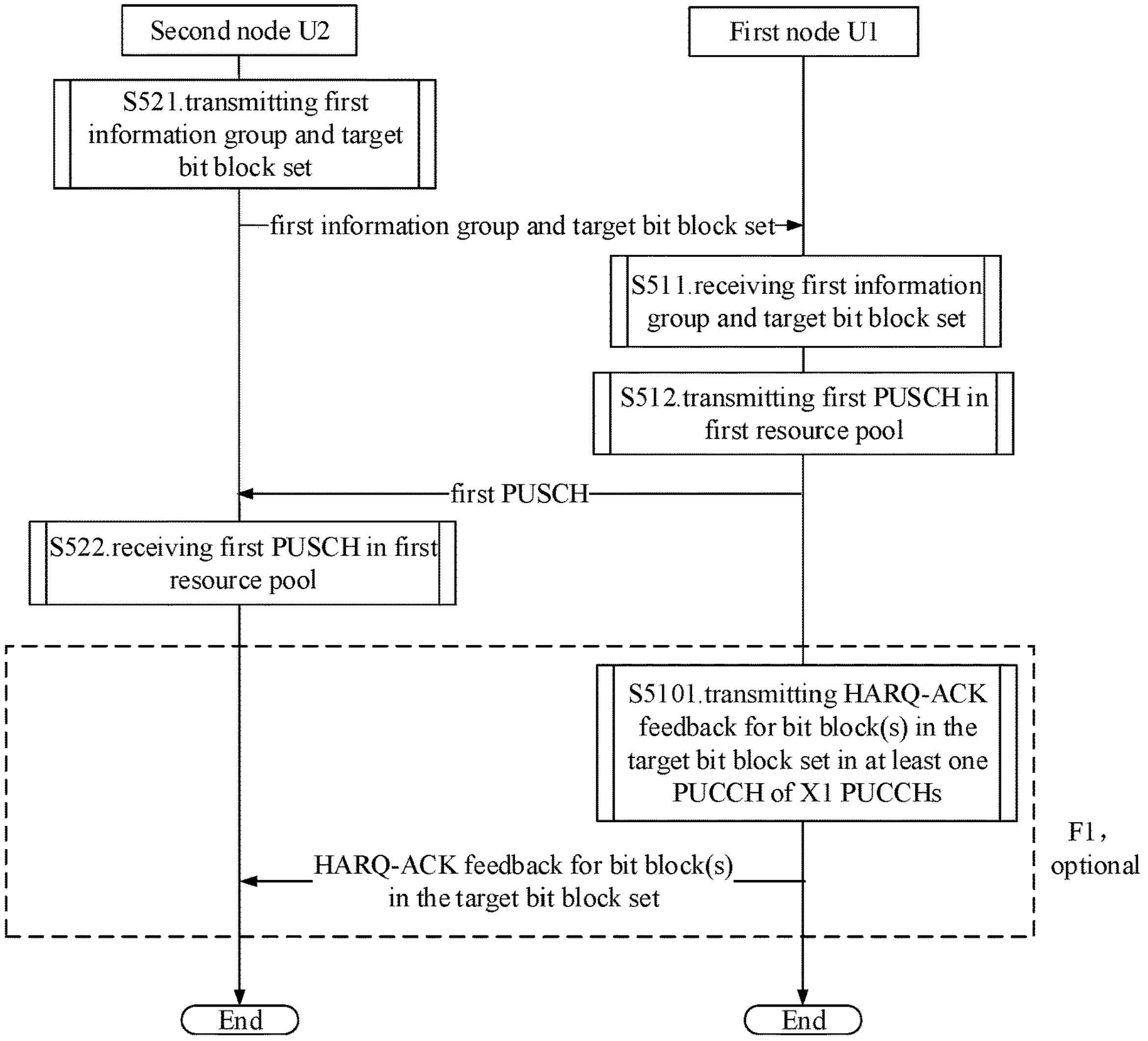
FIG. 5 illustrates a flowchart of signal transmission according to one embodiment of the present disclosure.

Embodiment 5 illustrates a flowchart of signal transmission according to one embodiment of the present disclosure, as shown in FIG. 5. In FIG. 5, a first node U1 and a second node U2 are in communications via an air interface. In FIG. 5, steps marked by the dotted-line frame box F1 are optional. Particularly, in FIG. 5, the order between the step pair {S512, S522} and the step S5101 does not imply a particular time sequence.

The first node U1 receives a first information group and a target bit block set in step S511; and transmits a first PUSCH in a first resource pool in step S512; and transmits HARQ-ACK feedback for bit block(s) in the target bit block set in at least one PUCCH of X1 PUCCHs in step S5101.

The second node U2 transmits a first information group and a target bit block set in step S521; and receives a first PUSCH in a first resource pool in step S522.

In Embodiment 5, the first information group is used to determine X1 control resources, X1 being a positive integer greater than 1, the target bit block set comprising at least one bit block; the X1 control resources are respectively reserved for X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the first PUSCH is used to transmit ACK/NACK feedback for bit block(s) in the target bit block set; when each of the X1 control resources is orthogonal to the first resource pool in time domain, at most X2 PUCCH(s) among the X1 PUCCHs is(are) used to transmit HARQ-ACK feedback for the bit block(s) in the target bit block set, X2 being a positive integer less than X1.

In one subembodiment of Embodiment 5, when each of the X1 control resources is orthogonal to the first resource pool in time domain: {when at least one bit block in the target bit block set is not correctly decoded, only one PUCCH of the X1 PUCCHs is used to transmit a NACK, the decoding result of the bit block(s) in the target bit block set is one of X1 different decoding results, the X1 different decoding results respectively corresponding to the X1 PUCCHs; a PUCCH corresponding to the decoding result of the bit block(s) in the target bit block set among the X1 PUCCHs is used to transmit a NACK; when each of the bit block(s) in the target bit block set is correctly decoded, the first node U1 does not transmit HARQ-ACK feedback for the target bit block set in the X1 PUCCHs}.

In one subembodiment of Embodiment 5, when each of the X1 control resources is orthogonal to the first resource pool in time domain and each of the bit block(s) in the target bit block set is correctly decoded, the first node U1 does not transmit HARQ-ACK feedback for the target bit block set in the X1 PUCCHs; when each of the X1 control resources is orthogonal to the first resource pool in time domain and at least one bit block in the target bit block set is not correctly decoded: {the decoding result of the bit block(s) in the target bit block set is one of X3 different decoding results, each of the X3 different decoding results corresponding to one of the X1 PUCCHs, X3 being no less than X1; when the decoding result of the bits block(s) in the target bit block set is one of X4 different decoding results, a PUCCH corresponding to the decoding result of the bits block(s) in the target bit block set among the X1 PUCCHs is used to transmit a NACK; when the decoding result of the bits block(s) in the target bit block set is not one of the X4 different decoding results, a PUCCH corresponding to the decoding result of the bits block(s) in the target bit block set among the X1 PUCCHs is used to transmit ACK/NACK feedback for the bit block(s) in the target bit block set; the X3 different decoding results include the X4 different decoding results, X4 being less than X3}.

In one subembodiment of Embodiment 5, a number of bit block(s) in the target bit block set is used to determine X1.

In one embodiment, the first node U1 is the first node in the present disclosure.

In one embodiment, the second node U2 is the second node in the present disclosure.

In one embodiment, the first node U1 is a UE.

In one embodiment, the first node U1 is a base station.

In one embodiment, the second node U2 is a base station.

In one embodiment, the second node U2 is a UE.

In one embodiment, an air interface between the second node U2 and the first node U1 is a Uu interface.

In one embodiment, an air interface between the second node U2 and the first node U1 includes a cellular link.

In one embodiment, an air interface between the second node U2 and the first node U1 is a PC5 interface.

In one embodiment, an air interface between the second node U2 and the first node U1 includes a sidelink.

In one embodiment, an air interface between the second node U2 and the first node U1 includes a radio interface between a base station and a UE.

In one embodiment, an air interface between the second node U2 and the first node U1 includes a radio interface between a UE and another UE.

In one embodiment, the decoding result of bit block(s) in the target bit block set in the present application is the result obtained by the first node performing decoding for the bit block(s) in the target bit block set.

In one embodiment, in terms of time domain, the step pair {S512, S522} precedes the step S5101.

In one embodiment, in terms of time domain, the step pair {S512, S522} is after the step S5101.

In one embodiment, steps marked by the dotted-line box F1 exist.

In one embodiment, steps marked by the dotted-line box F1 do not exist.

In one embodiment, when each of the X1 control resources is orthogonal to the first resource pool in time domain: when at least one bit block in the target bit block set is not correctly decoded: the steps in the dotted-line box F1 exist.

In one embodiment, when each of the X1 control resources is orthogonal to the first resource pool in time domain: when each of the bit block(s) in the target bit block set is correctly decoded: the steps in the dotted-line box F1 don't exist.

In one embodiment, when there exists one control resource among the X1 control resources that is overlapping with the first resource pool in time domain: the steps in the dotted-line box F1 don't exist.

Embodiment 6

Figure 6:
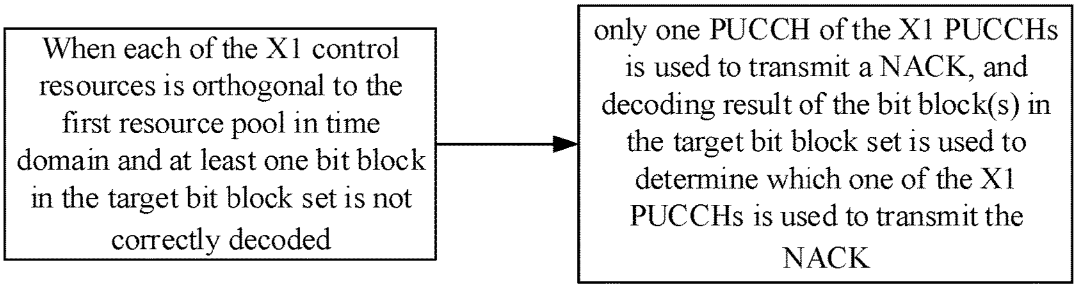
FIG. 6 illustrates a schematic diagram illustrating the first node processing the HARQ-ACK feedback for the bit block(s) in the target bit block set according to one embodiment of the present disclosure.

Embodiment 6 illustrates a schematic diagram illustrating the first node processing the HARQ-ACK feedback for the bit block(s) in the target bit block set according to one embodiment of the present disclosure, as shown in FIG. 6.

In Embodiment 6, when each of the X1 control resources is orthogonal to the first resource pool in time domain and at least one bit block in the target bit block set is not correctly decoded: only one PUCCH of the X1 PUCCHs is used to transmit a NACK, and a decoding result of the bit block(s) in the target bit block set is used to determine which one of the X1 PUCCHs is used to transmit the NACK.

In one embodiment, each of the X1 PUCCHs is a PUCCH for NACK-only feedback.

In one embodiment, the target bit block set comprises 2 bit blocks; the decoding result of the bit block(s) in the target bit block set is: one of {a first bit block in the target bit block set is correctly decoded, a second bit block in target bit block set is correctly decoded}, {a first bit block in the target bit block set is not correctly decoded, a second bit block in target bit block set is correctly decoded}, {a first bit block in the target bit block set is correctly decoded, a second bit block in target bit block set is not correctly decoded}, and {a first bit block in the target bit block set is not correctly decoded, a second bit block in target bit block set is not correctly decoded}.

In one embodiment, the target bit block set comprises 2 bit blocks; the decoding result of the bit block(s) in the target bit block set is: one of {a first bit block in the target bit block set is not correctly decoded, a second bit block in target bit block set is correctly decoded}, {a first bit block in the target bit block set is correctly decoded, a second bit block in target bit block set is not correctly decoded}, and {a first bit block in the target bit block set is not correctly decoded, a second bit block in target bit block set is not correctly decoded}.

In one embodiment, the target bit block set comprises 3 bit blocks; the decoding result of the bit block(s) in the target bit block set is: one of {a first bit block in the target bit block set is correctly decoded, a second bit block in target bit block set is correctly decoded, a third bit block in target bit block set is correctly decoded}, {a first bit block in the target bit block set is correctly decoded, a second bit block in target bit block set is correctly decoded, a third bit block in target bit block set is not correctly decoded}, {a first bit block in the target bit block set is correctly decoded, a second bit block in target bit block set is not correctly decoded, a third bit block in target bit block set is correctly decoded}, {a first bit block in the target bit block set is correctly decoded, a second bit block in target bit block set is not correctly decoded, a third bit block in target bit block set is not correctly decoded}, {a first bit block in the target bit block set is not correctly decoded, a second bit block in target bit block set is correctly decoded, a third bit block in target bit block set is correctly decoded}, {a first bit block in the target bit block set is not correctly decoded, a second bit block in target bit block set is correctly decoded, a third bit block in target bit block set is not correctly decoded}, {a first bit block in the target bit block set is not correctly decoded, a second bit block in target bit block set is not correctly decoded, a third bit block in target bit block set is correctly decoded}, and {a first bit block in the target bit block set is not correctly decoded, a second bit block in target bit block set is not correctly decoded, a third bit block in target bit block set is not correctly decoded}.

In one embodiment, the target bit block set comprises 3 bit blocks; the decoding result of the bit block(s) in the target bit block set is: one of {a first bit block in the target bit block set is correctly decoded, a second bit block in target bit block set is correctly decoded, a third bit block in target bit block set is not correctly decoded}, {a first bit block in the target bit block set is correctly decoded, a second bit block in target bit block set is not correctly decoded, a third bit block in target bit block set is correctly decoded}, {a first bit block in the target bit block set is correctly decoded, a second bit block in target bit block set is not correctly decoded, a third bit block in target bit block set is not correctly decoded}, {a first bit block in the target bit block set is not correctly decoded, a second bit block in target bit block set is correctly decoded, a third bit block in target bit block set is correctly decoded}, {a first bit block in the target bit block set is not correctly decoded, a second bit block in target bit block set is correctly decoded, a third bit block in target bit block set is not correctly decoded}, {a first bit block in the target bit block set is not correctly decoded, a second bit block in target bit block set is not correctly decoded, a third bit block in target bit block set is correctly decoded}, and {a first bit block in the target bit block set is not correctly decoded, a second bit block in target bit block set is not correctly decoded, a third bit block in target bit block set is not correctly decoded}.

In one embodiment, the target bit block set comprises K bit blocks; the decoding result of the bit block(s) in the target bit block set is used to indicate whether each of the K bit blocks is correctly decoded; K being a positive integer greater than 1.

In one embodiment, the target bit block set comprises K bit blocks, K HARQ-ACK states (ACK or NACK) respectively indicating whether the K bit blocks are correctly decoded; the decoding result of the bit block(s) in the target bit block set consists of a union of the K HARQ-ACK states; K being a positive integer greater than 1.

In one embodiment, the meaning of the statement of being used to transmit a NACK includes: being used to transmit only one HARQ-ACK bit indicating a NACK.

In one embodiment, the meaning of the statement of being used to transmit a NACK includes: being used to transmit NACK-only-including HARQ-ACK information.

In one embodiment, the meaning of the statement of being used to transmit a NACK includes: being used to transmit NACK-only-including HARQ-ACK information for the bit block(s) in the target bit block set.

In one embodiment, the meaning of the statement of being used to transmit a NACK includes: being used to transmit NACK-only-including HARQ-ACK information used to indicate that at least one bit block in the target bit block set is not correctly received In one embodiment, the meaning of the statement of being used to transmit a NACK includes: being used to transmit a NACK used to indicate that at least one bit block in the target bit block set is not correctly received In one embodiment, the meaning of the statement of being used to transmit a NACK includes: being used to transmit a sequence generated by a HARQ-ACK bit indicating a NACK.

In one embodiment, in this application the meaning of a PUCCH used to transmit a NACK means that: a sequence generated by a HARQ-ACK bit indicating a NACK is mapped to a physical resource occupied by the PUCCH.

In one embodiment, the meaning of the statement in the present disclosure that only one PUCCH of the X1 PUCCHs is used to transmit a NACK means that: only one PUCCH of the X1 PUCCHs is used to transmit a NACK, and the first node does not transmit HARQ-ACK feedback for the bit block(s) in the target bit block set in any PUCCH other than the only one PUCCH among the X1 PUCCHs.

In one embodiment, the meaning of the statement in the present disclosure that only one PUCCH of the X1 PUCCHs is used to transmit a NACK means that: only one PUCCH of the X1 PUCCHs is used to transmit a NACK, and the first node does not transmit signals in any PUCCH other than the only one PUCCH among the X1 PUCCHs.

In one embodiment, the meaning of the statement in the present disclosure that a decoding result of the bit block(s) in the target bit block set is used to determine which one of the X1 PUCCHs is used to transmit the NACK means that: the decoding result of the bit block(s) in the target bit block set is one of X1 different decoding results, the X1 different decoding results respectively corresponding to the X1 PUCCHs; a PUCCH corresponding to the decoding result of the bit block(s) in the target bit block set among the X1 PUCCHs is used to transmit the NACK.

In one embodiment, the meaning of the statement in the present disclosure that a decoding result of the bit block(s) in the target bit block set is used to determine which one of the X1 PUCCHs is used to transmit the NACK means that: the decoding result of the bit block(s) in the target bit block set is used to indicate which one of the X1 PUCCHs is used to transmit the NACK.

In one embodiment, the meaning of the statement in the present disclosure that a decoding result of the bit block(s) in the target bit block set is used to determine which one of the X1 PUCCHs is used to transmit the NACK means that: the decoding result of the bit block(s) in the target bit block set is used to implicitly indicate which one of the X1 PUCCHs is used to transmit the NACK.

Embodiment 7

Figure 7:
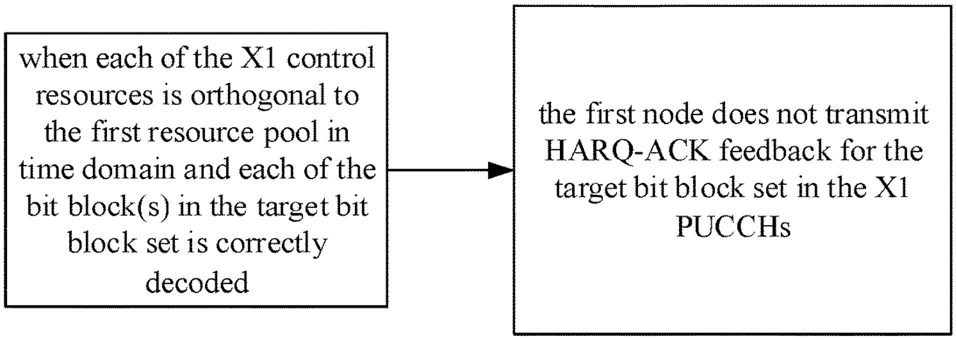
FIG. 7 illustrates a schematic diagram illustrating the first node processing the HARQ-ACK feedback for the bit block(s) in the target bit block set according to one embodiment of the present disclosure.

Embodiment 7 illustrates a schematic diagram illustrating the first node processing the HARQ-ACK feedback for the bit block(s) in the target bit block set according to one embodiment of the present disclosure, as shown in FIG. 7.

In Embodiment 7, when each of the X1 control resources is orthogonal to the first resource pool in time domain and each of the bit block(s) in the target bit block set is correctly decoded: the first node does not transmit HARQ-ACK feedback for the target bit block set in the X1 PUCCHs.

In one embodiment, the statement in the present disclosure that the first node does not transmit HARQ-ACK feedback for the target bit block set in the X1 PUCCHs means that: none of the X1 PUCCHs is used to transmit the HARQ-ACK feedback for the target bit block set.

In one embodiment, the statement in the present disclosure that the first node does not transmit HARQ-ACK feedback for the target bit block set in the X1 PUCCHs means that: the first node drops signal transmitting in the X1 PUCCHs.

In one embodiment, the statement in the present disclosure that the first node does not transmit HARQ-ACK feedback for the target bit block set in the X1 PUCCHs means that: the first node does not transmit the HARQ-ACK feedback for the target bit block set in any of the X1 PUCCHs.

In one embodiment, the statement in the present disclosure that the first node does not transmit HARQ-ACK feedback for the target bit block set in the X1 PUCCHs means that: the first node does not transmit the HARQ-ACK feedback for bit block(s) in the target bit block set in the X1 PUCCHs.

In one embodiment, the statement in the present disclosure that the first node does not transmit HARQ-ACK feedback for the target bit block set in the X1 PUCCHs means that: the first node does not transmit the HARQ-ACK feedback for any bit block in the target bit block set in the X1 PUCCHs.

Embodiment 8

Figure 8:
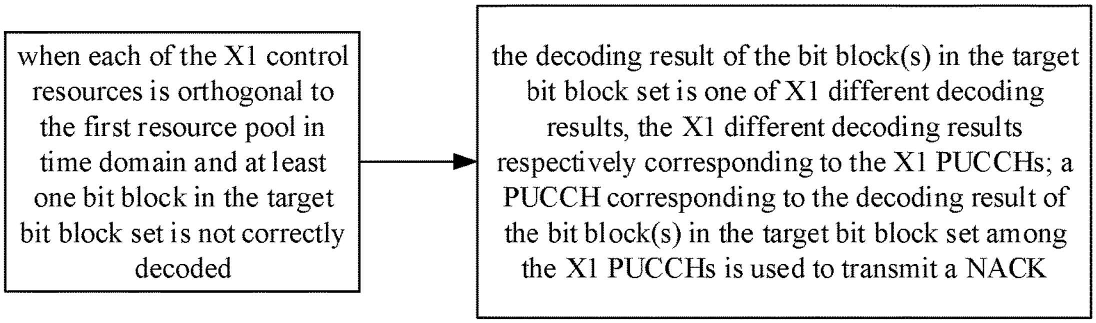
FIG. 8 illustrates a schematic diagram illustrating the first node processing the HARQ-ACK feedback for the bit block(s) in the target bit block set according to one embodiment of the present disclosure.

Embodiment 8 illustrates a schematic diagram illustrating the first node processing the HARQ-ACK feedback for the bit block(s) in the target bit block set according to one embodiment of the present disclosure, as shown in FIG. 8.

In Embodiment 8, when each of the X1 control resources is orthogonal to the first resource pool in time domain and at least one bit block in the target bit block set is not correctly decoded: the decoding result of the bit block(s) in the target bit block set is one of X1 different decoding results, the X1 different decoding results respectively corresponding to the X1 PUCCHs; a PUCCH corresponding to the decoding result of the bit block(s) in the target bit block set among the X1 PUCCHs is used to transmit a NACK.

In one embodiment, the X1 different decoding results refer to: X1 different decoding results that may occur by performing decoding for the bit block(s) in the target bit block set.

In one embodiment, the decoding result of the bit block(s) in the target bit block set refers to: the decoding result actually obtained after performing decoding for the bit block(s) in the target bit block set.

In one embodiment, in any of the X1 different decoding results: at least one bit block in the target bit block set is not correctly decoded.

In one embodiment, each of the X1 different decoding results is denoted by ACK or NACK.

In one embodiment, X1 is equal to 3, the X1 different decoding results being respectively denoted by {ACK, NACK}, {NACK, ACK}, and {NACK, NACK}.

In one embodiment, X1 is equal to 7, the X1 different decoding results being respectively denoted by {ACK, ACK, NACK}, {ACK, NACK, ACK}, {ACK, NACK, NACK}, {NACK, ACK, NACK}, {NACK, NACK, ACK}, {NACK, NACK, NACK}, and {NACK, ACK, ACK}.

In one embodiment, the target bit block set comprises 2 bit blocks; X1 is equal to 3, the X1 different decoding results respectively being {a first bit block in the target bit block set is not correctly decoded, a second bit block in target bit block set is correctly decoded}, {a first bit block in the target bit block set is correctly decoded, a second bit block in target bit block set is not correctly decoded}, and {a first bit block in the target bit block set is not correctly decoded, a second bit block in target bit block set is not correctly decoded}.

In one embodiment, the target bit block set comprises 2 bit blocks; X1 is less than 3, any of the X1 different decoding results being one of {a first bit block in the target bit block set is not correctly decoded, a second bit block in target bit block set is correctly decoded}, {a first bit block in the target bit block set is correctly decoded, a second bit block in target bit block set is not correctly decoded}, and {a first bit block in the target bit block set is not correctly decoded, a second bit block in target bit block set is not correctly decoded}.

In one embodiment, the target bit block set comprises 3 bit blocks; X1 is equal to 7, the X1 different decoding results respectively being {a first bit block in the target bit block set is correctly decoded, a second bit block in target bit block set is correctly decoded, a third bit block in target bit block set is not correctly decoded}, {a first bit block in the target bit block set is correctly decoded, a second bit block in target bit block set is not correctly decoded, a third bit block in target bit block set is correctly decoded}, {a first bit block in the target bit block set is correctly decoded, a second bit block in target bit block set is not correctly decoded, a third bit block in target bit block set is not correctly decoded}, {a first bit block in the target bit block set is not correctly decoded, a second bit block in target bit block set is correctly decoded, a third bit block in target bit block set is correctly decoded}, {a first bit block in the target bit block set is not correctly decoded, a second bit block in target bit block set is correctly decoded, a third bit block in target bit block set is not correctly decoded}, {a first bit block in the target bit block set is not correctly decoded, a second bit block in target bit block set is not correctly decoded, a third bit block in target bit block set is correctly decoded}, and {a first bit block in the target bit block set is not correctly decoded, a second bit block in target bit block set is not correctly decoded, a third bit block in target bit block set is not correctly decoded}.

In one embodiment, the target bit block set comprises 3 bit blocks; X1 is less than 7, any of the X1 different decoding results being one of {a first bit block in the target bit block set is correctly decoded, a second bit block in target bit block set is correctly decoded, a third bit block in target bit block set is not correctly decoded}, {a first bit block in the target bit block set is correctly decoded, a second bit block in target bit block set is not correctly decoded, a third bit block in target bit block set is correctly decoded}, {a first bit block in the target bit block set is correctly decoded, a second bit block in target bit block set is not correctly decoded, a third bit block in target bit block set is not correctly decoded}, {a first bit block in the target bit block set is not correctly decoded, a second bit block in target bit block set is correctly decoded, a third bit block in target bit block set is correctly decoded}, {a first bit block in the target bit block set is not correctly decoded, a second bit block in target bit block set is correctly decoded, a third bit block in target bit block set is not correctly decoded}, {a first bit block in the target bit block set is not correctly decoded, a second bit block in target bit block set is not correctly decoded, a third bit block in target bit block set is correctly decoded}, and {a first bit block in the target bit block set is not correctly decoded, a second bit block in target bit block set is not correctly decoded, a third bit block in target bit block set is not correctly decoded}.

In one embodiment, the target bit block set comprises K bit blocks; each of the X1 different decoding results is a decoding result jointly indicated by K ACKs/NACKs; a decoding result of the bit block(s) in the target bit block set is one of the X1 different decoding results, and the K ACKs/NACKs are respectively used to indicate whether the K bit blocks in the target bit block set are correctly decoded.

In one embodiment, each of the X1 different decoding results is a possible decoding result jointly represented by K states, the K states in each of the X1 different decoding results denoting K bit blocks being correctly decoded or not correctly decoded, respectively; K being equal to the number of bit block(s) in the target bit block set.

In one subembodiment, at least one of the K states in each of the X1 different decoding results indicates that a corresponding bit block is not correctly decoded.

In one embodiment, each of the X1 different decoding results is a possible decoding result jointly represented by K states, the K states in each of the X1 different decoding results denoting being correctly decoded or not being correctly decoded, respectively; K being equal to the number of bit block(s) in the target bit block set.

In one subembodiment, at least one of the K states in each of the X1 different decoding results indicates being not correctly decoded.

In one embodiment, RRC signaling is used to configure a correspondence between the X1 different decoding results and the X1 PUCCHs.

In one embodiment, the rule of correspondence between the X1 different decoding results and the X1 PUCCHs is pre-defined.

In one embodiment, the rule of correspondence between the X1 different decoding results and the X1 PUCCHs is pre-defined by standard.

In one embodiment, the X1 different decoding results respectively correspond to the X1 PUCCHs by means of a look-up table.

In one embodiment, the rule of correspondence between the X1 different decoding results and the X1 PUCCHs is pre-defined by standard.

In one embodiment, the statement of the X1 different decoding results respectively corresponding to the X1 PUCCHs in the present disclosure means that the X1 different decoding results are respectively mapped to the X1 PUCCHs.

In one embodiment, the X1 different decoding results are respectively mapped to the X1 PUCCHs by means of a look-up table.

In one embodiment, the X1 different decoding results are respectively mapped to the X1 PUCCHs based on the configuration of higher layer signaling.

In one embodiment, the X1 different decoding results are respectively mapped to the X1 PUCCHs based on the configuration of RRC signaling.

In one embodiment, the X1 different decoding results are respectively mapped to the X1 PUCCHs based on the indication of MAC CE signaling.

In one embodiment, the X1 different decoding results are respectively mapped to the X1 PUCCHs based on default mapping rules.

In one embodiment, the statement of the X1 different decoding results respectively corresponding to the X1 PUCCHs in the present disclosure means that the X1 different decoding results are respectively mapped to the X1 control resources.

In one embodiment, the X1 different decoding results are respectively mapped to the X1 control resources by means of a look-up table.

In one embodiment, the X1 different decoding results are respectively mapped to the X1 control resources based on the configuration of higher layer signaling.

In one embodiment, the X1 different decoding results are respectively mapped to the X1 control resources based on the configuration of RRC signaling.

In one embodiment, the X1 different decoding results are respectively mapped to the X1 control resources based on the indication of MAC CE signaling.

In one embodiment, the X1 different decoding results are respectively mapped to the X1 control resources based on default mapping rules.

Embodiment 9

Figure 9:
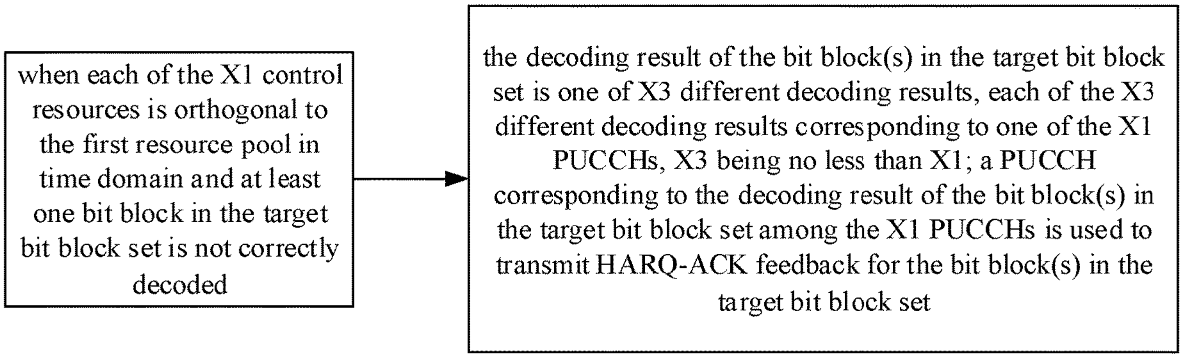
FIG. 9 illustrates a schematic diagram illustrating the first node processing the HARQ-ACK feedback for the bit block(s) in the target bit block set according to one embodiment of the present disclosure.

Embodiment 9 illustrates a schematic diagram illustrating the first node processing the HARQ-ACK feedback for the bit block(s) in the target bit block set according to one embodiment of the present disclosure, as shown in FIG. 9.

In Embodiment 9, when each of the X1 control resources is orthogonal to the first resource pool in time domain and at least one bit block in the target bit block set is not correctly decoded: the decoding result of the bit block(s) in the target bit block set is one of X3 different decoding results, each of the X3 different decoding results corresponding to one of the X1 PUCCHs, X3 being no less than X1; a PUCCH corresponding to the decoding result of the bit block(s) in the target bit block set among the X1 PUCCHs is used to transmit HARQ-ACK feedback for the bit block(s) in the target bit block set.

In one embodiment, the X3 different decoding results refer to: X3 different decoding results that may occur by performing decoding for the bit block(s) in the target bit block set.

In one embodiment, the decoding result of the bit block(s) in the target bit block set refers to: the decoding result actually obtained after performing decoding for the bit block(s) in the target bit block set.

In one embodiment, in any of the X3 different decoding results: at least one bit block in the target bit block set is not correctly decoded.

In one embodiment, each of the X3 different decoding results is denoted by ACK or NACK.

In one embodiment, there exist multiple decoding results among the X3 different decoding results corresponding to a same PUCCH among the X1 PUCCHs.

In one embodiment, at least one bit block in the target bit block set is not correctly decoded, the decoding result of the bit block(s) in the target bit block set is one of X3 different decoding results, each of the X3 different decoding results corresponding to one of the X1 PUCCHs, X3 being no less than X1; when each of the X1 control resources is orthogonal to the first resource pool in time domain: when the decoding result of the bits block(s) in the target bit block set is one of X4 different decoding results, a PUCCH corresponding to the decoding result of the bits block(s) in the target bit block set among the X1 PUCCHs is used to transmit NACK-only feedback; when the decoding result of the bits block(s) in the target bit block set is not one of the X4 different decoding results, a PUCCH corresponding to the decoding result of the bits block(s) in the target bit block set among the X1 PUCCHs is used to transmit ACK/NACK feedback for the bit block(s) in the target bit block set; the X3 different decoding results include the X4 different decoding results, X4 being less than X3.

In one embodiment, each of the X3 different decoding results is a possible decoding result jointly represented by K states, the K states in each of the X3 different decoding results denoting K bit blocks being correctly decoded or not correctly decoded, respectively; K being equal to the number of bit block(s) in the target bit block set.

In one subembodiment, at least one of the K states in each of the X3 different decoding results indicates that a corresponding bit block is not correctly decoded.

In one embodiment, each of the X3 different decoding results is a possible decoding result jointly represented by K states, the K states in each of the X3 different decoding results denoting being correctly decoded or not being correctly decoded, respectively; K being equal to the number of bit block(s) in the target bit block set.

In one subembodiment, at least one of the K states in each of the X3 different decoding results indicates being not correctly decoded.

In one embodiment, RRC signaling is used to configure a correspondence between the X3 different decoding results and the X1 PUCCHs.

In one embodiment, the rule of correspondence between the X1 different decoding results and the X3 PUCCHs is pre-defined.

In one embodiment, the rule of correspondence between the X1 different decoding results and the X3 PUCCHs is pre-defined by standard.

In one embodiment, each of the X3 different decoding results corresponds to one of the X1 PUCCHs by means of a look-up table.

In one embodiment, the rule of correspondence between the X3 different decoding results and the X1 PUCCHs is pre-defined by standard.

In one embodiment, the statement of each of the X3 decoding results corresponding to one of the X1 PUCCHs in the present disclosure means that each of the X3 different decoding results maps to only one of the X1 PUCCHs.

In one embodiment, each of the X3 different decoding results is mapped to one of the X1 PUCCHs by means of a look-up table.

In one embodiment, each of the X3 different decoding results is mapped to one of the X1 PUCCHs based on the configuration of higher layer signaling.

In one embodiment, each of the X3 different decoding results is mapped to one of the X1 PUCCHs based on the configuration of RRC signaling.

In one embodiment, each of the X3 different decoding results is mapped to one of the X1 PUCCHs based on the indication of MAC CE signaling.

In one embodiment, each of the X3 different decoding results is mapped to one of the X1 PUCCHs based on default mapping rules.

In one embodiment, each of the X3 different decoding results is mapped to one of the X1 PUCCHs based on pre-defined mapping rules.

In one embodiment, the statement of each of the X3 decoding results corresponding to one of the X1 PUCCHs in the present disclosure means that each of the X3 different decoding results maps to only one of the X1 PUCCHs.

In one embodiment, each of the X3 different decoding results is mapped to one of the X1 control resources by means of a look-up table.

In one embodiment, each of the X3 different decoding results is mapped to one of the X1 control resources based on the configuration of higher layer signaling.

In one embodiment, each of the X3 different decoding results is mapped to one of the X1 control resources based on the configuration of RRC signaling.

In one embodiment, each of the X3 different decoding results is mapped to one of the X1 control resources based on the indication of MAC CE signaling.

In one embodiment, each of the X3 different decoding results is mapped to one of the X1 control resources based on default mapping rules.

In one embodiment, each of the X3 different decoding results is mapped to one of the X1 control resources based on pre-defined mapping rules.

Embodiment 10

Figure 10:
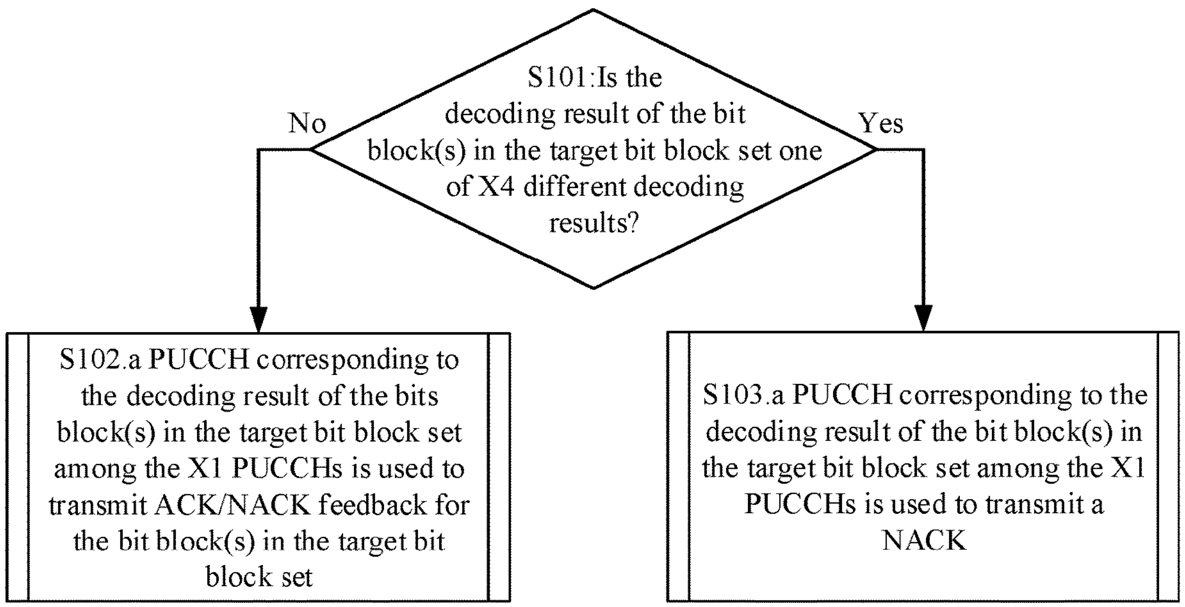
FIG. 10 illustrates a schematic diagram illustrating the first node determining whether a PUCCH corresponding to the decoding result of the bit block(s) in the target bit block set among the X1 PUCCHs is used to transmit a NACK or is used to transmit ACK/NACK feedback for the bit block(s) in the target bit block set according to one embodiment of the present disclosure.

Embodiment 10 illustrates a schematic diagram illustrating the first node determining whether a PUCCH corresponding to the decoding result of the bit block(s) in the target bit block set among the X1 PUCCHs is used to transmit a NACK or is used to transmit ACK/NACK feedback for the bit block(s) in the target bit block set according to one embodiment of the present disclosure, as shown in FIG. 10. In FIG. 10: in step S101, determining whether the decoding result of the bit block(s) in the target bit block set is one of X4 different decoding results; in step S102, a PUCCH corresponding to the decoding result of the bits block(s) in the target bit block set among the X1 PUCCHs is used to transmit ACK/NACK feedback for the bit block(s) in the target bit block set; in step S103, a PUCCH corresponding to the decoding result of the bit block(s) in the target bit block set among the X1 PUCCHs is used to transmit a NACK.

In Embodiment 10, each of the X1 control resources is orthogonal to the first resource pool in time domain; at least one bit block in the target bit block set is not correctly decoded, the decoding result of the bit block(s) in the target bit block set is one of X3 different decoding results, each of the X3 different decoding results corresponding to one of the X1 PUCCHs, X3 being no less than X1; when the decoding result of the bits block(s) in the target bit block set is one of X4 different decoding results, a PUCCH corresponding to the decoding result of the bits block(s) in the target bit block set among the X1 PUCCHs is used to transmit a NACK; when the decoding result of the bits block(s) in the target bit block set is not one of the X4 different decoding results, a PUCCH corresponding to the decoding result of the bits block(s) in the target bit block set among the X1 PUCCHs is used to transmit ACK/NACK feedback for the bit block(s) in the target bit block set; the X3 different decoding results include the X4 different decoding results, X4 being less than X3.

In one embodiment, X4 is equal to X1 minus 1, the X4 different decoding results respectively correspond to X4 PUCCHs of the X1 PUCCHs, and all decoding results other than the X4 different decoding results among the X3 different decoding results correspond to the same PUCCH other than the X4 PUCCHs among the X1 PUCCHs.

In one embodiment, the target bit block set comprises K bit blocks, X1 is equal to K plus 1, X3 is equal to the K-th power of 2 minus 1, and X4 is equal to K. K is a positive integer greater than 1.

In one embodiment, X4 is equal to X1 minus 1.

In one embodiment, X4 is less than X1.

In one embodiment, X3 is equal to 3, the X3 different decoding results being respectively denoted by {ACK, NACK}, {NACK, ACK}, and {NACK, NACK}.

In one subembodiment, X4 is equal to 2, the X4 different decoding results being respectively denoted by {ACK, NACK} and {NACK, ACK}.

In one embodiment, X3 is equal to 7, the X3 different decoding results being respectively denoted by {ACK, ACK, NACK}, {ACK, NACK, ACK}, {ACK, NACK, NACK}, {NACK, ACK, NACK}, {NACK, NACK, ACK}, {NACK, NACK, NACK}, and {NACK, ACK, ACK}.

In one subembodiment, X4 is equal to 3, the X4 different decoding results being respectively denoted by {ACK, ACK, NACK}, {ACK, NACK, ACK} and {NACK, ACK, ACK}.

In one embodiment, the target bit block set comprises 2 bit blocks; X3 is equal to 3, the X3 different decoding results respectively being {a first bit block in the target bit block set is not correctly decoded, a second bit block in target bit block set is correctly decoded}, {a first bit block in the target bit block set is correctly decoded, a second bit block in target bit block set is not correctly decoded}, and {a first bit block in the target bit block set is not correctly decoded, a second bit block in target bit block set is not correctly decoded}.

In one subembodiment, X4 is equal to 2, the X4 different decoding results respectively being {a first bit block in the target bit block set is not correctly decoded, a second bit block in target bit block set is correctly decoded}, and {a first bit block in the target bit block set is correctly decoded, a second bit block in target bit block set is not correctly decoded}.

In one subembodiment, X1 is equal to 3.

In one embodiment, the target bit block set comprises 3 bit blocks; X3 is equal to 7, the X3 different decoding results respectively being {a first bit block in the target bit block set is correctly decoded, a second bit block in target bit block set is correctly decoded, a third bit block in target bit block set is not correctly decoded}, {a first bit block in the target bit block set is correctly decoded, a second bit block in target bit block set is not correctly decoded, a third bit block in target bit block set is correctly decoded}, {a first bit block in the target bit block set is correctly decoded, a second bit block in target bit block set is not correctly decoded, a third bit block in target bit block set is not correctly decoded}, {a first bit block in the target bit block set is not correctly decoded, a second bit block in target bit block set is correctly decoded, a third bit block in target bit block set is correctly decoded}, {a first bit block in the target bit block set is not correctly decoded, a second bit block in target bit block set is correctly decoded, a third bit block in target bit block set is not correctly decoded}, {a first bit block in the target bit block set is not correctly decoded, a second bit block in target bit block set is not correctly decoded, a third bit block in target bit block set is correctly decoded}, and {a first bit block in the target bit block set is not correctly decoded, a second bit block in target bit block set is not correctly decoded, a third bit block in target bit block set is not correctly decoded}.

In one subembodiment, X4 is equal to 3, the X4 different decoding results respectively being {a first bit block in the target bit block set is correctly decoded, a second bit block in target bit block set is correctly decoded, a third bit block in target bit block set is not correctly decoded}, {a first bit block in the target bit block set is correctly decoded, a second bit block in target bit block set is not correctly decoded, a third bit block in target bit block set is correctly decoded}, {a first bit block in the target bit block set is not correctly decoded, a second bit block in target bit block set is correctly decoded, a third bit block in target bit block set is correctly decoded}.

In one subembodiment, X1 is equal to 4.

In one embodiment, in any of the X4 different decoding results: only one bit block in the target bit block set is not correctly decoded.

In one embodiment, at least one ACK and only one NACK are included in the denotation of any of the X4 different decoding results.

In one embodiment, in any of the X3 different decoding results other than the X4 different decoding results: at least 2 bit blocks in the target bit block set are not correctly decoded.

In one embodiment, at least 2 NACKs are includes in the denotation of any of the X3 different decoding results other than the X4 different decoding results.

In one embodiment, each of the X4 different decoding results is a possible decoding result jointly represented by K states, only one of the K states in each of the X4 different decoding results denoting a corresponding bit block being not correctly decoded; K being equal to the number of bit block(s) in the target bit block set.

In one subembodiment, any state other than the only one state of the K states in each of the X4 different decoding results indicates that a corresponding bit block is correctly decoded.

In one embodiment, each of the X4 different decoding results is a possible decoding result jointly represented by K states, only one of the K states in each of the X4 different decoding results denoting being not correctly decoded; K being equal to the number of bit block(s) in the target bit block set.

In one subembodiment, any state other than the only one state of the K states in each of the X4 different decoding results indicates being correctly decoded.

In one embodiment, in this application that a PUCCH is used to transmit the ACK/NACK feedback for the bit block(s) in the target bit block set means that: the ACK/NACK feedback for the bit block(s) in the target bit block set have been through at least Sequence Generation and Mapping to Physical Resources before being transmitted in the PUCCH.

In one embodiment, in this application that a PUCCH is used to transmit the ACK/NACK feedback for the bit block(s) in the target bit block set means that: the ACK/NACK feedback for the bit block(s) in the target bit block set have been through at least Sequence Modulation and Mapping to Physical Resources before being transmitted in the PUCCH.

In one embodiment, in this application that a PUCCH is used to transmit the ACK/NACK feedback for the bit block(s) in the target bit block set means that: an output by the ACK/NACK feedback for the bit block(s) in the target bit block set after being through at least part of CRC attachment, Code Block Segmentation, Code Block CRC attachment, Channel Coding, Rate Matching, Code Block Concatenation, Scrambling, Modulation, Spreading, Transform Precoding and Mapping to Physical Resources is transmitted in the PUCCH.

In one embodiment, in this application that a PUCCH is used to transmit the ACK/NACK feedback for the bit block(s) in the target bit block set means that: an output by the ACK/NACK feedback for the bit block(s) in the target bit block set after being through at least part of CRC attachment, Code Block Segmentation, Code Block CRC attachment, Channel Coding, Rate Matching, Code Block Concatenation, Scrambling, Modulation, Spreading, Transform Precoding and Mapping to Physical Resources, Multicarrier Symbol Generation, and Modulation and Upconversion is transmitted in the PUCCH.

Embodiment 11

Figure 11:
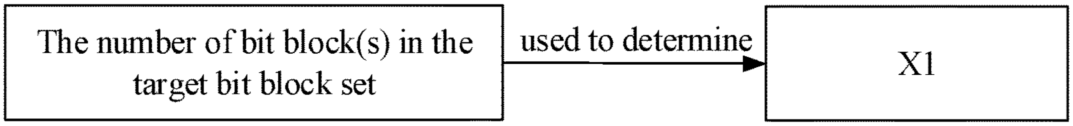
FIG. 11 illustrates a schematic diagram of a relation between the number of bit block(s) in a target bit block set and X1 according to one embodiment of the present disclosure.

Embodiment 11 illustrates a schematic diagram of a relation between the number of bit block(s) in a target bit block set and X1 according to one embodiment of the present disclosure, as shown in FIG. 11.

In Embodiment 11, a number of bit block(s) in the target bit block set is used to determine X1.

In one embodiment, the target bit block set comprises K bit blocks, K being a positive integer, X1 being no greater than 2 to the K-th power minus 1.

In one embodiment, the target bit block set comprises K bit blocks, K being a positive integer, X1 being equal to 2 to the K-th power minus 1.

In one embodiment, the target bit block set comprises K bit blocks, K being a positive integer, X1 being equal to K plus 1.

In one embodiment, K is equal to 1.

In one embodiment, K is greater than 1.

In one embodiment, K is equal to 2.

In one embodiment, K is equal to 3.

In one embodiment, K is equal to 4.

In one embodiment, K is equal to 8.

In one embodiment, K is no greater than 1024.

In one embodiment, a number of bit block(s) in the target bit block set is used to determine the X1 control resources from multiple control resources.

In one embodiment, a number of bit block(s) in the target bit block set is used to determine the X1 control resources from multiple control resources based on default mapping rules.

In one embodiment, a number of bit block(s) in the target bit block set is used to determine the X1 control resources from multiple control resources by looking up tables.

Embodiment 12

Figure 12:
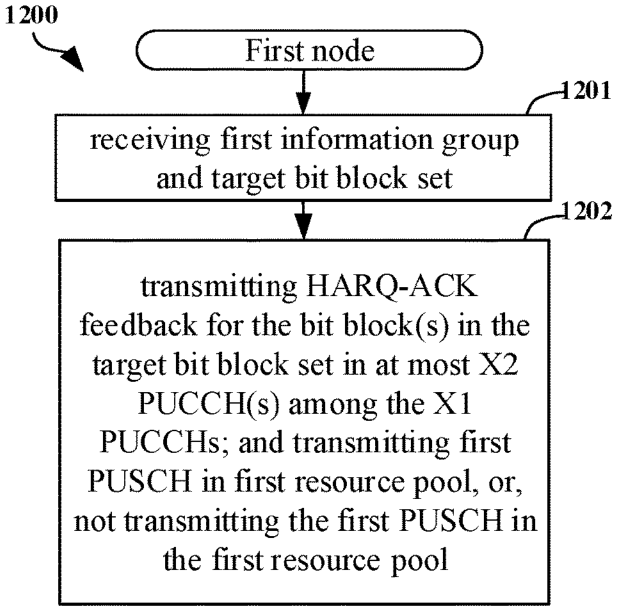
FIG. 12 illustrates a flowchart of processing of a first node according to one embodiment of the present disclosure.

Embodiment 12 illustrates a flowchart of processing of a first node according to one embodiment of the present disclosure, as shown in FIG. 12.

In Embodiment 12, the first node in the present disclosure receives a first information group and a target bit block set in step 1201; and in step 1202, transmits HARQ-ACK feedback for the bit block(s) in the target bit block set in at most X2 PUCCH(s) among the X1 PUCCHs; and transmits a first PUSCH in a first resource pool, or, does not transmit the first PUSCH in the first resource pool.

In Embodiment 12, the first information group is used to determine X1 control resources, X1 being a positive integer greater than 1, the target bit block set comprising at least one bit block; X2 being a positive integer less than X1; the X1 control resources are respectively reserved for the X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the first node does not transmit the first PUSCH in the first resource pool; when each of the X1 control resources is orthogonal to the first resource pool in time domain, the first node transmits the first PUSCH in the first resource pool.

In one embodiment, the statement that the first node does not transmit the first PUSCH in the first resource pool means that the first node does not transmit signals in the first PUSCH.

In one embodiment, the statement that the first node does not transmit the first PUSCH in the first resource pool means that the first PUSCH is not used for transmitting any signal.

In one embodiment, the statement that the first node does not transmit the first PUSCH in the first resource pool means that the first PUSCH is not used for transmitting any bit block.

In one embodiment, when each of the X1 control resources is orthogonal to the first resource pool in time domain: in terms of time domain, a PUCCH of the X1 PUCCHs that is used to transmit the HARQ-ACK feedback for the bit block(s) in the target bit block set is after the first PUSCH.

In one embodiment, when each of the X1 control resources is orthogonal to the first resource pool in time domain: in terms of time domain, a PUCCH of the X1 PUCCHs that is used to transmit the HARQ-ACK feedback for the bit block(s) in the target bit block set is before the first PUSCH.

In one embodiment, when each of the X1 control resources is orthogonal to the first resource pool in time domain: in terms of time domain, at least one of the X1 PUCCHs that is(are) used to transmit the HARQ-ACK feedback for the bit block(s) in the target bit block set is(are) after the first PUSCH.

In one embodiment, when each of the X1 control resources is orthogonal to the first resource pool in time domain: in terms of time domain, at least one of the X1 PUCCHs that is(are) used to transmit the HARQ-ACK feedback for the bit block(s) in the target bit block set is(are) before the first PUSCH.

Embodiment 13

Figure 13:
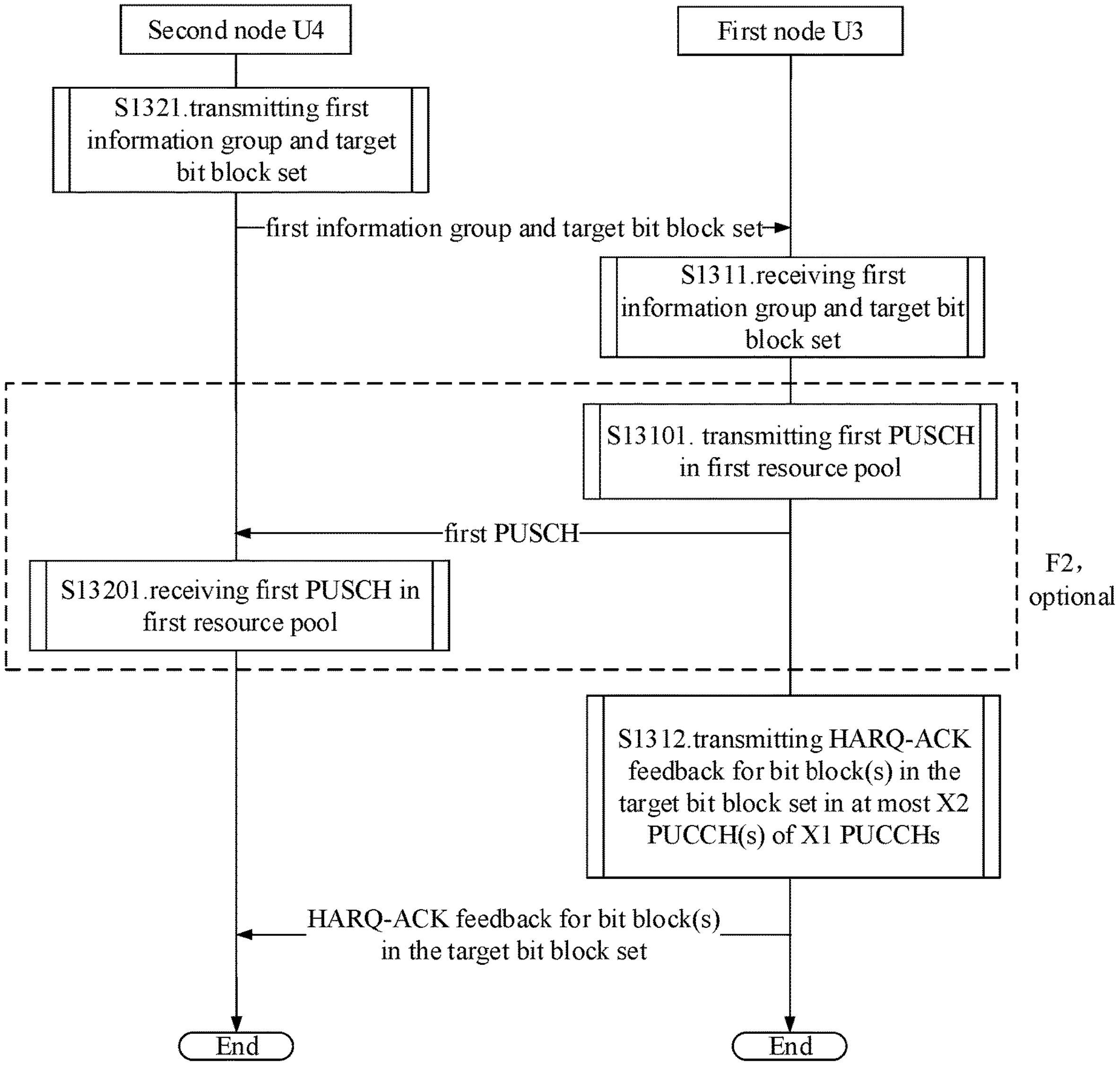
FIG. 13 illustrates a flowchart of signal transmission according to one embodiment of the present disclosure.

Embodiment 13 illustrates a flowchart of signal transmission according to one embodiment of the present disclosure, as shown in FIG. 13. In FIG. 13, a first node U3 and a second node U4 are in communications via an air interface. In FIG. 13, steps marked by the dotted-line box F2 are optional. Particularly, in FIG. 13, the order between the step pair {S13101,S13201} and the step S1312 does not imply a particular time sequence.

The first node U3 receives a first information group and a target bit block set in step S1311; and transmits a first PUSCH in a first resource pool in step S13101; and transmits HARQ-ACK feedback for bit block(s) in the target bit block set in at most X2 PUCCH(s) of X1 PUCCHs in step S1312.

The second node U4 transmits a first information group and a target bit block set in step S1321; and receives a first PUSCH in a first resource pool in step S13201.

In Embodiment 13, the first information group is used to determine X1 control resources, X1 being a positive integer greater than 1, the target bit block set comprising at least one bit block; X2 being a positive integer less than X1; the X1 control resources are respectively reserved for the X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the first node U3 does not transmit the first PUSCH in the first resource pool; when each of the X1 control resources is orthogonal to the first resource pool in time domain, the first node U3 transmits the first PUSCH in the first resource pool; when each of the bit block(s) in the target bit block set is correctly decoded: the first node U3 does not transmit HARQ-ACK feedback for the target bit block set in the X1 PUCCHs.

In one subembodiment of Embodiment 13, when there exists one resource among the X1 control resources that overlaps with the first resource pool in time domain: whether or not the control resource among the X1 control resources that overlaps with the first resource pool in time domain is used to transmit a PUCCH, the first node U3 does not transmit the first PUSCH in the first resource pool.

In one subembodiment of Embodiment 13, when at least one bit block in the target bit block set is not correctly decoded: only one PUCCH of the X1 PUCCHs is used to transmit a NACK, the decoding result of the bit block(s) in the target bit block set is one of X1 different decoding results, the X1 different decoding results respectively corresponding to the X1 PUCCHs; a PUCCH corresponding to the decoding result of the bit block(s) in the target bit block set among the X1 PUCCHs is used to transmit a NACK.

In one subembodiment of Embodiment 13, when at least one bit block in the target bit block set is not correctly decoded: {the decoding result of the bit block(s) in the target bit block set is one of X3 different decoding results, each of the X3 different decoding results corresponding to one of the X1 PUCCHs, X3 being no less than X1; when the decoding result of the bits block(s) in the target bit block set is one of X4 different decoding results, a PUCCH corresponding to the decoding result of the bits block(s) in the target bit block set among the X1 PUCCHs is used to transmit a NACK; when the decoding result of the bits block(s) in the target bit block set is not one of the X4 different decoding results, a PUCCH corresponding to the decoding result of the bits block(s) in the target bit block set among the X1 PUCCHs is used to transmit ACK/NACK feedback for the bit block(s) in the target bit block set; the X3 different decoding results include the X4 different decoding results, X4 being less than X3}.

In one subembodiment of Embodiment 13, a number of bit block(s) in the target bit block set is used to determine X1.

In one embodiment, the first node U3 is the first node in the present disclosure.

In one embodiment, the second node U4 is the second node in the present disclosure.

In one embodiment, the first node U3 is a UE.

In one embodiment, the first node U3 is a base station.

In one embodiment, the second node U4 is a base station.

In one embodiment, the second node U4 is a UE.

In one embodiment, an air interface between the second node U4 and the first node U3 is a Uu interface.

In one embodiment, an air interface between the second node U4 and the first node U3 includes a cellular link.

In one embodiment, an air interface between the second node U4 and the first node U3 is a PC5 interface.

In one embodiment, an air interface between the second node U4 and the first node U3 includes a sidelink.

In one embodiment, an air interface between the second node U4 and the first node U3 includes a radio interface between a base station and a UE.

In one embodiment, an air interface between the second node U4 and the first node U3 includes a radio interface between a UE and another UE.

In one embodiment, in terms of time domain, the step pair {S13101, S13201} precedes the step S1312.

In one embodiment, in terms of time domain, the step pair {S13101, S13201} is after the step S1312.

In one embodiment, steps marked by the dotted-line box F2 exist.

In one embodiment, steps marked by the dotted-line box F2 do not exist.

In one embodiment, when each of the X1 control resources is orthogonal to the first resource pool in time domain: the steps in the dotted-line box F2 exist.

In one embodiment, when there exists one control resource among the X1 control resources that is overlapping with the first resource pool in time domain: the steps in the dotted-line box F2 don't exist.

Embodiment 14

Figure 14:
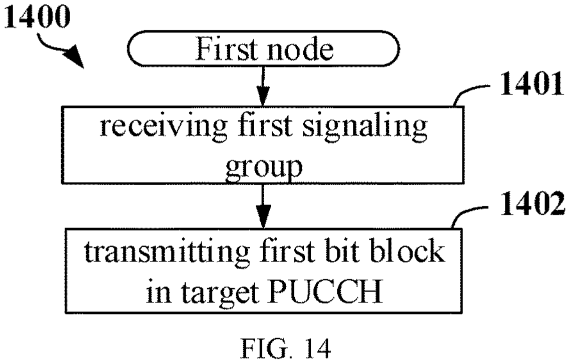
FIG. 14 illustrates a flowchart of processing of a first node according to one embodiment of the present disclosure.

Embodiment 14 illustrates a flowchart of processing of a first node according to one embodiment of the present disclosure, as shown in FIG. 14.

In Embodiment 14, the first node in the present disclosure receives a first signaling group in step 1401; and transmits a first bit block in a target PUCCH in step 1402.

In Embodiment 14, the first bit block comprises at least one bit; resources occupied by the target PUCCH belong to a target resource pool; the first signaling group is used to determine a first resource pool and a reference mode, the reference mode being either of a first mode and a second mode, the first mode and the second mode being different HARQ-ACK feedback modes, respectively; when the reference mode is the first mode, which one of multiple resource pools is the target resource pool is related to a number of bit(s) in the first bit block, one of the multiple resource pools being default or configurable, the first resource pool being one of the multiple resource pools; when the reference mode is the second mode, the target resource pool is the first resource pool.

In one embodiment, the first signaling group comprises at least one signaling.

In one embodiment, each signaling in the first signaling group is an RRC signaling.

In one embodiment, the first signaling group comprises only one IE.

In one embodiment, the first signaling group comprises multiple IEs.

In one embodiment, the first signaling group comprises multiple PUCCH-Configs.

In one embodiment, the first signaling group comprises at least one RRC signaling and a DCI.

In one embodiment, a signaling in the first signaling group is a physical layer signaling.

In one embodiment, a signaling in the first signaling group is Downlink control information (DCI).

In one embodiment, a signaling in the first signaling group is a DCI format.

In one embodiment, a signaling in the first signaling group comprises one or more fields in a DCI.

In one embodiment, a signaling in the first signaling group is a higher layer signaling.

In one embodiment, a signaling in the first signaling group is an RRC signaling.

In one embodiment, a signaling in the first signaling group comprises one or more fields in an RRC signaling.

In one embodiment, a signaling in the first signaling group comprises one Information Element (IE).

In one embodiment, a signaling in the first signaling group is an IE.

In one embodiment, a signaling in the first signaling group comprises one or more fields in an IE.

In one embodiment, a signaling in the first signaling group is a MAC CE signaling.

In one embodiment, a signaling in the first signaling group comprises one or more fields in a MAC CE signaling.

In one embodiment, a signaling in the first signaling group is a DownLink Grant Signaling.

In one embodiment, a signaling in the first signaling group is an UpLink Grant Signalling.

In one embodiment, a name of a signaling in the first signaling group includes PUCCH-Config.

In one embodiment, a signaling in the first signaling group includes PUCCH-Config.

In one embodiment, a name of a signaling in the first signaling group includes SPS-PUCCH-AN.

In one embodiment, a signaling in the first signaling group includes a SPS-PUCCH-AN-List.

In one embodiment, the meaning of the statement of transmitting a first bit block in a target PUCCH in the present disclosure includes: values of bits in the first bit block are mapped to a sequence, the sequence being transmitted in the target PUCCH.

In one embodiment, the meaning of the statement of transmitting a first bit block in a target PUCCH in the present disclosure includes: values of bits in the first bit block are mapped to a sequence cyclic shift, a sequence generated based on the sequence cyclic shift being transmitted in the target PUCCH.

In one embodiment, the meaning of the statement of transmitting a first bit block in a target PUCCH in the present disclosure includes: Sequence modulation generated by the first bit block is transmitted in the target PUCCH.

In one embodiment, the meaning of the statement of transmitting a first bit block in a target PUCCH in the present disclosure includes: values of bits in the first bit block are mapped to a sequence, the sequence being mapped to physical resources occupied by the target PUCCH.

In one embodiment, the first bit block has been through at least Sequence generation and Mapping to physical resources before being transmitted.

In one embodiment, the first bit block has been through at least Sequence modulation and Mapping to physical resources before being transmitted.

In one embodiment, all or partial output by the first bit block after being through at least part of CRC attachment, Code Block Segmentation, Code Block CRC attachment, Channel Coding, Rate Matching, Code Block Concatenation, Scrambling, Modulation, Spreading, Layer Mapping, Precoding, Mapping to Physical Resources, Multicarrier Symbol Generation, and Modulation and Upconversion is transmitted in the target PUCCH.

In one embodiment, the first bit block comprises 1 or 2 bits or more.

In one embodiment, the first bit block comprises a UCI bit.

In one embodiment, the first bit block comprises at most 2 Uplink Control Information (UCI) bits.

In one embodiment, the first bit block comprises at most 2 HARQ-ACK bits.

In one embodiment, bits in the first bit block are all HARQ-ACK bits for Semi-persistent scheduling (SPS) PDSCH reception.

In one embodiment, bits in the first bit block are all HARQ-ACK bits for MBS.

In one embodiment, bits in the first bit block are all HARQ-ACK bits for SPS PDSCH reception of MBS.

In one embodiment, bits in the first bit block are all HARQ-ACK bits for PDSCH reception scheduled by DCI scrambled by a G-RNTI.

In one embodiment, in terms of time-frequency domain, time-frequency resources occupied by the target PUCCH belong to the target resource pool.

In one embodiment, the target resource pool is a PUCCH resource.

In one embodiment, the target resource pool comprises at least one RE in time-frequency domain.

In one embodiment, the target resource pool is a PUCCH resource set.

In one embodiment, the target PUCCH is a PUCCH.

In one embodiment, the statement in the present disclosure that resources occupied by the target PUCCH belong to a target resource pool includes a meaning that: the target resource pool is a PUCCH resource, and resources occupied by the target PUCCH belong to the target resource pool.

In one embodiment, the statement in the present disclosure that resources occupied by the target PUCCH belong to a target resource pool includes a meaning that: the target resource pool is a PUCCH resource set, the target resource pool comprising at least one PUCCH resource, and resources occupied by the target PUCCH belong to one PUCCH resource in the target resource pool.

In one embodiment, the statement in the present disclosure that resources occupied by the target PUCCH belong to a target resource pool includes a meaning that: the target resource pool is a PUCCH resource set, and a PUCCH resource corresponding to the target PUCCH belongs to the target resource pool.

In one embodiment, the first resource pool is a PUCCH resource.

In one embodiment, the first resource pool comprises at least one RE in time-frequency domain.

In one embodiment, the first resource pool is a PUCCH resource set.

In one embodiment, an ID number of the first resource pool is equal to 0.

In one embodiment, the first resource pool is a resource pool with an ID number equal to 0.

In one embodiment, the first resource pool is a PUCCH resource set with an ID number equal to 0.

In one embodiment, the first resource pool is a PUCCH resource set corresponding to a pucch-ResourceSetId that is equal to 0.

In one embodiment, the first resource pool is a PUCCH resource set corresponding to a pucch-ResourceSetId that is equal to 1.

In one embodiment, the first resource pool is a PUCCH resource set, and PUCCH resources in the first resource pool are all PUCCH resources reserved to be used for transmission of 1 HARQ-ACK bit.

In one embodiment, the first resource pool is PUCCH resources reserved to be used for transmission of 1 HARQ-ACK bit.

In one embodiment, the first resource pool is a PUCCH resource set, and PUCCH resources in the first resource pool are all PUCCH resources reserved to be used for transmission of 2 HARQ-ACK bits.

In one embodiment, the first resource pool is PUCCH resources reserved to be used for transmission of 2 HARQ-ACK bits.

In one embodiment, the first resource pool is a PUCCH resource set, and PUCCH resources in the first resource pool are all PUCCH resources reserved to be used for transmission of at most 2 HARQ-ACK bits.

In one embodiment, the first resource pool is PUCCH resources reserved to be used for transmission of at most 2 HARQ-ACK bits.

In one embodiment, the first resource pool is a PUCCH resource set, and PUCCH resources in the first resource pool are all PUCCH resources reserved for transmission of ACK- or NACK-including HARQ-ACK information.

In one embodiment, the first resource pool is a PUCCH resource reserved for transmission of ACK- or NACK-including HARQ-ACK information.

In one embodiment, a resource pool in the present disclosure is a PUCCH resource set.

In one embodiment, a resource pool in the present disclosure is a PUCCH resource.

In one embodiment, a resource pool in the present disclosure comprises at least one PUCCH resource.

In one embodiment, the first resource pool is a resource pool configured for the reference mode.

In one embodiment, a signaling in the first signaling group is used to configure the reference mode to the first resource pool.

In one embodiment, the first resource pool is a resource pool configured for the second mode.

In one embodiment, a signaling in the first signaling group is used to configure the second mode to the first resource pool.

In one embodiment, an RRC signaling is used to configure the second mode to the first resource pool.

In one embodiment, the first resource pool is a resource pool configured to NACK-only feedback of MBS.

In one embodiment, the first resource pool is a resource pool configured to ACK/NACK feedback of MBS.

In one embodiment, the first resource pool is a resource pool configured to unicast services.

In one embodiment, in the first mode, the NACK-only approach is used for transmission of 1 HARQ-ACK bit; in the second mode, the ACK or NACK approach is used for transmission of 1 HARQ-ACK bit.

In one embodiment, in the first mode, the NACK-only approach is used for transmission of 1 HARQ-ACK bit, and the ACK or NACK approach is used for transmission of 2 HARQ-ACK bits; in the second mode, the ACK or NACK approach is used for both the transmission of 1 HARQ-ACK bit and the transmission of 2 HARQ-ACK bits.

In one embodiment, for feedback of 1 HARQ-ACK bit, the first node is configured to support only one of NACK-only feedback and ACK/NACK feedback.

In one embodiment, a signaling in the first signaling group comprises a PUCCH-Config, and the first resource pool is a PUCCH resource set, the PUCCH-Config in the signaling in the first signaling group is used for configuring the first resource pool.

In one embodiment, a signaling in the first signaling group comprises a PUCCH-Config, and the first resource pool is a PUCCH resource, the PUCCH-Config in the signaling in the first signaling group is used for configuring the first resource pool.

In one embodiment, a signaling in the first signaling group is used to configure the first resource pool.

In one embodiment, a signaling in the first signaling group is used to indicate resources occupied by the first resource pool.

In one embodiment, a signaling in the first signaling group is used to indicate time-domain resources occupied by the first resource pool.

In one embodiment, a signaling in the first signaling group is used to indicate frequency domain and time-domain resources occupied by the first resource pool.

In one embodiment, a signaling in the first signaling group is used to configure the reference mode.

In one embodiment, a signaling in the first signaling group is used to indicate the reference mode.

In one embodiment, at least one signaling in the first signaling group is used to indicate the reference mode.

In one embodiment, at least one signaling in the first signaling group is used to implicitly indicate the reference mode In one embodiment, a signaling in the first signaling group is used to configure the reference mode to the first resource pool.

In one embodiment, two signalings in the first signaling group are respectively used to configure the first resource pool and the reference mode.

In one embodiment, a signaling in the first signaling group is used to configure the first resource pool and the reference mode.

In one embodiment, the first signaling group comprises a PUCCH-Config, and the PUCCH-Config in the first signaling group is used for configuring the first resource pool and the reference mode.

In one embodiment, the first signaling group comprises a SPS-PUCCH-AN-List, and the SPS-PUCCH-AN-List in the first signaling group is used for indicating the first resource pool.

In one embodiment, the first signaling group comprises an SPS-Config, and the SPS-Config in the first signaling group is used to indicate the reference mode.

In one embodiment, the first mode is ACK-only feedback, while the second mode is ACK/NACK feedback.

In one embodiment, the second mode is ACK-only feedback, while the first mode is ACK/NACK feedback.

In one embodiment, in the ACK-only feedback mode, the HARQ-ACK information includes only ACK; in the ACK/NACK feedback mode, the HARQ-ACK information includes ACK or NACK.

In one embodiment, the first mode is ACK-only feedback, while the second mode is NACK-only feedback.

In one embodiment, the second mode is ACK-only feedback, while the first mode is NACK-only feedback.

In one embodiment, in the ACK-only feedback mode, the HARQ-ACK information includes only ACK; in the NACK-only feedback mode, the HARQ-ACK information includes only NACK.

In one embodiment, the number of resource pools comprised among the multiple resource pools is equal to 2.

In one embodiment, the number of resource pools comprised among the multiple resource pools is equal to 3.

In one embodiment, the number of resource pools comprised among the multiple resource pools is equal to 4.

In one embodiment, each of the multiple resource pools is a PUCCH resource.

In one embodiment, the multiple resource pools are configured respectively in multiple IEs of which names include PUCCH-Config.

In one embodiment, the multiple resource pools are respectively PUCCH resources configured in multiple IEs of which names include PUCCH-Config.

In one embodiment, the multiple resource pools are respectively PUCCH resources in PUCCH resource sets configured in multiple PUCCH-Configs.

In one embodiment, the multiple resource pools are respectively PUCCH resources in PUCCH resource sets with pucch-ResourceSetId equal to 0 configured in multiple PUCCH-Configs.

In one embodiment, any of the multiple resource pools is PUCCH resources reserved to be used for transmission of at most 2 HARQ-ACK bits.

In one embodiment, one of the multiple resource pools is PUCCH resources reserved to be used for transmission of only 1 HARQ-ACK bit, while the other one of the multiple resource pools is PUCCH resources reserved to be used for transmission of at most 2 HARQ-ACK bits.

In one embodiment, any of the multiple resource pools is PUCCH resources reserved to be used for transmission of at most 2 UCI bits.

In one embodiment, one of the multiple resource pools is PUCCH resources reserved to be used for transmission of only 1 UCI bit, while the other one of the multiple resource pools is PUCCH resources reserved to be used for transmission of at most 2 UCI bits.

In one embodiment, each of the multiple resource pools is a PUCCH resource set.

In one embodiment, any of the multiple resource pools is a PUCCH resource set reserved to be used for transmission of at most 2 HARQ-ACK bits.

In one embodiment, one of the multiple resource pools is a PUCCH resource set reserved to be used for transmission of only 1 HARQ-ACK bit, while the other one of the multiple resource pools is a PUCCH resource set reserved to be used for transmission of at most 2 HARQ-ACK bits.

In one embodiment, any of the multiple resource pools is a PUCCH resource set reserved to be used for transmission of at most 2 UCI bits.

In one embodiment, one of the multiple resource pools is a PUCCH resource set reserved to be used for transmission of only 1 UCI bit, while the other one of the multiple resource pools is a PUCCH resource set reserved to be used for transmission of at most 2 UCI bits.

In one embodiment, the multiple resource pools are respectively PUCCH resource sets configured in multiple IEs of which names include PUCCH-Config.

In one embodiment, the multiple resource pools are configured respectively in multiple PUCCH-Configs.

In one embodiment, the multiple resource pools are respectively PUCCH resource sets configured in multiple PUCCH-Configs.

In one embodiment, the multiple resource pools are respectively PUCCH resource sets with pucch-ResourceSetId equal to 0 configured in multiple PUCCH-Configs.

In one embodiment, the first signaling group comprises a PUCCH-Config, and the PUCCH-Config in the first signaling group is used for configuring the multiple resource pools.

In one embodiment, the first signaling group comprises a SPS-PUCCH-AN-List, and the SPS-PUCCH-AN-List in the first signaling group is used for indicating the multiple resource pools.

In one embodiment, the first signaling group comprises a signaling used for configuring a PUCCH.

In one embodiment, whether the first signaling group comprises a PUCCH-Config for the first mode is used to determine the reference mode.

In one subembodiment, when the first signaling group comprises a PUCCH-Config for the first mode, the reference mode is the first mode; when the first signaling group does not comprise a PUCCH-Config for the first mode, the reference mode is the second mode.

In one embodiment, whether the first signaling group comprises a PUCCH-Config for the second mode is used to determine the reference mode.

In one subembodiment, when the first signaling group comprises a PUCCH-Config for the second mode, the reference mode is the second mode; when the first signaling group does not comprise a PUCCH-Config for the second mode, the reference mode is the first mode.

In one embodiment, the first node is configured with only one PUCCH-Config for MBS.

In one subembodiment, the first resource pool is a resource pool configured by the only one PUCCH-Config for MBS.

In one embodiment, the first node is configured with only one PUCCH-ConfigurationList for MBS.

In one subembodiment, the first resource pool is a resource pool configured by the only one PUCCH-ConfigurationList for MBS.

In one embodiment, the first resource pool is a PUCCH resource; the first signaling group comprises one DCI; the DCI is used to determine an index of the first resource pool in a PUCCH resource set to which the first resource pool belongs.

In one subembodiment, the reference mode is configured to the first resource pool via a higher layer signaling.

In one subembodiment, the reference mode is configured to the first resource pool via an RRC signaling or a MAC CE signaling.

In one subembodiment, the value of a PUCCH resource indicator field in the DCI is used to indicate the index of the first resource pool in the PUCCH resource set to which the first resource pool belongs.

In one subembodiment, an index of a first CCE occupied by a PDCCH used to transmit the DCI is used to determine the index of the first resource pool in the PUCCH resource set to which the first resource pool belongs.

In one subembodiment, an index of a first CCE occupied by a PDCCH used to transmit the DCI and a PUCCH resource indicator field in the DCI are used together to determine the index of the first resource pool in the PUCCH resource set to which the first resource pool belongs.

In one subembodiment, when the number of PUCCH resources comprised in the PUCCH resource set to which the first resource pool belongs is no greater than 8: the value of a PUCCH resource indicator field in the DCI is mapped to the index of the first resource pool in the PUCCH resource set to which the first resource pool belongs by means of looking up tables.

In one subembodiment, when the number of PUCCH resources comprised in the PUCCH resource set to which the first resource pool belongs is greater than 8: the first node determines an index $r_{PUCCH}$ of the first resource pool in the PUCCH resource set to which the first resource pool belongs as follows:

$$r_{PUCCH} = \left\{ \begin{array}{l} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil \text{ if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 \text{ if } \Delta_{PRI} \geq R_{PUCCH} \bmod 8 \end{array} \right\}$$

where the $R_{PUCCH}$ is equal to the number of PUCCH resources comprised in the PUCCH resource set to which the first resource pool belongs; the $N_{CCE,p}$ is the number of Control channel elements (CCEs) in a Control resource set (CORESET) for Physical downlink control channel (PDCCH) reception for the DCI; the $n_{CCE,p}$ is the index of the first CCE for the PDCCH reception for the DCI, the $\Delta_{PRI}$ is the value of a PUCCH resource indicator field in the DCI; if the DCI does not include a PUCCH resource indicator field, the $\Delta_{PRI}$ is equal to 0.

In one subembodiment, the DCI is the first DCI in the present disclosure.

In one subembodiment, the DCI is not the first DCI in the present disclosure.

In one subembodiment, the PUCCH resource set to which the first resource pool belongs is configured by a higher layer signaling.

In one subembodiment, the PUCCH resource set to which the first resource pool belongs is configured by an RRC signaling.

In one embodiment, any of the multiple resource pools is a set of PUCCH resources reserved to be used for transmission of at most 2 HARQ-ACK bits.

In one embodiment, one of the multiple resource pools is a set of PUCCH resources reserved to be used for transmission of only 1 HARQ-ACK bit, while the other one of the multiple resource pools is a set of PUCCH resources reserved to be used for transmission of at most 2 HARQ-ACK bits.

In one embodiment, one of the multiple resource pools is a resource pool configured to NACK-only feedback for MBS, while the other one of the multiple resource pools is a resource pool configured to ACK/NACK feedback for MBS.

In one embodiment, one of the multiple resource pools is a resource pool configured to NACK-only feedback for MBS, while the other one of the multiple resource pools is a resource pool configured to unicast services.

In one embodiment, any one of the multiple resource pools is either default or configurable.

In one embodiment, one of the multiple resource pools is default.

In one embodiment, one of the multiple resource pools is configured by a higher layer signaling.

In one embodiment, one of the multiple resource pools is configured by an RRC signaling.

In one embodiment, one of the multiple resource pools is configured by a MAC CE signaling.

In one embodiment, when the reference mode is the first mode: when the number of bit(s) in the first bit block is greater than a first value, the target resource pool is the first resource pool; when the number of bit(s) in the first bit block is no greater than the first value, the target resource pool is one of the multiple resource pools other than the first resource pool; the first value is a positive integer greater than 1.

In one embodiment, when the reference mode is the first mode: when the number of bit(s) in the first bit block is no greater than a first value, the target resource pool is the first resource pool; when the number of bit(s) in the first bit block is greater than the first value, the target resource pool is one of the multiple resource pools other than the first resource pool; the first value is a positive integer greater than 1.

In one embodiment, when the reference mode is the first mode: when the number of bit(s) in the first bit block is less than a first value, the target resource pool is the first resource pool; when the number of bit(s) in the first bit block is no less than the first value, the target resource pool is one of the multiple resource pools other than the first resource pool; the first value is a positive integer greater than 1.

In one embodiment, when the reference mode is the first mode: when the number of bit(s) in the first bit block is no less than a first value, the target resource pool is the first resource pool; when the number of bit(s) in the first bit block is less than the first value, the target resource pool is one of the multiple resource pools other than the first resource pool; the first value is a positive integer greater than 1.

In one embodiment, the first value is 2.

In one embodiment, the first value is 3.

In one embodiment, the first value is 4.

In one embodiment, the first value is no greater than 1706.

In one embodiment, the first value is configured by an RRC signaling.

In one embodiment, the first value is indicated by a MAC CE signaling.

In one embodiment, the first value is indicated by DCI.

In one embodiment, the first value is indicated by a signaling in the first signaling group.

In one embodiment, the reference mode is used to determine the target resource pool.

In one embodiment, the meaning of the statement in the present disclosure that the reference mode is used to determine the target resource pool includes: when the reference mode is the first mode, which one of multiple resource pools is the target resource pool is related to a number of bit(s) in the first bit block, one of the multiple resource pools being default or configurable, the first resource pool being one of the multiple resource pools; when the reference mode is the second mode, the target resource pool is the first resource pool.

In one embodiment, the determination of the target resource pool is related to the reference mode.

In one embodiment, the meaning of the statement in the present disclosure that the determination of the target resource pool is related to the reference mode includes: when the reference mode is the first mode, which one of multiple resource pools is the target resource pool is related to a number of bit(s) in the first bit block, one of the multiple resource pools being default or configurable, the first resource pool being one of the multiple resource pools; when the reference mode is the second mode, the target resource pool is the first resource pool.

In one embodiment, the second mode is NACK-only feedback, while the first mode is ACK/NACK feedback.

In one embodiment, the statement in the present disclosure that which one of multiple resource pools is the target resource pool is related to a number of bit(s) in the first bit block means that the number of bit(s) in the first bit block is used to determine the target resource pool from multiple resource pools.

In one embodiment, the first bit block comprises at most 2 HARQ-ACK bits; the statement in the present disclosure that which one of multiple resource pools is the target resource pool is related to a number of bit(s) in the first bit block means that when the reference mode is the first mode: when the first bit block comprises only 1 HARQ-ACK bit, the target resource pool is the first resource pool; when the first bit block comprises 2 HARQ-ACK bits, the target resource pool is one of the multiple resource pools other than the first resource pool.

In one embodiment, the first bit block comprises at most 2 HARQ-ACK bits; the statement in the present disclosure that which one of multiple resource pools is the target resource pool is related to a number of bit(s) in the first bit block means that when the reference mode is the first mode: when the first bit block comprises 2 HARQ-ACK bits, the target resource pool is the first resource pool; when the first bit block comprises only 1 HARQ-ACK bit, the target resource pool is one of the multiple resource pools other than the first resource pool.

In one embodiment, the first bit block comprises at most 2 HARQ-ACK bits; the statement in the present disclosure that which one of multiple resource pools is the target resource pool is related to a number of bit(s) in the first bit block means that 2 resource pools among multiple resource pools are respectively reserved for different numbers of UCI bits (or, HARQ-ACK bits), the target resource pool being one of the 2 resource pools that corresponds to the number of bit(s) in the first bit block.

In one subembodiment, the 2 resource pools include the first resource pool.

In one subembodiment, the 2 resource pools do not include the first resource pool.

In one subembodiment, one of the 2 resource pools is reserved for 1 UCI bit (or HARQ-ACK bit), while the other of the 2 resource pools is reserved for 2 UCI bits (or 2 HARQ-ACK bits); when the first bit block comprises only 1 HARQ-ACK bit, the target resource pool is the resource pool of the 2 resource pools being reserved for 1 UCI bit (or HARQ-ACK bit); when the first bit block comprises 2 HARQ-ACK bits, the target resource pool is the resource pool of the 2 resource pools being reserved for 2 UCI bits (or 2 HARQ-ACK bits).

Embodiment 15

Figure 15:
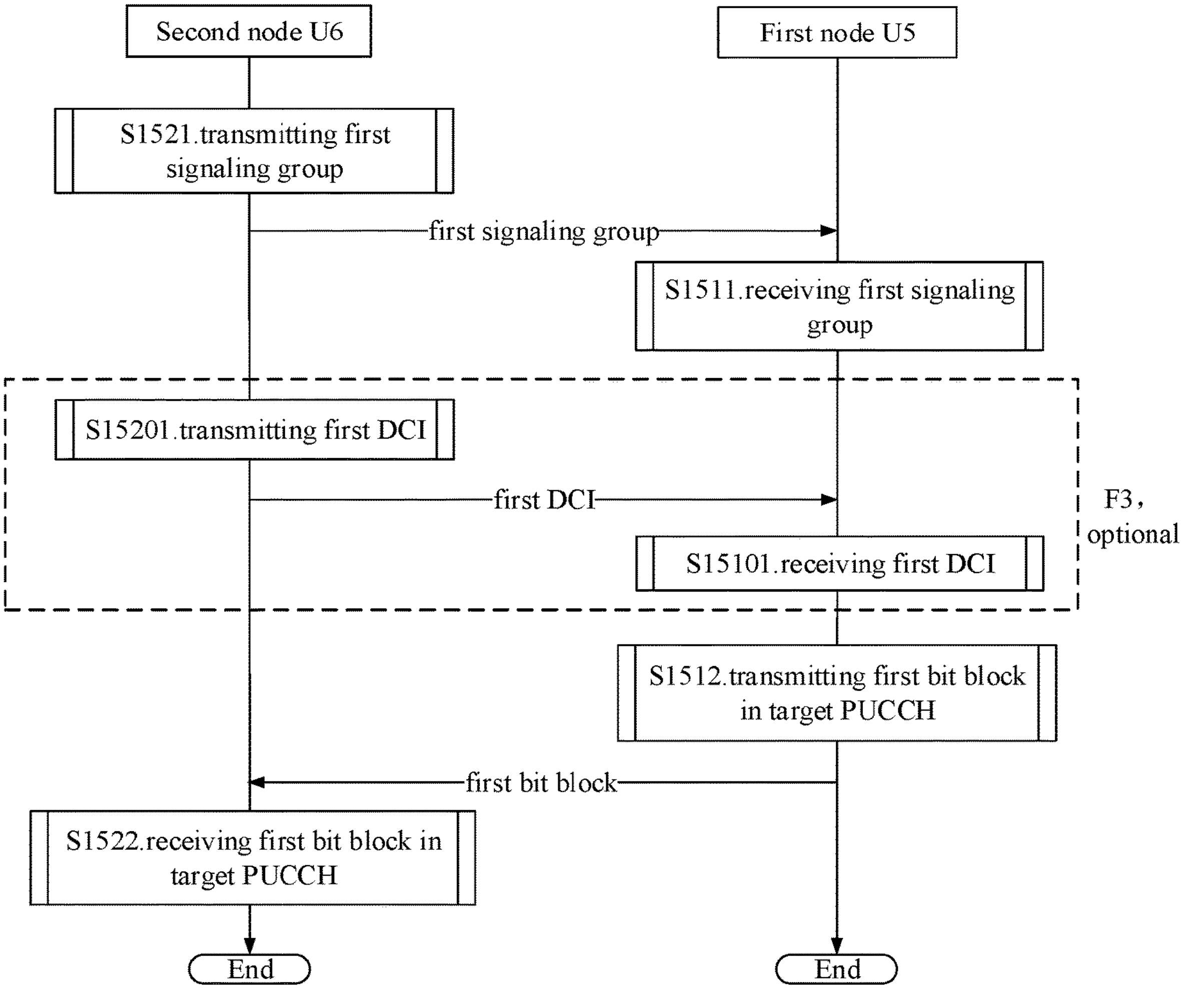
FIG. 15 illustrates a flowchart of signal transmission according to one embodiment of the present disclosure.

Embodiment 15 illustrates a flowchart of signal transmission according to one embodiment of the present disclosure, as shown in FIG. 15. In FIG. 15, a first node U5 and a second node U6 are in communications via an air interface. In FIG. 15, steps marked by the dotted-line box F3 are optional.

The first node U5 receives a first signaling group in step S1511; receives a first DCI in step S15101; and transmits a first bit block in a target PUCCH in step S1512.

The second node U6 transmits a first signaling group in step S1521; transmits a first DCI in step S15201; and receives a first bit block in a target PUCCH in step S1522.

In Embodiment 15, the first bit block comprises at least one bit; resources occupied by the target PUCCH belong to a target resource pool; the first signaling group is used to determine a first resource pool and a reference mode, the reference mode being either of a first mode and a second mode, the first mode and the second mode being different HARQ-ACK feedback modes, respectively; when the reference mode is the first mode, which one of multiple resource pools is the target resource pool is related to a number of bit(s) in the first bit block, one of the multiple resource pools being default or configurable, the first resource pool being one of the multiple resource pools; when the reference mode is the second mode, the target resource pool is the first resource pool; the first bit block comprises at least one HARQ-ACK bit indicating a NACK; the first mode being NACK-only feedback, the second mode being ACK/NACK feedback.

In one subembodiment of Embodiment 15, the first bit block comprises at most 2 HARQ-ACK bits; when the reference mode is the first mode: when the first bit block comprises only 1 HARQ-ACK bit, the target resource pool is the first resource pool; when the first bit block comprises 2 HARQ-ACK bits, the target resource pool is one of the multiple resource pools other than the first resource pool.

In one subembodiment of Embodiment 15, the first bit block comprises at most 2 HARQ-ACK bits; when the reference mode is the first mode: when the first bit block comprises 2 HARQ-ACK bits, the target resource pool is the first resource pool; when the first bit block comprises only 1 HARQ-ACK bit, the target resource pool is one of the multiple resource pools other than the first resource pool.

In one subembodiment of Embodiment 15, the first DCI comprises a first field, a value of the first field in the first DCI being equal to a third value, and an index of the target resource pool in a resource pool set to which the target resource pool belongs is related to the third value.

In one subembodiment of Embodiment 15, the first resource pool is a PUCCH resource set, the first DCI being used to determine PUCCH resources to which resources occupied by the target PUCCH belong from the target resource pool.

In one embodiment, the first node U5 is the first node in the present disclosure.

In one embodiment, the second node U6 is the second node in the present disclosure.

In one embodiment, the first node U5 is a UE.

In one embodiment, the first node U5 is a base station.

In one embodiment, the second node U6 is a base station.

In one embodiment, the second node U6 is a UE.

In one embodiment, an air interface between the second node U6 and the first node U5 is a Uu interface.

In one embodiment, an air interface between the second node U6 and the first node U5 includes a cellular link.

In one embodiment, an air interface between the second node U6 and the first node U5 is a PC5 interface.

In one embodiment, an air interface between the second node U6 and the first node U5 includes a sidelink.

In one embodiment, an air interface between the second node U6 and the first node U5 includes a radio interface between a base station and a UE.

In one embodiment, an air interface between the second node U6 and the first node U5 includes a radio interface between a UE and another UE.

In one embodiment, the first bit block comprises at least one HARQ-ACK bit indicating an ACK.

In one embodiment, the first bit block comprises at least one HARQ-ACK bit.

In one embodiment, a HARQ-ACK bit is a HARQ-ACK information bit.

In one embodiment, a HARQ-ACK bit is a bit used to indicate a decoding result of a TB or a DCI.

In one embodiment, when the reference mode is the first mode: the first resource pool and the resource pool among the multiple resource pools other than the first resource pool are respectively resource pools configured for the second mode and the first mode.

In one embodiment, when the reference mode is the first mode: the first resource pool and the resource pool among the multiple resource pools other than the first resource pool are respectively resource pools configured for the first mode and the second mode.

In one embodiment, when the reference mode is the second mode: the first resource pool is a resource pool configured for the second mode.

In one embodiment, the first resource pool is a resource pool reserved for transmission of NACK-only-including HARQ-ACK information.

In one embodiment, the resource pool among the multiple resource pools other than the first resource pool is a resource pool reserved for transmission of ACK- or NACK-including HARQ-ACK information.

In one embodiment, PUCCH resources in the first resource pool are all PUCCH resources reserved for transmission of NACK-only-including HARQ-ACK information.

In one embodiment, PUCCH resources in the resource pool among the multiple resource pools other than the first resource pool are all PUCCH resources reserved for transmission of ACK- or NACK-including HARQ-ACK information.

In one embodiment, the first resource pool is a resource pool reserved for transmission of ACK- or NACK-including HARQ-ACK information.

In one embodiment, the resource pool among the multiple resource pools other than the first resource pool is a resource pool reserved for transmission of NACK-only-including HARQ-ACK information.

In one embodiment, PUCCH resources in the first resource pool are all PUCCH resources reserved for transmission of ACK- or NACK-including HARQ-ACK information.

In one embodiment, PUCCH resources in the resource pool among the multiple resource pools other than the first resource pool are all PUCCH resources reserved for transmission of NACK-only-including HARQ-ACK information.

In one embodiment, the first resource pool is a resource pool configured for unicast services.

In one subembodiment, when the reference mode is the first mode: the resource pool among the multiple resource pools other than the first resource pool is a resource pool configured for MBS.

In one embodiment, the first resource pool is a resource pool configured for MBS.

In one subembodiment, when the reference mode is the first mode: the resource pool among the multiple resource pools other than the first resource pool is a resource pool configured for unicast services.

In one embodiment, in the NACK-only feedback mode, the HARQ-ACK information includes only NACK; in the ACK/NACK feedback mode, the HARQ-ACK information includes ACK or NACK.

In one embodiment, ACK- or NACK-including HARQ-ACK information is used to indicate whether a transport block or a DCI is correctly decoded.

In one embodiment, NACK-only-including HARQ-ACK information is used to indicate that a transport block or a DCI is not correctly decoded.

In one embodiment, the first DCI is a signaling in the first signaling group.

In one embodiment, the first DCI does not belong to the first signaling group.

In one embodiment, the first DCI is a DCI format 1_0.

In one embodiment, the first DCI is a DCI format 1_1.

In one embodiment, the first DCI is a DCI format 1_2.

In one embodiment, the first DCI is a DCI format 10, for the specific definition of the DCI format 1_0, refer to 3GPP TS38.212, Chapter 7.3.1.2.

In one embodiment, the first DCI is a DCI format 1_1, for the specific definition of the DCI format 1_1, refer to 3GPP TS38.212, Chapter 7.3.1.2.

In one embodiment, the first DCI is a DCI format 1_2, for the specific definition of the DCI format 1_2, refer to 3GPP TS38.212, Chapter 7.3.1.2.

In one embodiment, the first field comprises 1 bit.

In one embodiment, the first field comprises 2 bits.

In one embodiment, the first field comprises 3 bits.

In one embodiment, the first field is a PUCCH resource indicator field.

In one embodiment, the first field is an indication field in a DCI format 1_0.

In one embodiment, the first field is an indication field in a DCI format 1_1.

In one embodiment, the first field is an indication field in a DCI format 1_2.

In one embodiment, the third value is a non-negative integer.

In one embodiment, the third value is equal to one of 0 and 1.

In one embodiment, the third value is equal to one of 00, 01, 10, and 11.

In one embodiment, the third value is equal to one of 000, 001, 010, 011, 100, 101, 110, and 111.

In one embodiment, the third value is equal to 0.

In one embodiment, the third value is equal to 1.

In one embodiment, the third value is equal to 2.

In one embodiment, the third value is equal to 3.

In one embodiment, the third value is equal to 4.

In one embodiment, the third value is equal to 5.

In one embodiment, the third value is equal to 6.

In one embodiment, the third value is equal to 7.

In one embodiment, the third value is one of 0 through 7.

In one embodiment, the third value is mapped to the index of the target resource pool in the resource pool set to which the target resource pool belongs by means of looking up tables.

In one embodiment, the resource pool set to which the target resource pool belongs is configured by a higher layer signaling.

In one embodiment, the resource pool set to which the target resource pool belongs is configured by an RRC signaling.

In one embodiment, the resource pool set to which the target resource pool belongs is a PUCCH resource set.

In one embodiment, the third value is used to determine the index of the target resource pool in the resource pool set to which the target resource pool belongs.

In one embodiment, the third value is used to indicate the index of the target resource pool in the resource pool set to which the target resource pool belongs.

In one embodiment, the index of the target resource pool in the resource pool set to which the target resource pool belongs is related to both an index of a first CCE occupied by a PDCCH used to transmit the first DCI and the third value.

In one embodiment, when the number of PUCCH resources comprised in the resource pool set to which the target resource pool belongs is no greater than 8: the third value is mapped to the index of the target resource pool in the resource pool set to which the target resource pool belongs by means of looking up tables.

In one embodiment, when the number of PUCCH resources comprised in the resource pool set to which the target resource pool belongs is greater than 8: the first node determines the index $r_{PUCCH}$ of the target resource pool in the resource pool set to which the target resource pool belongs as follows:

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

where the $R_{PUCCH}$ is equal to the number of PUCCH resources comprised in the resource pool set to which the target resource pool belongs; the $N_{CCE,p}$ is the number of Control channel elements (CCEs) in a Control resource set (CORESET) for Physical downlink control channel (PDCCH) reception for the first DCI; the $n_{CCE,p}$ is the index of the first CCE for the PDCCH reception for the first DCI, the $\Delta_{PRI}$ is the third value.

In one embodiment, the PUCCH resource to which the resources occupied by the target PUCCH belong refers to: a PUCCH resource corresponding to the target PUCCH.

In one embodiment, the first DCI is used to indicate a PUCCH resources to which resources occupied by the target PUCCH belong from the target resource pool.

In one embodiment, the target resource pool is a PUCCH resource set, the first DCI being used to indicate an index of the PUCCH resource to which the resources occupied by the target PUCCH belong in the target resource pool.

In one embodiment, the value of a PUCCH resource indicator field in the first DCI is used to indicate an index of the PUCCH resource to which the resources occupied by the target PUCCH belong in the target resource pool.

In one embodiment, an index of a first CCE occupied by a PDCCH used to transmit the first DCI is used to determine an index of the PUCCH resource to which the resources occupied by the target PUCCH belong in the target resource pool.

In one embodiment, an index of a first CCE occupied by a PDCCH used to transmit the first DCI and a PUCCH resource indicator field in the first DCI are used together to determine an index of the PUCCH resource to which the resources occupied by the target PUCCH belong in the target resource pool.

In one embodiment, the target resource pool is a PUCCH resource set; when the number of PUCCH resources comprised in the target resource pool is no greater than 8: the value of a PUCCH resource indicator field in the first DCI is mapped to an index of the PUCCH resource to which the resources occupied by the target PUCCH belong in the target resource pool by means of looking up tables.

In one embodiment, the target resource pool is a PUCCH resource set; when the number of PUCCH resources comprised in the target resource pool is greater than 8: the first node determines an index $r_{PUCCH}$ of the PUCCH resource to which the resources occupied by the target PUCCH belong in the target resource pool, defined as follows:

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

where the $R_{PUCCH}$ is equal to the number of PUCCH resources comprised in the target resource pool; the $N_{CCE,p}$ is the number of Control channel elements (CCEs) in a Control resource set (CORESET) for Physical downlink control channel (PDCCH) reception for the first DCI; the $n_{CCE,p}$ is the index of the first CCE for the PDCCH reception for the first DCI, the Δ_PRI is the value of a PUCCH resource indicator field in the first DCI; if the first DCI does not include a PUCCH resource indicator field, the $\Delta_{PRI}$ is equal to 0.

In one embodiment, the first DCI is a signaling in the first signaling group.

In one embodiment, the first DCI does not belong to the first signaling group.

In one embodiment, the first DCI is used to indicate the reference mode.

In one embodiment, the first DCI is used to explicitly indicate the reference mode.

In one embodiment, the first DCI is used to implicitly indicate the reference mode.

In one embodiment, the first resource pool is a PUCCH resource set; the number of PUCCH resources comprised in the first resource pool being no greater than 8; the reference mode is a HARQ-ACK feedback mode configured to a reference PUCCH resource, the reference PUCCH resource being a PUCCH resource in the first resource pool, where the value of a PUCCH resource indicator field in the first DCI is mapped to an index of the reference PUCCH resource in the first resource pool by means of looking up tables.

In one embodiment, the first resource pool is a PUCCH resource set; the number of PUCCH resources comprised in the first resource pool being greater than 8; the reference mode is a HARQ-ACK feedback mode configured to a reference PUCCH resource, the reference PUCCH resource being a PUCCH resource in the first resource pool, where an index $u_{PUCCH}$ of the reference PUCCH resource in the first resource pool is given as follows.

$$u_{PUCCH} = \begin{cases} \left\lfloor \frac{n_{CCE,p} \cdot \lceil U_{PUCCH}/8 \rceil}{N_{CCE,p}} \right\rfloor + \Delta_{PRI} \cdot \left\lceil \frac{U_{PUCCH}}{8} \right\rceil & \text{if } \Delta_{PRI} < U_{PUCCH} \bmod 8 \\ \left\lfloor \frac{n_{CCE,p} \cdot \lfloor U_{PUCCH}/8 \rfloor}{N_{CCE,p}} \right\rfloor + \Delta_{PRI} \cdot \left\lfloor \frac{U_{PUCCH}}{8} \right\rfloor + U_{PUCCH} \bmod 8 & \text{if } \Delta_{PRI} \geq U_{PUCCH} \bmod 8 \end{cases}$$

where the $U_{PUCCH}$ is equal to the number of PUCCH resources comprised in the first resource pool; the $N_{CCE,p}$ is the number of Control channel elements (CCEs) in a Control resource set (CORESET) for Physical downlink control channel (PDCCH) reception for the first DCI; the $n_{CCE,p}$ is the index of the first CCE for the PDCCH reception for the first DCI, the $\Delta_{PRI}$ is the value of a PUCCH resource indicator field in the first DCI; if the first DCI does not include a PUCCH resource indicator field, the $\Delta_{PRI}$ is equal to 0.

In one embodiment, steps marked by the dotted-line box F3 exist.

In one embodiment, steps marked by the dotted-line box F3 do not exist.

Embodiment 16

Figure 16:
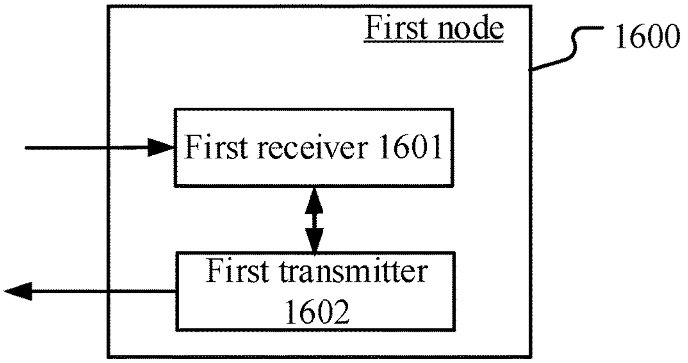
FIG. 16 illustrates a structure block diagram of a processing device in a first node according to one embodiment of the present disclosure.

Embodiment 16 illustrates a structure block diagram a processing device in a first node, as shown in FIG. 16. In FIG. 16, a processing device 1600 in a first node comprises a first receiver 1601 and a first transmitter 1602.

In one embodiment, the first node 1600 is a UE.

In one embodiment, the first node 1600 is a relay node.

In one embodiment, the first node 1600 is vehicle-mounted communication equipment.

In one embodiment, the first node 1600 is a UE supporting V2X communications.

In one embodiment, the first node 1600 is a relay node supporting V2X communications.

In one embodiment, the first receiver 1601 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1601 comprises at least the first five of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1601 comprises at least the first four of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1601 comprises at least the first three of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1601 comprises at least the first two of the antenna 452, the receiver 454, the multi-antenna receiving processor 458, the receiving processor 456, the controller/processor 459, the memory 460 and the data source 467 in FIG. 4 of the present disclosure.

In one embodiment, the first transmitter 1602 comprises at least one of the antenna 452, the transmitter 454, the multi-antenna transmitting processor 457, the transmitting processor 468, the controller/processor 459, the memory 460 or the data source 467 in FIG. 4 of the present disclosure.

In one embodiment, the first transmitter 1602 comprises at least the first five of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1602 comprises at least the first four of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1602 comprises at least the first two of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1602 comprises at least the first two of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first receiver 1601 receives a first information group and a target bit block set, the first information group used to determine X1 control resources, X1 being a positive integer greater than 1, the target bit block set comprising at least one bit block; the first transmitter 1602 transmits a first PUSCH in a first resource pool; herein, the X1 control resources are respectively reserved for X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the first PUSCH is used to transmit ACK/NACK feedback for bit block(s) in the target bit block set; when each of the X1 control resources is orthogonal to the first resource pool in time domain, at most X2 PUCCH(s) among the X1 PUCCHs is(are) used to transmit HARQ-ACK feedback for the bit block(s) in the target bit block set, X2 being a positive integer less than X1.

In one embodiment, when each of the X1 control resources is orthogonal to the first resource pool in time domain: when at least one bit block in the target bit block set is not correctly decoded: only one PUCCH of the X1 PUCCHs is used to transmit a NACK, and a decoding result of the bit block(s) in the target bit block set is used to determine which one of the X1 PUCCHs is used to transmit the NACK.

In one embodiment, when each of the X1 control resources is orthogonal to the first resource pool in time domain: when each of the bit block(s) in the target bit block set is correctly decoded: dropping transmitting HARQ-ACK feedback for the target bit block set in the X1 PUCCHs.

In one embodiment, at least one bit block in the target bit block set is not correctly decoded, and the decoding result of the bit block(s) in the target bit block set is one of X1 different decoding results, the X1 different decoding results respectively corresponding to the X1 PUCCHs; when each of the X1 control resources is orthogonal to the first resource pool in time domain: a PUCCH corresponding to the decoding result of the bit block(s) in the target bit block set among the X1 PUCCHs is used to transmit a NACK.

In one embodiment, at least one bit block in the target bit block set is not correctly decoded, the decoding result of the bit block(s) in the target bit block set is one of X3 different decoding results, each of the X3 different decoding results corresponding to one of the X1 PUCCHs, X3 being no less than X1; when each of the X1 control resources is orthogonal to the first resource pool in time domain: a PUCCH corresponding to the decoding result of the bit block(s) in the target bit block set among the X1 PUCCHs is used to transmit HARQ-ACK feedback for the bit block(s) in the target bit block set.

In one embodiment, when each of the X1 control resources is orthogonal to the first resource pool in time domain: when the decoding result of the bits block(s) in the target bit block set is one of X4 different decoding results, a PUCCH corresponding to the decoding result of the bits block(s) in the target bit block set among the X1 PUCCHs is used to transmit a NACK; when the decoding result of the bits block(s) in the target bit block set is not one of the X4 different decoding results, a PUCCH corresponding to the decoding result of the bits block(s) in the target bit block set among the X1 PUCCHs is used to transmit ACK/NACK feedback for the bit block(s) in the target bit block set; the X3 different decoding results include the X4 different decoding results, X4 being less than X3.

In one embodiment, a number of bit block(s) in the target bit block set is used to determine X1.

In one embodiment, the first receiver 1601 receives a first information group and a target bit block set, the first information group used to determine X1 control resources, X1 being a positive integer greater than 1, the target bit block set comprising at least one bit block; the first transmitter 1602 transmits a first PUSCH in a first resource pool; herein, the X1 control resources are respectively reserved for X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the first PUSCH is used to transmit ACK/NACK feedback for bit block(s) in the target bit block set; when each of the X1 control resources is orthogonal to the first resource pool in time domain and at least one bit block in the target bit block set is not correctly decoded, only one PUCCH of the X1 PUCCHs is used to transmit the HARQ-ACK feedback for the bit block(s) in the target bit block set, and a decoding result of the bit block(s) in the target bit block set is used to determine which one of the X1 PUCCHs is used to transmit the HARQ-ACK feedback for the bit block(s) in the target bit block set.

In one subembodiment, when each of the X1 control resources is orthogonal to the first resource pool in time domain and at least one bit block in the target bit block set is not correctly decoded: the decoding result of the bit block(s) in the target bit block set is one of X1 different decoding results, the X1 different decoding results respectively corresponding to the X1 PUCCHs; a PUCCH corresponding to the decoding result of the bit block(s) in the target bit block set among the X1 PUCCHs is used to transmit a NACK.

In one subembodiment, when each of the X1 control resources is orthogonal to the first resource pool in time domain and at least one bit block in the target bit block set is not correctly decoded: the decoding result of the bit block(s) in the target bit block set is one of X3 different decoding results, each of the X3 different decoding results corresponding to one of the X1 PUCCHs, X3 being no less than X1; a PUCCH corresponding to the decoding result of the bit block(s) in the target bit block set among the X1 PUCCHs is used to transmit HARQ-ACK feedback for the bit block(s) in the target bit block set.

In one subembodiment, when each of the X1 control resources is orthogonal to the first resource pool in time domain and at least one bit block in the target bit block set is not correctly decoded: {the decoding result of the bit block(s) in the target bit block set is one of X3 different decoding results, each of the X3 different decoding results corresponding to one of the X1 PUCCHs, X3 being no less than X1; when the decoding result of the bits block(s) in the target bit block set is one of X4 different decoding results, a PUCCH corresponding to the decoding result of the bits block(s) in the target bit block set among the X1 PUCCHs is used to transmit a NACK; when the decoding result of the bit block(s) in the target bit block set is not one of the X4 different decoding results, a PUCCH corresponding to the decoding result of the bits block(s) in the target bit block set among the X1 PUCCHs is used to transmit ACK/NACK feedback for the bit block(s) in the target bit block set; the X3 different decoding results include the X4 different decoding results, X4 being less than X3}.

In one subembodiment, when each of the X1 control resources is orthogonal to the first resource pool in time domain and at least one bit block in the target bit block set is not correctly decoded: the decoding result of the bit block(s) in the target bit block set is one of X1 different decoding results, the X1 different decoding results respectively corresponding to the X1 PUCCHs; a PUCCH corresponding to the decoding result of the bit block(s) in the target bit block set among the X1 PUCCHs is used to transmit NACK-only feedback for the bit block(s) in the target bit block set.

In one subembodiment, when each of the X1 control resources is orthogonal to the first resource pool in time domain and at least one bit block in the target bit block set is not correctly decoded: {the decoding result of the bit block(s) in the target bit block set is one of X3 different decoding results, each of the X3 different decoding results corresponding to one of the X1 PUCCHs, X3 being no less than X1; when the decoding result of the bits block(s) in the target bit block set is one of X4 different decoding results, a PUCCH corresponding to the decoding result of the bits block(s) in the target bit block set among the X1 PUCCHs is used to transmit NACK-only feedback for the bit block(s) in the target bit block set; when the decoding result of the bit block(s) in the target bit block set is not one of the X4 different decoding results, a PUCCH corresponding to the decoding result of the bits block(s) in the target bit block set among the X1 PUCCHs is used to transmit ACK/NACK feedback for the bit block(s) in the target bit block set; the X3 different decoding results include the X4 different decoding results, X4 being less than X3}.

In one embodiment, the first receiver 1601 receives a first information group and a target bit block set, the first information group used to determine X1 control resources, X1 being a positive integer greater than 1, the target bit block set comprising at least one bit block; the first transmitter 1602 transmits HARQ-ACK feedback for bit block(s) in the target bit block set in at most X2 PUCCH(s) among X1 PUCCHs, X2 being a positive integer less than X1; and the first transmitter 1602 transmits a first PUSCH in a first resource pool, or, does not transmit the first PUSCH in the first resource pool; herein, the X1 control resources are respectively reserved for the X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the first transmitter 1602 does not transmit the first PUSCH in the first resource pool; when each of the X1 control resources is orthogonal to the first resource pool in time domain, the first transmitter 1602 transmits the first PUSCH in the first resource pool.

In one embodiment, when there exists one resource among the X1 control resources that overlaps with the first resource pool in time domain: whether or not the control resource among the X1 control resources that overlaps with the first resource pool in time domain is used to transmit a PUCCH, the first transmitter 1602 does not transmit the first PUSCH in the first resource pool.

In one embodiment, at least one bit block in the target bit block set is not correctly decoded, the first transmitter 1602 transmits the HARQ-ACK feedback for the bit block(s) in the target bit block set in only a first PUCCH among the X1 PUCCHs; when there exists one resource among the X1 control resources that overlaps with the first resource pool in time domain: whether or not a control resource corresponding to the first PUCCH overlaps with the first resource pool in time domain, the first transmitter 1602 does not transmit the first PUSCH in the first resource pool.

In one embodiment, when each of the bit block(s) in the target bit block set is correctly decoded: the first transmitter 1602 does not transmit HARQ-ACK feedback for the target bit block set in the X1 PUCCHs.

In one embodiment, when at least one bit block in the target bit block set is not correctly decoded: only one PUCCH of the X1 PUCCHs is used to transmit a NACK, and a decoding result of the bit block(s) in the target bit block set is used to determine which one of the X1 PUCCHs is used to transmit the NACK.

In one embodiment, when at least one bit block in the target bit block set is not correctly decoded, the decoding result of the bit block(s) in the target bit block set is one of X1 different decoding results, the X1 different decoding results respectively corresponding to the X1 PUCCHs; a PUCCH corresponding to the decoding result of the bit block(s) in the target bit block set among the X1 PUCCHs is used to transmit a NACK.

In one embodiment, when at least one bit block in the target bit block set is not correctly decoded: the decoding result of the bit block(s) in the target bit block set is one of X3 different decoding results, each of the X3 different decoding results corresponding to one of the X1 PUCCHs, X3 being no less than X1; a PUCCH corresponding to the decoding result of the bit block(s) in the target bit block set among the X1 PUCCHs is used to transmit HARQ-ACK feedback for the bit block(s) in the target bit block set.

In one embodiment, when at least one bit block in the target bit block set is not correctly decoded: when the decoding result of the bits block(s) in the target bit block set is one of X4 different decoding results, a PUCCH corresponding to the decoding result of the bits block(s) in the target bit block set among the X1 PUCCHs is used to transmit a NACK; when the decoding result of the bits block(s) in the target bit block set is not one of the X4 different decoding results, a PUCCH corresponding to the decoding result of the bits block(s) in the target bit block set among the X1 PUCCHs is used to transmit ACK/NACK feedback for the bit block(s) in the target bit block set; the X3 different decoding results include the X4 different decoding results, X4 being less than X3.

In one embodiment, a number of bit block(s) in the target bit block set is used to determine X1.

In one embodiment, the first receiver 1601 receives a first information group and a target bit block set, the first information group used to determine X1 control resources, X1 being a positive integer greater than 1, the target bit block set comprising at least one bit block; the first transmitter 1602 transmits HARQ-ACK feedback for bit block(s) in the target bit block set in at most one PUCCH of X1 PUCCHs; and the first transmitter 1602 transmits a first PUSCH in a first resource pool, or, does not transmit the first PUSCH in the first resource pool; herein, the X1 control resources are respectively reserved for the X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, whether or not the control resource among the X1 control resources that overlaps with the first resource pool in time domain is used to transmit a PUCCH, the first node does not transmit the first PUSCH in the first resource pool; when each of the X1 control resources is orthogonal to the first resource pool in time domain, the first node transmits the first PUSCH in the first resource pool.

In one subembodiment, when each of the bit block(s) in the target bit block set is correctly decoded: the first node does not transmit HARQ-ACK feedback for the target bit block set in the X1 PUCCHs.

In one subembodiment, when at least one bit block in the target bit block set is not correctly decoded: only one PUCCH of the X1 PUCCHs is used to transmit a NACK, and a decoding result of the bit block(s) in the target bit block set is used to determine which one of the X1 PUCCHs is used to transmit the NACK.

In one subembodiment, when at least one bit block in the target bit block set is not correctly decoded, the decoding result of the bit block(s) in the target bit block set is one of X1 different decoding results, the X1 different decoding results respectively corresponding to the X1 PUCCHs; a PUCCH corresponding to the decoding result of the bit block(s) in the target bit block set among the X1 PUCCHs is used to transmit a NACK.

In one subembodiment, when at least one bit block in the target bit block set is not correctly decoded: {the decoding result of the bit block(s) in the target bit block set is one of X3 different decoding results, each of the X3 different decoding results corresponding to one of the X1 PUCCHs, X3 being no less than X1; when the decoding result of the bits block(s) in the target bit block set is one of X4 different decoding results, a PUCCH corresponding to the decoding result of the bits block(s) in the target bit block set among the X1 PUCCHs is used to transmit a NACK; when the decoding result of the bit block(s) in the target bit block set is not one of the X4 different decoding results, a PUCCH corresponding to the decoding result of the bits block(s) in the target bit block set among the X1 PUCCHs is used to transmit ACK/NACK feedback for the bit block(s) in the target bit block set; the X3 different decoding results include the X4 different decoding results, X4 being less than X3}.

In one embodiment, in the present application, transmitting a PUCCH in a control resource means: transmitting a signal in a PUCCH corresponding to the control resource.

In one embodiment, in the present application, transmitting a PUCCH in a control resource means: transmitting a UCI in a PUCCH corresponding to the control resource.

In one embodiment, in the present application, transmitting a PUCCH in a control resource means: transmitting HARQ-ACK information in a PUCCH corresponding to the control resource.

In one embodiment, the first receiver 1601 receives a first information group and a target bit block set, the first information group used to determine X1 control resources, X1 being a positive integer greater than 1, the target bit block set comprising at least one bit block; the first transmitter 1602 transmits a first PUSCH in a first resource pool; herein, the X1 control resources are respectively reserved for X1 PUCCHs, at least one of the X1 PUCCHs being a PUCCH for ACK-only feedback, and any bit block in the target bit block set comprises at least one bit; when there exists one control resource among the X1 control resources that is overlapping with the first resource pool in time domain, the first PUSCH is used to transmit ACK/NACK feedback for bit block(s) in the target bit block set; when each of the X1 control resources is orthogonal to the first resource pool in time domain, at most X2 PUCCH(s) among the X1 PUCCHs is(are) used to transmit HARQ-ACK feedback for the bit block(s) in the target bit block set, X2 being a positive integer less than X1.

In one embodiment, the first receiver 1601 receives a first information group and a target bit block set, the first information group used to determine X1 control resources, X1 being a positive integer greater than 1, the target bit block set comprising at least one bit block; the first transmitter 1602 transmits a first PUSCH in a first resource pool; herein, the X1 control resources are respectively reserved for X1 PUCCHs, at least one of the X1 PUCCHs being a PUCCH for ACK-only feedback, and any bit block in the target bit block set comprises at least one bit; when there exists one control resource among the X1 control resources that is overlapping with the first resource pool in time domain, the first PUSCH is used to transmit ACK/NACK feedback for bit block(s) in the target bit block set; when each of the X1 control resources is orthogonal to the first resource pool in time domain, at most X2 PUCCH(s) among the X1 PUCCHs is(are) used to transmit HARQ-ACK feedback for the bit block(s) in the target bit block set, X2 being a positive integer less than X1.

In one subembodiment, when each of the X1 control resources is orthogonal to the first resource pool in time domain: {when at least one bit block in the target bit block set is correctly decoded, only one PUCCH of the X1 PUCCHs is used to transmit an ACK, the decoding result of the bit block(s) in the target bit block set is one of X1 different decoding results, the X1 different decoding results respectively corresponding to the X1 PUCCHs; a PUCCH corresponding to the decoding result of the bit block(s) in the target bit block set among the X1 PUCCHs is used to transmit an ACK; when each of the bit block(s) in the target bit block set is not correctly decoded, the first node does not transmit HARQ-ACK feedback for the target bit block set in the X1 PUCCHs}.

In one subembodiment, when each of the X1 control resources is orthogonal to the first resource pool in time domain and each of the bit block(s) in the target bit block set is not correctly decoded, the first node does not transmit HARQ-ACK feedback for the target bit block set in the X1 PUCCHs; when each of the X1 control resources is orthogonal to the first resource pool in time domain and at least one bit block in the target bit block set is correctly decoded: {the decoding result of the bit block(s) in the target bit block set is one of X3 different decoding results, each of the X3 different decoding results corresponding to one of the X1

PUCCHs, X3 being no less than X1; when the decoding result of the bits block(s) in the target bit block set is one of X4 different decoding results, a PUCCH corresponding to the decoding result of the bits block(s) in the target bit block set among the X1 PUCCHs is used to transmit an ACK; when the decoding result of the bits block(s) in the target bit block set is not one of the X4 different decoding results, a PUCCH corresponding to the decoding result of the bits block(s) in the target bit block set among the X1 PUCCHs is used to transmit ACK/NACK feedback for the bit block(s) in the target bit block set; the X3 different decoding results include the X4 different decoding results, X4 being less than X3}.

In one subembodiment, a number of bit block(s) in the target bit block set is used to determine X1.

In one embodiment, the first receiver 1601 receives a first information group and a target bit block set, the first information group used to determine X1 control resources, X1 being a positive integer greater than 1, the target bit block set comprising at least one bit block; the first transmitter 1602 transmits HARQ-ACK feedback for bit block(s) in the target bit block set in at most one PUCCH of X1 PUCCHs; and the first transmitter 1602 transmits a first PUSCH in a first resource pool, or, does not transmit the first PUSCH in the first resource pool; herein, the X1 control resources are respectively reserved for the X1 PUCCHs, at least one of the X1 PUCCHs being a PUCCH for ACK-only feedback, and any bit block in the target bit block set comprises at least one bit; when there exists one control resource among the X1 control resources that is overlapping with the first resource pool in time domain, the first transmitter 1602 does not transmit the first PUSCH in the first resource pool; when each of the X1 control resources is orthogonal to the first resource pool in time domain, the first transmitter 1602 transmits the first PUSCH in the first resource pool.

In one embodiment, the first receiver 1601 receives a first signaling group; the first transmitter 1602 transmits a first bit block in a target PUCCH, the first bit block comprising at least one bit; herein, resources occupied by the target PUCCH belong to a target resource pool; the first signaling group is used to determine a first resource pool and a reference mode, the reference mode being either of a first mode and a second mode, the first mode and the second mode being different HARQ-ACK feedback modes, respectively; when the reference mode is the first mode, which one of multiple resource pools is the target resource pool is related to a number of bit(s) in the first bit block, one of the multiple resource pools being default or configurable, the first resource pool being one of the multiple resource pools; when the reference mode is the second mode, the target resource pool is the first resource pool.

In one embodiment, the first bit block comprises at least one HARQ-ACK bit indicating a NACK.

In one embodiment, the first bit block comprises at most 2 HARQ-ACK bits; when the reference mode is the first mode: when the first bit block comprises only 1 HARQ-ACK bit, the target resource pool is the first resource pool; when the first bit block comprises 2 HARQ-ACK bits, the target resource pool is one of the multiple resource pools other than the first resource pool.

In one embodiment, the first bit block comprises at most 2 HARQ-ACK bits; when the reference mode is the first mode: when the first bit block comprises 2 HARQ-ACK bits, the target resource pool is the first resource pool; when the first bit block comprises only 1 HARQ-ACK bit, the target resource pool is one of the multiple resource pools other than the first resource pool.

In one embodiment, the first mode is NACK-only feedback, while the second mode is ACK/NACK feedback.

In one embodiment, the first receiver 1601 receives a first DCI; herein, the first DCI comprises a first field, a value of the first field in the first DCI being equal to a third value, and an index of the target resource pool in a resource pool set to which the target resource pool belongs is related to the third value.

In one embodiment, the first receiver 1601 receives a first DCI; herein, the first DCI is used to determine PUCCH resources to which resources occupied by the target PUCCH belong from the target resource pool.

In one embodiment, the first receiver 1601 receives a first signaling group; the first transmitter 1602 transmits a first bit block in a target PUCCH, the first bit block comprising at most 2 HARQ-ACK bits; herein, resources occupied by the target PUCCH belong to a target resource pool; the first signaling group is used to determine a first resource pool and a reference mode, the first resource pool being a PUCCH resource set, the reference mode being either of a first mode and a second mode, the first mode is NACK-only feedback, while the second mode is ACK/NACK feedback; when the reference mode is the second mode, the target resource pool is the first resource pool; when the reference mode is the first mode and the first bit block comprises 2 HARQ-ACK bits, the target resource pool is a PUCCH resource set different from the first resource pool; when the reference mode is the first mode and the first bit block comprises only 1 HARQ-ACK bit, the target resource pool is the first resource pool.

In one subembodiment, an IE in the first signaling group that includes PUCCH-Config in its name is used to configure the first resource pool, the reference mode being a HARQ-ACK feedback mode configured for the first resource pool.

In one subembodiment, an IE in the first signaling group that includes PUCCH-Config in its name is used to configure the first resource pool.

In one subembodiment, an IE in the first signaling group is used to indicate the reference mode.

In one subembodiment, a DCI in the first signaling group is used to indicate the reference mode.

In one subembodiment, the PUCCH resource set that is different from the first resource pool is configured by an RRC signaling.

In one embodiment, the first receiver 1601 receives a first signaling group; the first transmitter 1602 transmits a first bit block in a target PUCCH, the first bit block comprising at most 2 HARQ-ACK bits; herein, resources occupied by the target PUCCH belong to a target resource pool; the first signaling group is used to determine a first resource pool and a reference mode, the first resource pool being a PUCCH resource set, the reference mode being either of a first mode and a second mode, the first mode is NACK-only feedback, while the second mode is ACK/NACK feedback; when the reference mode is the second mode, the target resource pool is the first resource pool; when the reference mode is the first mode and the first bit block comprises only 1 HARQ-ACK bit, the target resource pool is a PUCCH resource set different from the first resource pool; when the reference mode is the first mode and the first bit block comprises 2 HARQ-ACK bits, the target resource pool is the first resource pool.

In one subembodiment, an IE in the first signaling group that includes PUCCH-Config in its name is used to configure the first resource pool, the reference mode being a HARQ-ACK feedback mode configured for the first resource pool.

In one subembodiment, an IE in the first signaling group that includes PUCCH-Config in its name is used to configure the first resource pool.

In one subembodiment, an IE in the first signaling group is used to indicate the reference mode.

In one subembodiment, a DCI in the first signaling group is used to indicate the reference mode.

In one subembodiment, the PUCCH resource set that is different from the first resource pool is configured by an RRC signaling.

In one embodiment, the first receiver 1601 receives a first signaling group; the first transmitter 1602 transmits a first bit block in a target PUCCH, the first bit block comprising at most 2 HARQ-ACK bits; herein, resources occupied by the target PUCCH belong to a target resource pool; the first signaling group is used to determine a first resource pool and a reference mode, the first resource pool being a PUCCH resource set, the reference mode being either of a first mode and a second mode, the first mode is NACK-only feedback, while the second mode is ACK/NACK feedback; when the reference mode is the second mode, the target resource pool is the first resource pool; when the reference mode is the first mode and the first bit block comprises only 1 HARQ-ACK bit, the target resource pool is a second resource pool, the second resource pool being a PUCCH resource set and being different from the first resource pool; when the reference mode is the first mode and the first bit block comprises 2 HARQ-ACK bits, the target resource pool is a third resource pool, the third resource pool being a PUCCH resource set and being different from the first resource pool, and the third resource pool being different from the second resource pool.

In one subembodiment, an IE in the first signaling group that includes PUCCH-Config in its name is used to configure the first resource pool, the reference mode being a HARQ-ACK feedback mode configured for the first resource pool.

In one subembodiment, an IE in the first signaling group that includes PUCCH-Config in its name is used to configure the first resource pool.

In one subembodiment, an IE in the first signaling group is used to indicate the reference mode.

In one subembodiment, a DCI in the first signaling group is used to indicate the reference mode.

In one subembodiment, the first resource pool is a PUCCH resource set configured for ACK/NACK feedback to the MBS, the second resource pool is a PUCCH resource set configured for NACK-only feedback to the MBS, and the third resource pool is a PUCCH resource set configured for unicasting.

In one subembodiment, the multiple resource pools in the present application include the first resource pool, the second resource pool, and the third resource pool; the first resource pool, the second resource pool, and the third resource pool are configured in three different PUCCH-Configs, respectively.

In one embodiment, the first bit block comprises at most 2 HARQ-ACK bits; when the reference mode is the second mode: whether the first bit block comprises only 1 HARQ-ACK bit or 2 HARQ-ACK bits, the target resource pool is the same PUCCH resource set.

In one embodiment, the first receiver 1601 receives a first signaling group; the first transmitter 1602 transmits a first bit block in a target PUCCH, the first bit block comprising at most 2 HARQ-ACK bits; herein, resources occupied by the target PUCCH belong to a target resource pool; the first signaling group is used to determine a first resource pool and a reference mode, the first resource pool being a PUCCH resource, the reference mode being either of a first mode and a second mode, the first mode is NACK-only feedback, while the second mode is ACK/NACK feedback; when the reference mode is the second mode, the target resource pool is the first resource pool; when the reference mode is the first mode and the first bit block comprises 2 HARQ-ACK bits, the target resource pool is a PUCCH resource different from the first resource pool; when the reference mode is the first mode and the first bit block comprises only 1 HARQ-ACK bit, the target resource pool is the first resource pool.

In one subembodiment, an IE in the first signaling group that includes SPS-PUCCH-AN-List in its name is used to indicate the first resource pool, the reference mode being a HARQ-ACK feedback mode configured for the first resource pool.

In one subembodiment, an IE in the first signaling group that includes SPS-PUCCH-AN-List in its name is used to indicate the first resource pool.

In one subembodiment, an IE in the first signaling group is used to indicate the reference mode.

In one subembodiment, two different SPS-PUCCH-AN-Lists respectively indicate the first resource pool and a PUCCH resource different from the first resource pool.

In one subembodiment, the same SPS-PUCCH-AN-List indicates the first resource pool and a PUCCH resource different from the first resource pool.

In one embodiment, the first receiver 1601 receives a first signaling group; the first transmitter 1602 transmits a first bit block in a target PUCCH, the first bit block comprising at most 2 HARQ-ACK bits; herein, resources occupied by the target PUCCH belong to a target resource pool; the first signaling group is used to determine a first resource pool and a reference mode, the first resource pool being a PUCCH resource, the reference mode being either of a first mode and a second mode, the first mode is NACK-only feedback, while the second mode is ACK/NACK feedback; when the reference mode is the second mode, the target resource pool is the first resource pool; when the reference mode is the first mode and the first bit block comprises only 1 HARQ-ACK bit, the target resource pool is a PUCCH resource different from the first resource pool; when the reference mode is the first mode and the first bit block comprises 2 HARQ-ACK bits, the target resource pool is the first resource pool.

In one subembodiment, an IE in the first signaling group that includes SPS-PUCCH-AN-List in its name is used to indicate the first resource pool, the reference mode being a HARQ-ACK feedback mode configured for the first resource pool.

In one subembodiment, an IE in the first signaling group that includes SPS-PUCCH-AN-List in its name is used to indicate the first resource pool.

In one subembodiment, an IE in the first signaling group is used to indicate the reference mode.

In one subembodiment, two different SPS-PUCCH-AN-Lists respectively indicate the first resource pool and a PUCCH resource different from the first resource pool.

In one subembodiment, the same SPS-PUCCH-AN-List indicates the first resource pool and a PUCCH resource different from the first resource pool.

In one embodiment, the first receiver 1601 receives a first signaling group; the first transmitter 1602 transmits a first bit block in a target PUCCH, the first bit block comprising at most 2 HARQ-ACK bits; herein, resources occupied by the target PUCCH belong to a target resource pool; the first signaling group is used to determine a first resource pool and a reference mode, the first resource pool being a PUCCH resource, the reference mode being either of a first mode and a second mode, the first mode is NACK-only feedback, while the second mode is ACK/NACK feedback; when the reference mode is the second mode, the target resource pool is the first resource pool; when the reference mode is the first mode and the first bit block comprises only 1 HARQ-ACK bit, the target resource pool is a second resource pool, the second resource pool being a PUCCH resource and being different from the first resource pool; when the reference mode is the first mode and the first bit block comprises 2 HARQ-ACK bits, the target resource pool is a third resource pool, the third resource pool being a PUCCH resource and being different from the first resource pool, and the third resource pool being different from the second resource pool.

In one subembodiment, an IE in the first signaling group that includes SPS-PUCCH-AN-List in its name is used to indicate the first resource pool, the reference mode being a HARQ-ACK feedback mode configured for the first resource pool.

In one subembodiment, an IE in the first signaling group that includes SPS-PUCCH-AN-List in its name is used to indicate the first resource pool.

In one subembodiment, an IE in the first signaling group is used to indicate the reference mode.

In one subembodiment, the multiple resource pools in the present application include the first resource pool, the second resource pool, and the third resource pool; three different SPS-PUCCH-AN-Lists indicate the first resource pool, the second resource pool, and the third resource pool, respectively.

In one subembodiment, the multiple resource pools in the present application include the first resource pool, the second resource pool, and the third resource pool; the same SPS-PUCCH-AN-List indicates the first resource pool, the second resource pool, and the third resource pool.

In one subembodiment, the first resource pool is a PUCCH resource configured for ACK/NACK feedback to the MBS, the second resource pool is a PUCCH resource configured for NACK-only feedback to the MBS, and the third resource pool is a PUCCH resource configured for unicasting.

In one embodiment, the first bit block comprises at most 2 HARQ-ACK bits; when the reference mode is the second mode: whether the first bit block comprises only 1 HARQ-ACK bit or 2 HARQ-ACK bits, the target resource pool is the same PUCCH resource.

Embodiment 17

Figure 17:
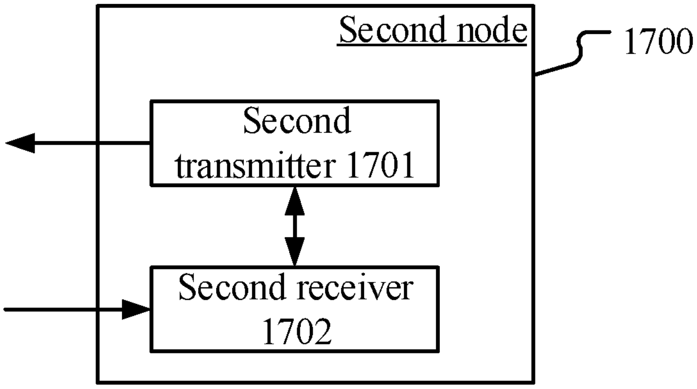
FIG. 17 illustrates a structure block diagram of a processing device in a second node according to one embodiment of the present disclosure.

Embodiment 17 illustrates a structure block diagram of a processing device in a second node, as shown in FIG. 17. In FIG. 17, a processing device 1700 in a second node comprises a second transmitter 1701 and a second receiver 1702.

In one embodiment, the second node 1700 is a UE.

In one embodiment, the second node 1700 is a base station.

In one embodiment, the second node 1700 is a relay node.

In one embodiment, the second node 1700 is vehicle-mounted communication equipment.

In one embodiment, the second node 1700 is UE supporting V2X communications.

In one embodiment, the second transmitter 1701 comprises at least one of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1701 comprises at least the first five of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1701 comprises at least the first four of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1701 comprises at least the first three of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1701 comprises at least the first two of the antenna 420, the transmitter 418, the multi-antenna transmitting processor 471, the transmitting processor 416, the controller/processor 475 and the memory 476 in FIG. 4 of the present disclosure.

In one embodiment, the second receiver 1702 comprises at least one of the antenna 420, the receiver 418, the multi-antenna receiving processor 472, the receiving processor 470, the controller/processor 475 or the memory 476 in FIG. 4 of the present disclosure.

In one embodiment, the second receiver 1702 comprises at least the first five of the antenna 420, the receiver 418, the multi-antenna receiving processor 472, the receiving processor 470, the controller/processor 475 and the memory 476 in FIG. 4 of the present disclosure.

In one embodiment, the second receiver 1702 comprises at least the first four of the antenna 420, the receiver 418, the multi-antenna receiving processor 472, the receiving processor 470, the controller/processor 475 and the memory 476 in FIG. 4 of the present disclosure.

In one embodiment, the second receiver 1702 comprises at least the first three of the antenna 420, the receiver 418, the multi-antenna receiving processor 472, the receiving processor 470, the controller/processor 475 and the memory 476 in FIG. 4 of the present disclosure.

In one embodiment, the second receiver 1702 comprises at least the first two of the antenna 420, the receiver 418, the multi-antenna receiving processor 472, the receiving processor 470, the controller/processor 475 and the memory 476 in FIG. 4 of the present disclosure.

In one embodiment, the second transmitter 1701 transmits a first signaling; and transmits a first information group and a target bit block set, the first information group used to determine X1 control resources, X1 being a positive integer greater than 1, the target bit block set comprising at least one bit block; the second receiver 1702 receives a first PUSCH in a first resource pool; herein, the X1 control resources are respectively reserved for X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the second receiver 1702 receives ACK/NACK feedback for bit block(s) in the target bit block set in the first PUSCH; when each of the X1 control resources is orthogonal to the first resource pool in time domain, the second receiver 1702 performs signal detection in at least one PUCCH among the X1 PUCCHs.

In one embodiment, when any of the X1 control resources is overlapping with the first resource pool in time domain: dropping performance of signal detection in all of the X1 PUCCHs.

In one embodiment, when each of the X1 control resources is orthogonal to the first resource pool in time domain: performance of signal detection in all of the X1 PUCCHs.

In one embodiment, the second transmitter 1701 transmits a first information group and a target bit block set, the first information group used to determine X1 control resources, X1 being a positive integer greater than 1, the target bit block set comprising at least one bit block; the second receiver 1702 performs signal detection in at least one PUCCH of X1 PUCCHs; and the second receiver 1702 receives a first PUSCH in a first resource pool, or, drops receiving the first PUSCH in the first resource pool; herein, the X1 control resources are respectively reserved for the X1 PUCCHs, at least one of the X1 PUCCHs being a PUCCH for NACK-only feedback, and any bit block in the target bit block set comprises at least one bit; when there exists one control resource among the X1 control resources that is overlapping with the first resource pool in time domain, the second receiver 1702 drops receiving the first PUSCH in the first resource pool; when each of the X1 control resources is orthogonal to the first resource pool in time domain, the second receiver 1702 receives the first PUSCH in the first resource pool.

In one embodiment, the second transmitter 1701 transmits a first signaling group; the second receiver 1702 receives a first bit block in a target PUCCH, the first bit block comprising at least one bit; herein, resources occupied by the target PUCCH belong to a target resource pool; the first signaling group is used to determine a first resource pool and a reference mode, the reference mode being either of a first mode and a second mode, the first mode and the second mode being different HARQ-ACK feedback modes, respectively; when the reference mode is the first mode, which one of multiple resource pools is the target resource pool is related to a number of bit(s) in the first bit block, one of the multiple resource pools being default or configurable, the first resource pool being one of the multiple resource pools; when the reference mode is the second mode, the target resource pool is the first resource pool.

In one embodiment, the first bit block comprises at least one HARQ-ACK bit indicating a NACK.

In one embodiment, the first bit block comprises at most 2 HARQ-ACK bits; when the reference mode is the first mode: when the first bit block comprises only 1 HARQ-ACK bit, the target resource pool is the first resource pool; when the first bit block comprises 2 HARQ-ACK bits, the target resource pool is one of the multiple resource pools other than the first resource pool.

In one embodiment, the first bit block comprises at most 2 HARQ-ACK bits; when the reference mode is the first mode: when the first bit block comprises 2 HARQ-ACK bits, the target resource pool is the first resource pool; when the first bit block comprises only 1 HARQ-ACK bit, the target resource pool is one of the multiple resource pools other than the first resource pool.

In one embodiment, the first mode is NACK-only feedback, while the second mode is ACK/NACK feedback.

In one embodiment, the second transmitter 1701 transmits a first DCI; herein, the first DCI comprises a first field, a value of the first field in the first DCI being equal to a third value, and an index of the target resource pool in a resource pool set to which the target resource pool belongs is related to the third value.

In one embodiment, the second transmitter 1701 transmits a first DCI; herein, the first DCI is used to determine PUCCH resources to which resources occupied by the target PUCCH belong from the target resource pool.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, test apparatus, test equipment or test instrument, and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) for wireless communications, comprising:

a receiver configured to:

receive radio resource control (RRC) signaling, the RRC signaling comprising information used to configure a plurality of control resources; and receive a target bit block set, the target bit block set comprising a plurality of bit blocks, wherein each bit block comprises a transport block;

a transmitter configured to transmit a Physical Uplink Shared Channel (PUSCH) in a resource pool;

wherein the plurality of control resources are respectively reserved for a corresponding plurality of Physical Uplink Control Channels (PUCCHs), each of the plurality of control resources is a PUCCH resource, and each of the plurality of PUCCHs is a PUCCH for NACK-only Hybrid Automatic Repeat Request acknowledgement (HARQ-ACK) feedback associated with multicast and broadcast services (MBS);

wherein the plurality of control resources respectively correspond to a plurality of different decoding results for the plurality of bit blocks, each of the plurality of different decoding results indicating that at least one bit block in the plurality of bit blocks is not correctly decoded;

wherein, when one control resource exists among the plurality of control resources that overlaps with the resource pool in time domain, whether or not a PUCCH corresponding to the one control resource would otherwise be transmitted, the PUSCH is used to transmit ACK/NACK HARQ-ACK feedback for the plurality of bit blocks in the target bit block set; and wherein, when each of the plurality of control resources is orthogonal to the resource pool in time domain, at most one PUCCH among the plurality of PUCCHs is used to transmit HARQ-ACK feedback for the plurality of bit blocks in the target bit block set, including that:

(i) when each bit block in the plurality of bit blocks is correctly decoded, the UE does not transmit HARQ-ACK feedback for the target bit block set in the plurality of PUCCHs; and (ii) when at least one bit block in the plurality of bit blocks is not correctly decoded, only one PUCCH among the plurality of PUCCHs, corresponding to a decoding result of the plurality of bit blocks, is used to transmit a NACK.

2. The UE of claim 1, wherein the RRC signaling comprises at least one of a Physical Uplink Control Channel configuration (PUCCH-Config) or a semi-persistent scheduling PUCCH acknowledgment list (SPS-PUCCH-AN-List).

3. The UE of claim 1, wherein the plurality of control resources are configured in a same PUCCH-Config or belong to a same PUCCH resource set.

4. The UE of claim 1, wherein a number of bit blocks in the target bit block set is used to determine a number of control resources in the plurality of control resources.

5. The UE of claim 1, wherein the ACK/NACK HARQ-ACK feedback for the plurality of bit blocks in the target bit block set is represented by a plurality of HARQ-ACK bits, the plurality of HARQ-ACK bits respectively indicating whether the plurality of bit blocks are correctly decoded.

6. The UE of claim 1, wherein each PUCCH for NACK-only HARQ-ACK feedback is configured to transmit only one HARQ-ACK bit indicating a NACK.

7. The UE of claim 1, wherein a control resource overlapping with the resource pool in time domain comprises occupying at least one same multicarrier symbol as the resource pool, and wherein a control resource being orthogonal to the resource pool in time domain comprises being non-overlapped with the resource pool in time domain.

8. The UE of claim 1, wherein, when each of the plurality of control resources is orthogonal to the resource pool in time domain and at least one bit block in the plurality of bit blocks is not correctly decoded, the decoding result of the plurality of bit blocks is used to determine which one PUCCH among the plurality of PUCCHs is used to transmit the NACK.

9. The UE of claim 1, wherein the plurality of bit blocks consists of two bit blocks, and the plurality of different decoding results consists of three decoding results respectively denoted by {ACK, NACK}, {NACK, ACK}, and {NACK, NACK}.

10. The UE of claim 1, wherein the plurality of bit blocks consists of three bit blocks, and the plurality of different decoding results consists of seven decoding results respectively denoted by {ACK, ACK, NACK}, {ACK, NACK, ACK}, {ACK, NACK, NACK}, {NACK, ACK, NACK}, {NACK, NACK, ACK}, {NACK, NACK, NACK}, and {NACK, ACK, ACK}.

11. A method performed by a user equipment (UE) for wireless communications, the method comprising:

receiving radio resource control (RRC) signaling, the RRC signaling comprising information used to configure a plurality of control resources; and receiving a target bit block set, the target bit block set comprising a plurality of bit blocks, wherein each bit block comprises a transport block;

transmitting a Physical Uplink Shared Channel (PUSCH) in a resource pool;

wherein the plurality of control resources are respectively reserved for a corresponding plurality of Physical Uplink Control Channels (PUCCHs), each of the plurality of control resources is a PUCCH resource, and each of the plurality of PUCCHs is a PUCCH for NACK-only Hybrid Automatic Repeat Request acknowledgement (HARQ-ACK) feedback associated with multicast and broadcast services (MBS);

wherein the plurality of control resources respectively correspond to a plurality of different decoding results for the plurality of bit blocks, each of the plurality of different decoding results indicating that at least one bit block in the plurality of bit blocks is not correctly decoded;

wherein, when one control resource exists among the plurality of control resources that overlaps with the resource pool in time domain, whether or not a PUCCH corresponding to the one control resource would otherwise be transmitted, the PUSCH is used to transmit ACK/NACK HARQ-ACK feedback for the plurality of bit blocks in the target bit block set; and wherein, when each of the plurality of control resources is orthogonal to the resource pool in time domain, at most one PUCCH among the plurality of PUCCHs is used to transmit HARQ-ACK feedback for the plurality of bit blocks in the target bit block set, including that:

(i) when each bit block in the plurality of bit blocks is correctly decoded, the UE does not transmit HARQ-ACK feedback for the target bit block set in the plurality of PUCCHs; and (ii) when at least one bit block in the plurality of bit blocks is not correctly decoded, only one PUCCH among the plurality of PUCCHs, corresponding to a decoding result of the plurality of bit blocks, is used to transmit a NACK.

12. The method of claim 11, wherein the RRC signaling comprises at least one of a Physical Uplink Control Channel configuration (PUCCH-Config) or a semi-persistent scheduling PUCCH acknowledgment list (SPS-PUCCH-AN-List).

13. The method of claim 11, wherein the plurality of control resources are configured in a same PUCCH-Config or belong to a same PUCCH resource set.

14. The method of claim 11, wherein a number of bit blocks in the target bit block set is used to determine a number of control resources in the plurality of control resources.

15. The method of claim 11, wherein the ACK/NACK HARQ-ACK feedback for the plurality of bit blocks in the target bit block set is represented by a plurality of HARQ-ACK bits, the plurality of HARQ-ACK bits respectively indicating whether the plurality of bit blocks are correctly decoded.

16. The method of claim 11, wherein each PUCCH for NACK-only HARQ-ACK feedback is configured to transmit only one HARQ-ACK bit indicating a NACK.

17. The method of claim 11, wherein a control resource overlapping with the resource pool in time domain comprises occupying at least one same multicarrier symbol as the resource pool, and wherein a control resource being orthogonal to the resource pool in time domain comprises being non-overlapped with the resource pool in time domain.

18. The method of claim 11, wherein, when each of the plurality of control resources is orthogonal to the resource pool in time domain and at least one bit block in the plurality of bit blocks is not correctly decoded, the decoding result of the plurality of bit blocks is used to determine which one PUCCH among the plurality of PUCCHs is used to transmit the NACK.

19. The method of claim 11, wherein the plurality of bit blocks consists of two bit blocks, and the plurality of different decoding results consists of three decoding results respectively denoted by {ACK, NACK}, {NACK, ACK}, and {NACK, NACK}.

20. The method of claim 11, wherein the plurality of bit blocks consists of three bit blocks, and the plurality of different decoding results consists of seven decoding results respectively denoted by {ACK, ACK, NACK}, {ACK, NACK, ACK}, {ACK, NACK, NACK}, {NACK, ACK, NACK}, {NACK, NACK, ACK}, {NACK, NACK, NACK}, and {NACK, ACK, ACK}.

* * * * *